United States Patent
Whitlock et al.

(10) Patent No.: US 12,014,065 B2
(45) Date of Patent: Jun. 18, 2024

(54) MULTI-CLOUD ORCHESTRATION AS-A-SERVICE

(71) Applicant: PURE STORAGE, INC., Mountain View, CA (US)

(72) Inventors: David Whitlock, New Orleans, LA (US); Argenis Fernandez, Redmond, WA (US)

(73) Assignee: PURE STORAGE, INC., Santa Clara, CA (US)

(*) Notice: Subject to any disclaimer, the term of this patent is extended or adjusted under 35 U.S.C. 154(b) by 368 days.

(21) Appl. No.: 17/238,936

(22) Filed: Apr. 23, 2021

(65) Prior Publication Data
US 2021/0263667 A1   Aug. 26, 2021

Related U.S. Application Data

(63) Continuation-in-part of application No. 17/072,530, filed on Oct. 16, 2020, which is a continuation-in-part of application No. 16/787,519, filed on Feb. 11, 2020.

(51) Int. Cl.
| | | |
|---|---|---|
| G06F 12/00 | (2006.01) | |
| G06F 3/06 | (2006.01) | |
| G06F 11/30 | (2006.01) | |
| G06F 11/34 | (2006.01) | |

(52) U.S. Cl.
CPC .......... *G06F 3/0647* (2013.01); *G06F 3/0605* (2013.01); *G06F 3/0614* (2013.01); *G06F 3/0631* (2013.01); *G06F 3/067* (2013.01); *G06F 11/3075* (2013.01); *G06F 11/3409* (2013.01)

(58) Field of Classification Search
CPC .... G06F 3/0647; G06F 3/0605; G06F 3/0614; G06F 3/0631; G06F 3/067; G06F 11/3075; G06F 11/3409
See application file for complete search history.

(56) References Cited

U.S. PATENT DOCUMENTS

| | | |
|---|---|---|
| 5,706,210 A | 1/1998 | Kumano et al. |
| 5,799,200 A | 8/1998 | Brant et al. |
| 5,933,598 A | 8/1999 | Scales et al. |
| 6,012,032 A | 1/2000 | Donovan et al. |
| 6,085,333 A | 7/2000 | Dekoning et al. |

(Continued)

FOREIGN PATENT DOCUMENTS

| | | |
|---|---|---|
| EP | 0725324 A2 | 8/1996 |
| WO | 2012087648 A2 | 6/2012 |

(Continued)

OTHER PUBLICATIONS

International Search Report and Written Opinion, PCT/US2021/017452, dated May 31, 2021, 14 pages.

(Continued)

*Primary Examiner* — David Yi
*Assistant Examiner* — Tahilba O Puche

(57) ABSTRACT

Multi-cloud orchestration as a service, including: receiving a provisioning request for one or more cloud computing resources; identifying, based on a first one or more metrics, a particular cloud computing environment from a plurality of cloud computing environments to satisfy the provisioning request; and provisioning, in the particular cloud computing environment, the one or more cloud computing resources.

18 Claims, 28 Drawing Sheets

(56) References Cited

U.S. PATENT DOCUMENTS

| | | |
|---|---|---|
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,211 B2 | 2/2009 | Breen |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 7,984,151 B1 | 7/2011 | Raz et al. |
| 8,042,163 B1 | 10/2011 | Karr et al. |
| 8,086,585 B1 | 12/2011 | Brashers et al. |
| 8,200,887 B2 | 6/2012 | Bennett |
| 8,271,700 B1 | 9/2012 | Annem et al. |
| 8,285,681 B2 | 10/2012 | Prahlad et al. |
| 8,320,931 B2 | 11/2012 | Ward et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,581,713 B1 | 11/2013 | Morgan et al. |
| 8,589,355 B2 | 11/2013 | Nagpal et al. |
| 8,612,284 B1 | 12/2013 | Sharif et al. |
| 8,613,066 B1 | 12/2013 | Brezinski et al. |
| 8,620,970 B2 | 12/2013 | English et al. |
| 8,670,783 B2 | 3/2014 | Klein |
| 8,686,841 B2 | 4/2014 | Macheca et al. |
| 8,751,463 B1 | 6/2014 | Chamness |
| 8,751,863 B2 | 6/2014 | Calder et al. |
| 8,762,642 B2 | 6/2014 | Bates et al. |
| 8,769,622 B2 | 7/2014 | Chang et al. |
| 8,800,009 B1 | 8/2014 | Beda et al. |
| 8,812,860 B1 | 8/2014 | Bray |
| 8,850,546 B1 | 9/2014 | Field et al. |
| 8,863,299 B2 | 10/2014 | Sharma et al. |
| 8,898,346 B1 | 11/2014 | Simmons |
| 8,909,854 B2 | 12/2014 | Yamagishi et al. |
| 8,923,810 B2 | 12/2014 | Leemet et al. |
| 8,931,041 B1 | 1/2015 | Banerjee |
| 8,949,863 B1 | 2/2015 | Coatney et al. |
| 8,977,296 B1 | 3/2015 | Briggs et al. |
| 8,983,911 B2 | 3/2015 | Fortier et al. |
| 8,984,602 B1 | 3/2015 | Bailey et al. |
| 8,990,905 B1 | 3/2015 | Bailey et al. |
| 9,081,713 B1 | 7/2015 | Bennett |
| 9,124,569 B2 | 9/2015 | Hussain et al. |
| 9,134,922 B2 | 9/2015 | Rajagopal et al. |
| 9,189,334 B2 | 11/2015 | Bennett |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,311,182 B2 | 4/2016 | Bennett |
| 9,408,042 B2 | 8/2016 | Stubbs |
| 9,444,822 B1 | 9/2016 | Borowiec et al. |
| 9,473,890 B1 | 10/2016 | Liu et al. |
| 9,485,620 B2 | 11/2016 | Henson et al. |
| 9,507,532 B1 | 11/2016 | Colgrove et al. |
| 9,565,526 B2 | 2/2017 | Ali et al. |
| 9,571,968 B1 | 2/2017 | Barron et al. |
| 9,621,347 B2 | 4/2017 | Leighton et al. |
| 9,632,870 B2 | 4/2017 | Bennett |
| 9,641,630 B2 | 5/2017 | Broussard et al. |
| 9,641,971 B2 | 5/2017 | Eda et al. |
| 9,647,998 B2 | 5/2017 | Ronca |
| 9,654,922 B2 | 5/2017 | Ronca |
| 9,866,552 B2 | 1/2018 | Barillaud et al. |
| 9,918,191 B2 | 3/2018 | Baca et al. |
| 9,967,391 B2 | 5/2018 | Frenz et al. |
| 10,158,671 B2 | 12/2018 | Poornachandran et al. |
| 10,228,924 B2 | 3/2019 | Berger et al. |
| 10,231,079 B2 | 3/2019 | Barron et al. |
| 10,257,644 B2 | 4/2019 | Kim et al. |
| 10,282,753 B2 | 5/2019 | Cheung |
| 10,306,403 B2 | 5/2019 | Meganathan |
| 10,349,207 B2 | 7/2019 | Baca et al. |
| 10,404,757 B1 | 9/2019 | Horton |
| 10,425,854 B2 | 9/2019 | Mittal |
| 10,430,062 B2 | 10/2019 | Wilczynski et al. |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0010734 A1 | 1/2005 | Soejima et al. |
| 2005/0160416 A1 | 7/2005 | Jamison et al. |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0143013 A1 | 6/2007 | Breen |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0164118 A1 | 6/2009 | Breen |
| 2009/0198889 A1 | 8/2009 | Ito et al. |
| 2010/0052625 A1 | 3/2010 | Cagno et al. |
| 2010/0137002 A1 | 6/2010 | Agarwal et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0312809 A1 | 12/2010 | Calder et al. |
| 2010/0325345 A1 | 12/2010 | Ohno et al. |
| 2010/0332754 A1 | 12/2010 | Lai et al. |
| 2011/0022642 A1 | 1/2011 | deMilo et al. |
| 2011/0072290 A1 | 3/2011 | Davis et al. |
| 2011/0093471 A1 | 4/2011 | Brockway et al. |
| 2011/0125955 A1 | 5/2011 | Chen |
| 2011/0131231 A1 | 6/2011 | Haas et al. |
| 2011/0136502 A1 | 6/2011 | Hubner et al. |
| 2011/0167221 A1 | 7/2011 | Pangal et al. |
| 2011/0246653 A1* | 10/2011 | Balasubramanian ... G06F 30/30 709/226 |
| 2012/0011077 A1* | 1/2012 | Bhagat ............... G06Q 10/0635 705/317 |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0110044 A1 | 5/2012 | Nagpal et al. |
| 2012/0126998 A1 | 5/2012 | Morgan et al. |
| 2012/0131253 A1 | 5/2012 | McKnight et al. |
| 2012/0133530 A1 | 5/2012 | Morgan et al. |
| 2012/0239739 A1* | 9/2012 | Manglik .................. G06F 8/61 709/203 |
| 2012/0242470 A1 | 9/2012 | Morgan et al. |
| 2012/0284769 A1 | 11/2012 | Dixon et al. |

(56) References Cited

U.S. PATENT DOCUMENTS

| | | |
|---|---|---|
| 2012/0303919 A1 | 11/2012 | Hu et al. |
| 2012/0303999 A1 | 11/2012 | Calder et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0054431 A1 | 2/2013 | Forman |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1* | 12/2013 | Brunk ................ G06F 3/0685 709/226 |
| 2014/0020083 A1* | 1/2014 | Fetik .................. G06F 21/78 726/11 |
| 2014/0032920 A1* | 1/2014 | Gehrmann ............ G06F 21/57 713/168 |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0196054 A1* | 7/2014 | Brochard ............. G06F 9/505 718/105 |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0289554 A1 | 9/2014 | Calder et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0006691 A1 | 1/2015 | Satapathy |
| 2015/0026387 A1 | 1/2015 | Sheredy et al. |
| 2015/0032894 A1* | 1/2015 | Rosensweig ........ G06F 9/5088 709/226 |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134851 A1 | 5/2015 | Relan et al. |
| 2015/0134920 A1 | 5/2015 | Anderson et al. |
| 2015/0140989 A1 | 5/2015 | Leemet et al. |
| 2015/0149822 A1 | 5/2015 | Coronado et al. |
| 2015/0181016 A1 | 6/2015 | Jain et al. |
| 2015/0193169 A1 | 7/2015 | Sundaram et al. |
| 2015/0193434 A1 | 7/2015 | Fortier et al. |
| 2015/0213497 A1 | 7/2015 | Jain et al. |
| 2015/0237475 A1 | 8/2015 | Henson et al. |
| 2015/0271154 A1 | 9/2015 | Ronca |
| 2015/0271155 A1 | 9/2015 | Ronca |
| 2015/0271156 A1 | 9/2015 | Ronca |
| 2015/0378888 A1 | 12/2015 | Zhang et al. |
| 2016/0065589 A1 | 3/2016 | Leighton et al. |
| 2016/0098323 A1 | 4/2016 | Mutha et al. |
| 2016/0139949 A1* | 5/2016 | Jagannath ........... G06F 9/5022 718/1 |
| 2016/0171545 A1 | 6/2016 | Cheung |
| 2016/0241995 A1 | 8/2016 | Eda et al. |
| 2016/0286033 A1 | 9/2016 | Frenz et al. |
| 2016/0316329 A1 | 10/2016 | Frenz et al. |
| 2016/0330197 A1 | 11/2016 | Barillaud et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2016/0380911 A1* | 12/2016 | Bhandaru ............ H04L 41/40 709/226 |
| 2017/0026786 A1 | 1/2017 | Barron et al. |
| 2017/0039218 A1* | 2/2017 | Prahlad ............... G06F 3/0667 |
| 2017/0055122 A1 | 2/2017 | Barron et al. |
| 2017/0086020 A1 | 3/2017 | Zhao et al. |
| 2017/0118590 A1 | 4/2017 | Baca et al. |
| 2017/0127233 A1 | 5/2017 | Liang et al. |
| 2017/0255401 A1 | 9/2017 | Basham et al. |
| 2018/0034703 A1 | 2/2018 | Anholt et al. |
| 2018/0081562 A1 | 3/2018 | Vasudevan |
| 2018/0121129 A1 | 5/2018 | Sawhney et al. |
| 2018/0199152 A1 | 7/2018 | Chang et al. |
| 2018/0365271 A1 | 12/2018 | Castaing |
| 2019/0098448 A1 | 3/2019 | Jain et al. |
| 2019/0102091 A1 | 4/2019 | Brown et al. |
| 2019/0104381 A1 | 4/2019 | Kong et al. |
| 2019/0164408 A1 | 5/2019 | Bender et al. |
| 2019/0182157 A1 | 6/2019 | Barnes et al. |
| 2019/0220896 A1 | 7/2019 | Cheung |
| 2019/0281410 A1 | 9/2019 | Ahmed et al. |
| 2019/0286373 A1* | 9/2019 | Karumbunathan ..... G06F 3/065 |
| 2019/0312790 A1* | 10/2019 | Hinrichs ............. G06F 15/173 |
| 2019/0320285 A1 | 10/2019 | Liang et al. |
| 2019/0332494 A1 | 10/2019 | Natanzon et al. |
| 2020/0106714 A1 | 4/2020 | Cote et al. |
| 2020/0142920 A1 | 5/2020 | Alexander et al. |
| 2020/0184092 A1 | 6/2020 | Meng et al. |
| 2020/0275049 A1 | 8/2020 | Min |
| 2020/0293501 A1 | 9/2020 | Awasthi et al. |
| 2020/0371893 A1 | 11/2020 | Bhorkar et al. |
| 2021/0097041 A1 | 4/2021 | Patel et al. |
| 2021/0097641 A1 | 4/2021 | Iyer et al. |
| 2021/0157662 A1 | 5/2021 | Heckey et al. |
| 2021/0208943 A1 | 7/2021 | Baughman et al. |
| 2021/0248252 A1* | 8/2021 | Darji .................. G06F 3/065 |

FOREIGN PATENT DOCUMENTS

| | | |
|---|---|---|
| WO | 2013071087 A1 | 5/2013 |
| WO | 2014110137 A1 | 7/2014 |
| WO | 2016015008 A1 | 1/2016 |
| WO | 2016190938 A1 | 12/2016 |
| WO | 2016195759 A1 | 12/2016 |
| WO | 2016195958 A1 | 12/2016 |
| WO | 2016195961 A1 | 12/2016 |
| WO | 2021163189 A1 | 8/2021 |

OTHER PUBLICATIONS

Bellamy-Mcintyre et al., "OpenID and the Enterprise: A Model-based Analysis of Single Sign-On Authentication", 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

ETSI, "Network Function Virtualisation (NFV); Resiliency Requirements", ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Faith, "dictzip file format", GitHub.com (online), accessed Jul. 28, 2015, 1 page, URL: github.com/fidlej/idzip.

Google Search of "storage array define" performed by the Examiner on Nov. 4, 2015 for U.S. Appl. No. 14/725,278, Results limited to entries dated before 2012, 1 page.

Hota et al., "Capability-based Cryptographic Data Access Control in Cloud Computing", International Journal of Advanced Networking and Applications, col. 1, Issue 1, Aug. 2011, 10 pages, Eswar Publications, India.

(56) References Cited

OTHER PUBLICATIONS

Hu et al., "Container Marking: Combining Data Placement, Garbage Collection and Wear Levelling for Flash", 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.
International Search Report and Written Opinion, PCT/IB2017/053491, dated Jan. 4, 2018, 9 pages.
International Search Report and Written Opinion, PCT/US2016/015006, dated Apr. 29, 2016, 12 pages.
International Search Report and Written Opinion, PCT/US2016/015008, dated May 4, 2016, 12 pages.
International Search Report and Written Opinion, PCT/US2016/016333, dated Jun. 8, 2016, 12 pages.
International Search Report and Written Opinion, PCT/US2016/020410, dated Jul. 8, 2016, 12 pages.
International Search Report and Written Opinion, PCT/US2016/032052, dated Aug. 30, 2016, 17 pages.
International Search Report and Written Opinion, PCT/US2016/032084, dated Jul. 18, 2016, 12 pages.
International Search Report and Written Opinion, PCT/US2016/035492, dated Aug. 17, 2016, 10 pages.
International Search Report and Written Opinion, PCT/US2016/036693, dated Aug. 29, 2016, 10 pages.
International Search Report and Written Opinion, PCT/US2016/038758, dated Oct. 7, 2016, 10 pages.
International Search Report and Written Opinion, PCT/US2016/040393, dated Sep. 22, 2016, 10 pages.
International Search Report and Written Opinion, PCT/US2016/044020, dated Sep. 30, 2016, 11 pages.
International Search Report and Written Opinion, PCT/US2016/044874, dated Oct. 7, 2016, 11 pages.
International Search Report and Written Opinion, PCT/US2016/044876, dated Oct. 21, 2016, 12 pages.
International Search Report and Written Opinion, PCT/US2016/044877, dated Sep. 29, 2016, 13 pages.
Kong, "Using PCI Express as the Primary System Interconnect in Multiroot Compute, Storage, Communications and Embedded Systems", White Paper, IDT.com (online), Aug. 28, 2008, 12 pages, URL: www.idt.com/document/whp/idt-pcie-multi-root-whitepaper.
Li et al., "Access Control for the Services Oriented Architecture", Proceedings of the 2007 ACM Workshop on Secure Web Services (SWS '07), Nov. 2007, pp. 9-17, ACM New York, NY.
Microsoft, "Hybrid for SharePoint Server 2013—Security Reference Architecture", Microsoft (online), Oct. 2014, 53 pages, URL: hybrid.office.com/img/Security_Reference_Architecture.pdf.
Microsoft, "Hybrid Identity Management", Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.
Microsoft, "Hybrid Identity", Microsoft (online), Apr. 2014, 36 pages, URL: www.aka.ms/HybridIdentityWp.
PCMag, "Storage Array Definition", Published May 10, 2013, URL: http://web.archive.org/web/20130510121646/http://www.pcmag.com/encyclopedia/term/52091/storage-array, 2 pages.
Storer et al., "Secure Data Deduplication", Proceedings of the 4th ACM International Workshop on Storage Security and Survivability (StorageSS'08), Oct. 2008, 10 pages, ACM New York, NY. USA, DOI: 10.1145/1456469.1456471.
Sweere, "Creating Storage Class Persistent Memory with NVDIMM", Published in Aug. 2013, Flash Memory Summit 2013, URL: http://ww.flashmemorysummit.com/English/Collaterals/Proceedings/2013/20130814_T2_Sweere.pdf, 22 pages.
Techopedia, "What is a disk array", techopedia.com (online), Jan. 13, 2012, 1 page, URL: web.archive.org/web/20120113053358/http://www.techopedia.com/definition/1009/disk-array.
Webopedia, "What is a disk array", webopedia.com (online), May 26, 2011, 2 pages, URL: web/archive.org/web/20110526081214/http://www.webopedia.com/TERM/D/disk_array.html.
Wikipedia, "Convergent Encryption", Wikipedia.org (online), accessed Sep. 8, 2015, 2 pages, URL: en.wikipedia.org/wiki/Convergent_encryption.

\* cited by examiner

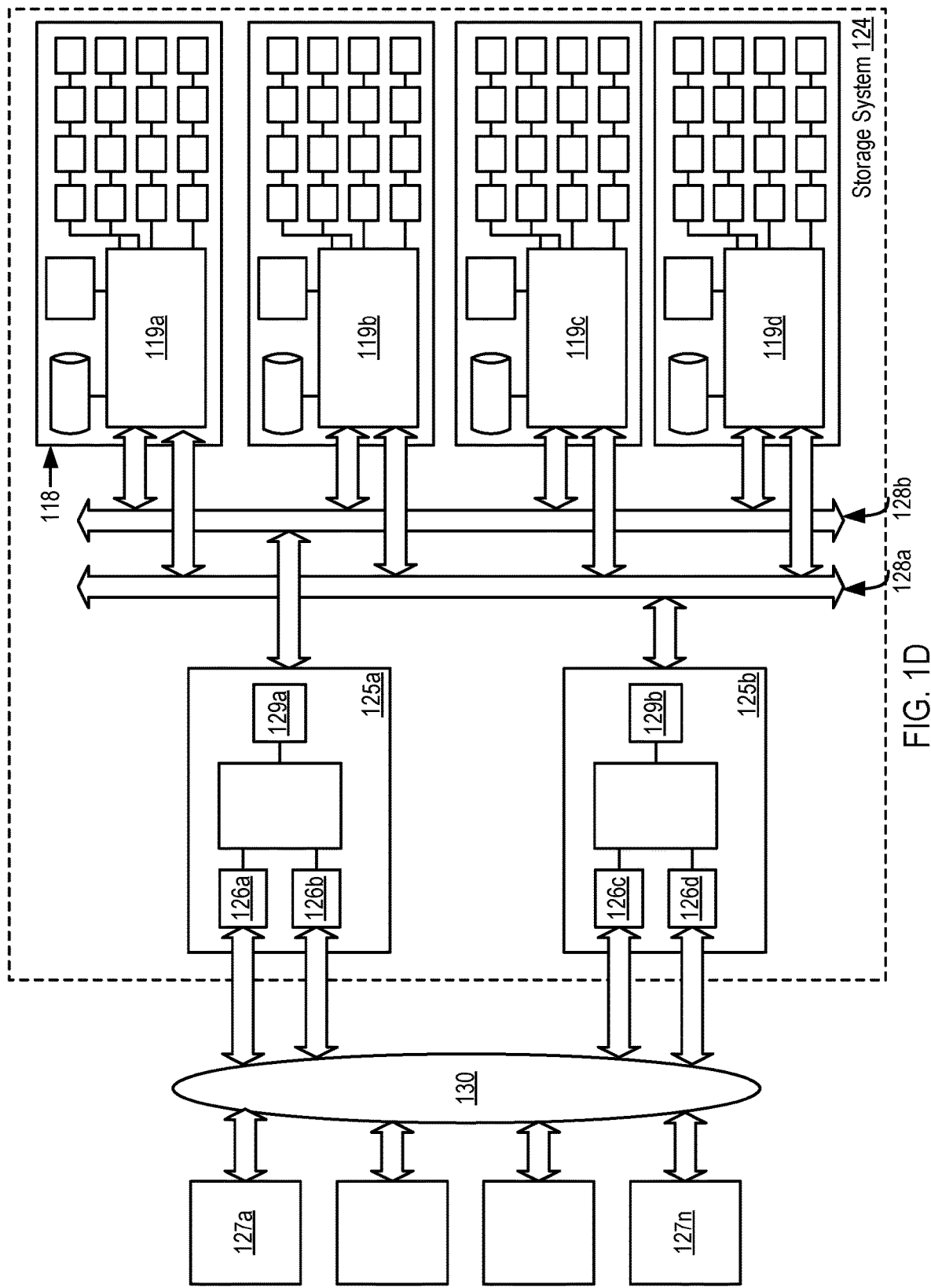

MULTI-CLOUD ORCHESTRATION AS-A-SERVICE

CROSS-REFERENCE TO RELATED APPLICATIONS

This application is a continuation-in-part of and claims priority from U.S. patent application Ser. No. 17/072,530, filed Oct. 16, 2020, which is a continuation-in-part of and claims priority from U.S. patent application Ser. No. 16/787,519, filed Feb. 11, 2020.

BRIEF DESCRIPTION OF DRAWINGS

FIG. 1D illustrates a fourth example system for data storage in accordance with some implementations.

DESCRIPTION OF EMBODIMENTS

Figure 1A:
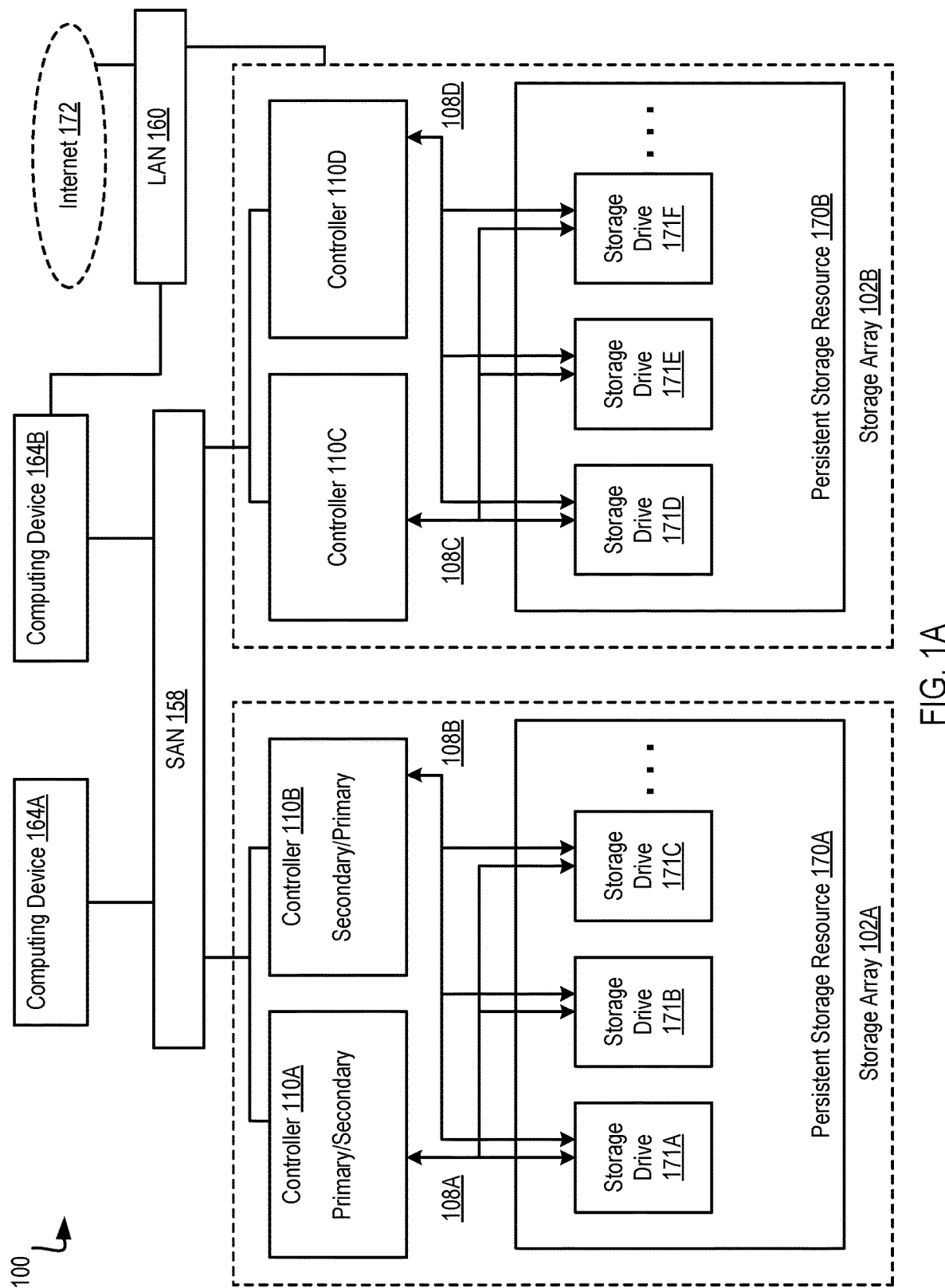
FIG. 1A illustrates a first example system for data storage in accordance with some implementations.

Example methods, apparatus, and products for intelligently placing data in a distributed storage system in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol (TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol (SIT), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives (RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives (SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller 110A-D (e.g., storage array controller 110A) of a storage system 100 may be designated with primary status (also referred to as "primary controller" herein), and other storage array controllers 110A-D (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
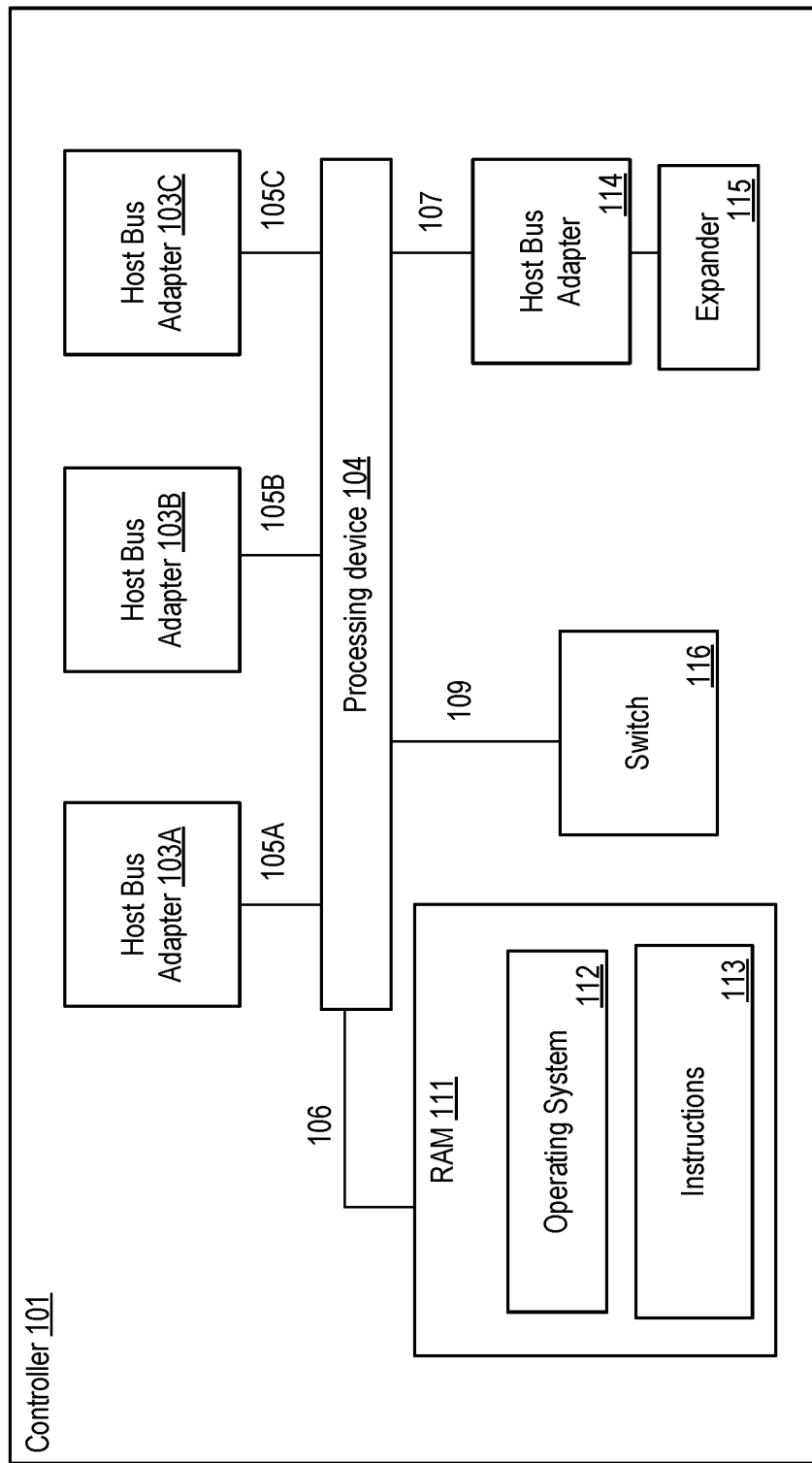
FIG. 1B illustrates a second example system for data storage in accordance with some implementations.

FIG. 1B illustrates an example system for data storage, in accordance with some implementations. Storage array controller 101 illustrated in FIG. 1B may be similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing (RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an ASIC, an FPGA, a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
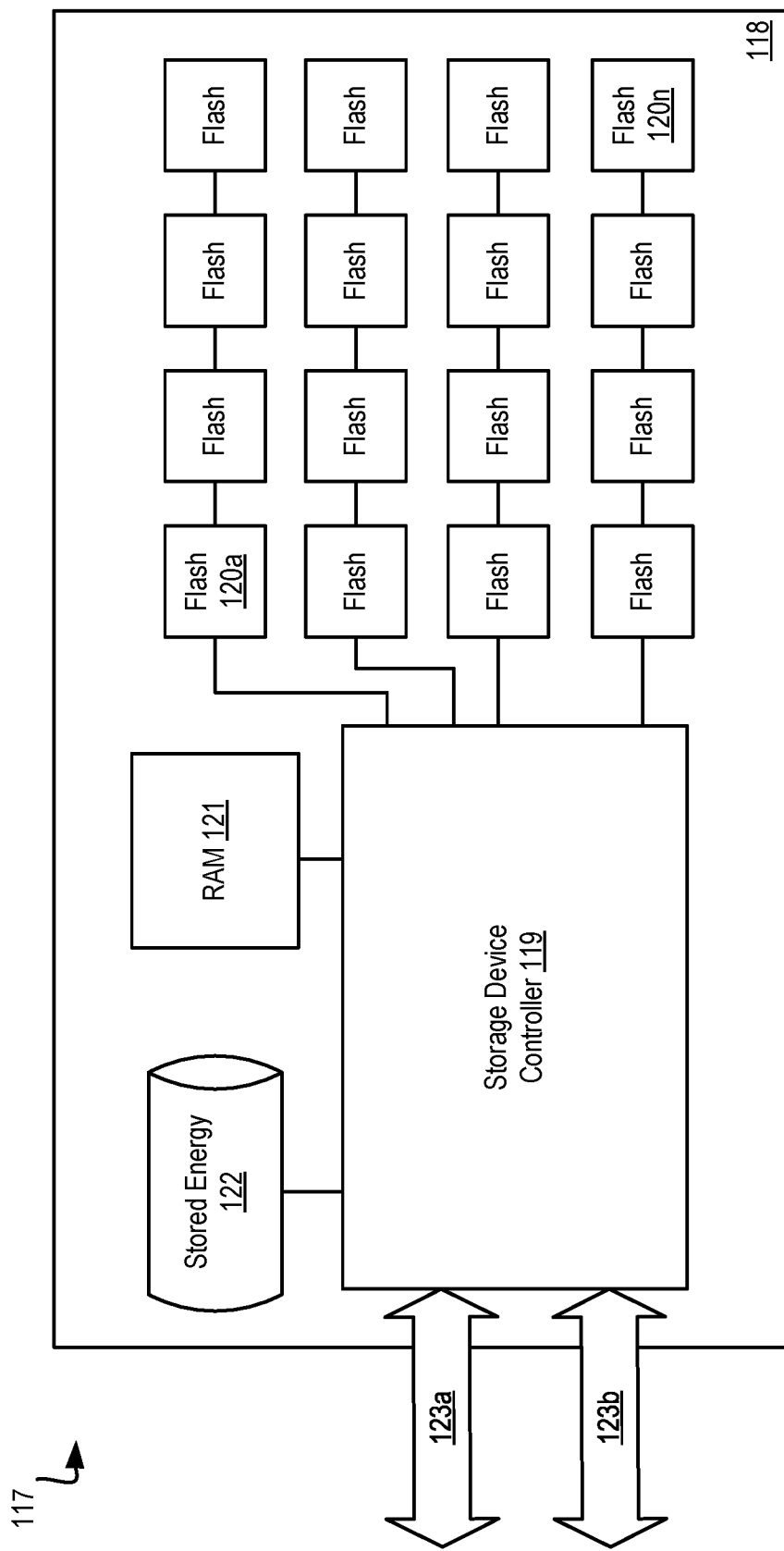
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage controller 119. In one embodiment, storage controller 119A-D may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120a-n including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 117 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120a-120n stored energy device 122 may power storage device controller 119A-D and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

FIG. 1D illustrates a third example system 124 for data storage in accordance with some implementations. In one embodiment, system 124 includes storage controllers 125a, 125b. In one embodiment, storage controllers 125a, 125b are operatively coupled to Dual PCI storage devices 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one controller 125a to another controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
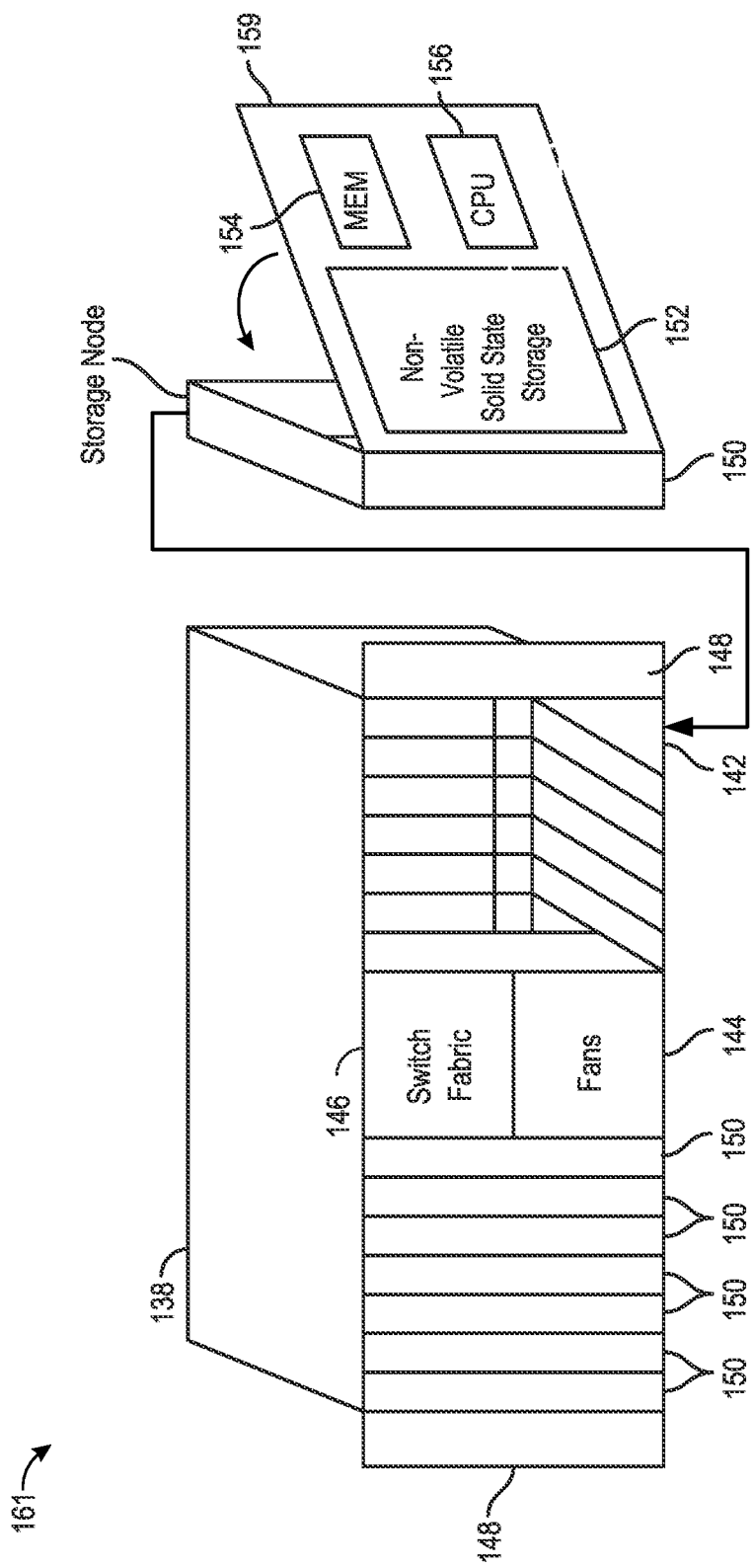
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
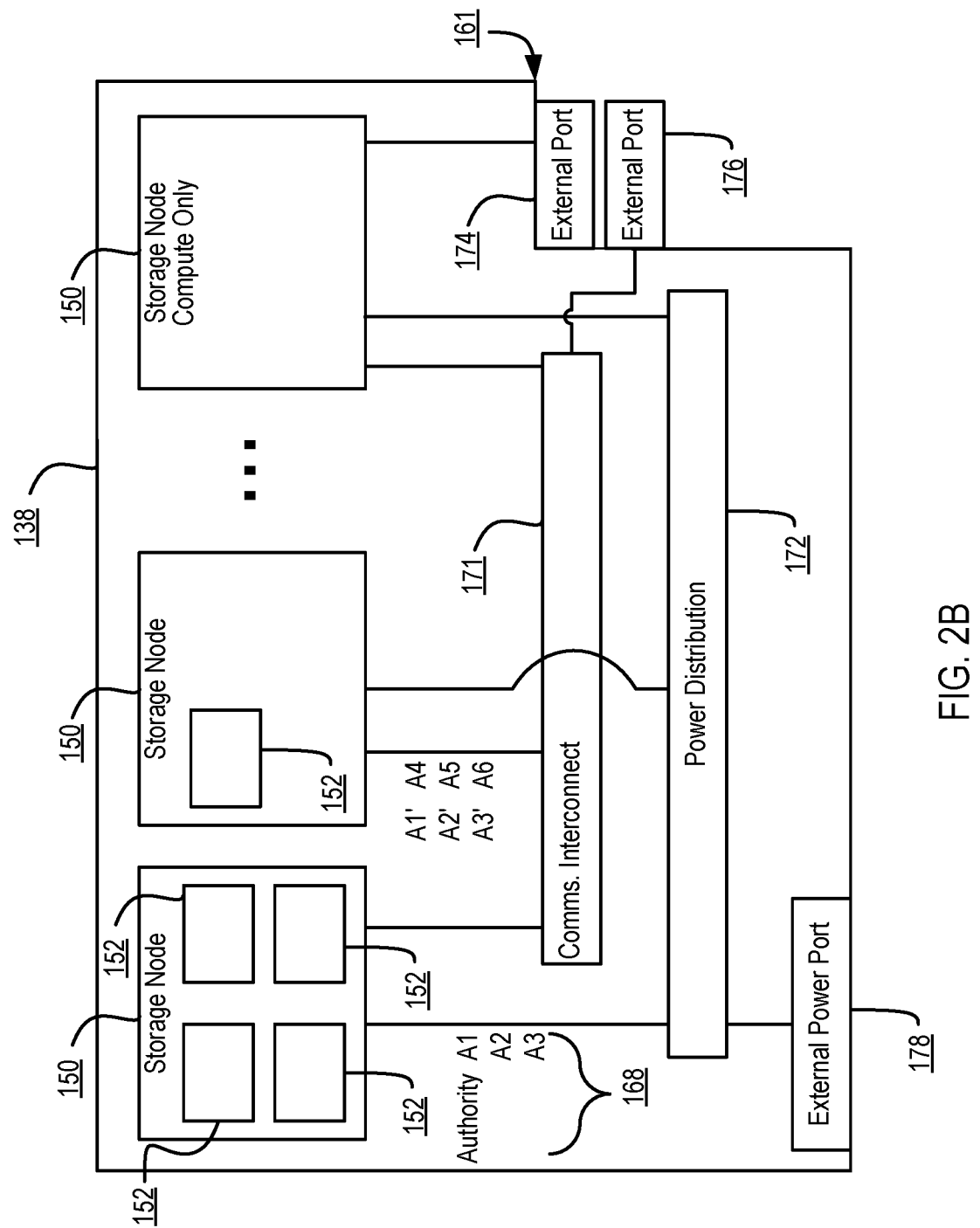
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
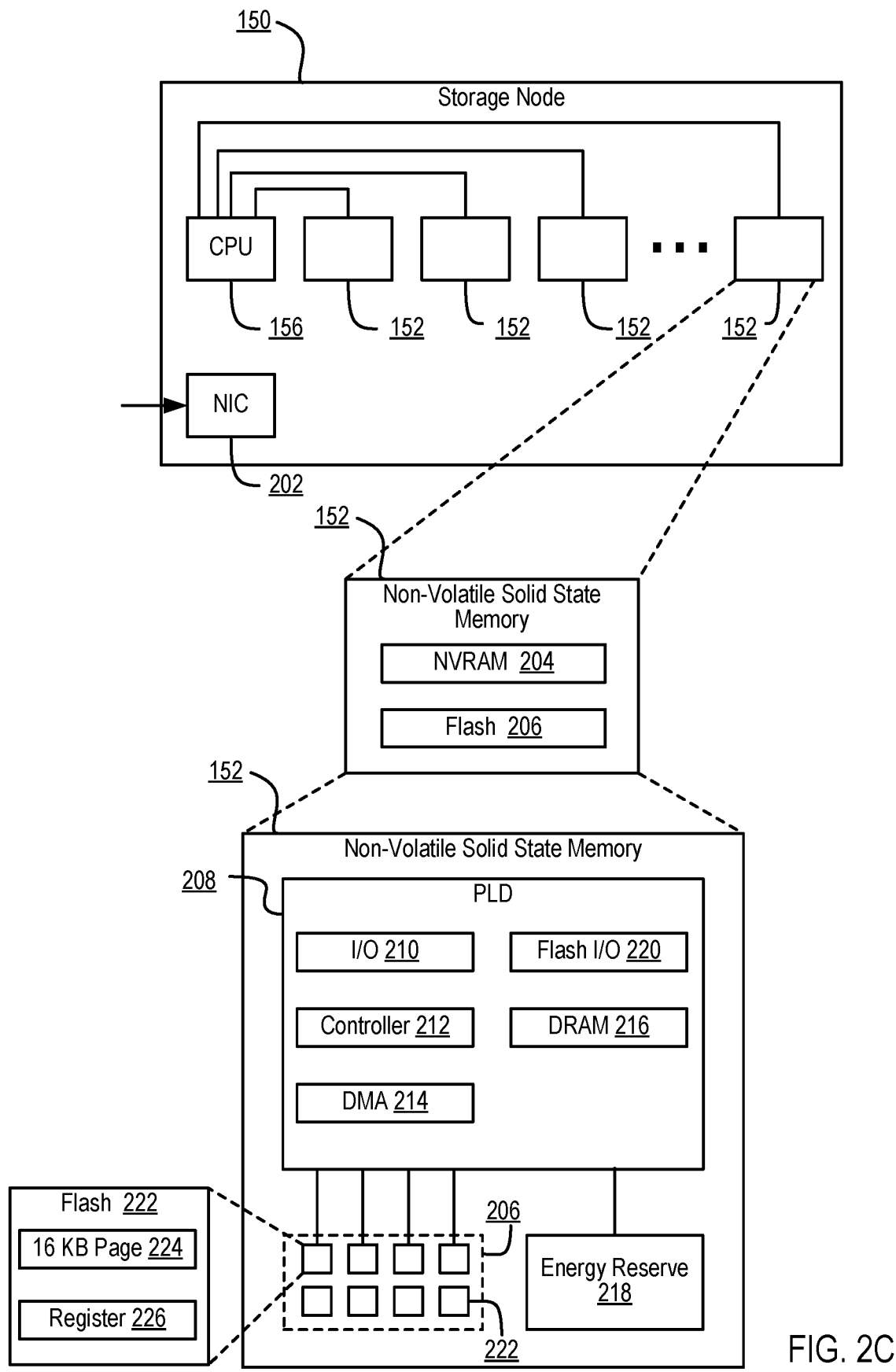
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e., multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., an FPGA. In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
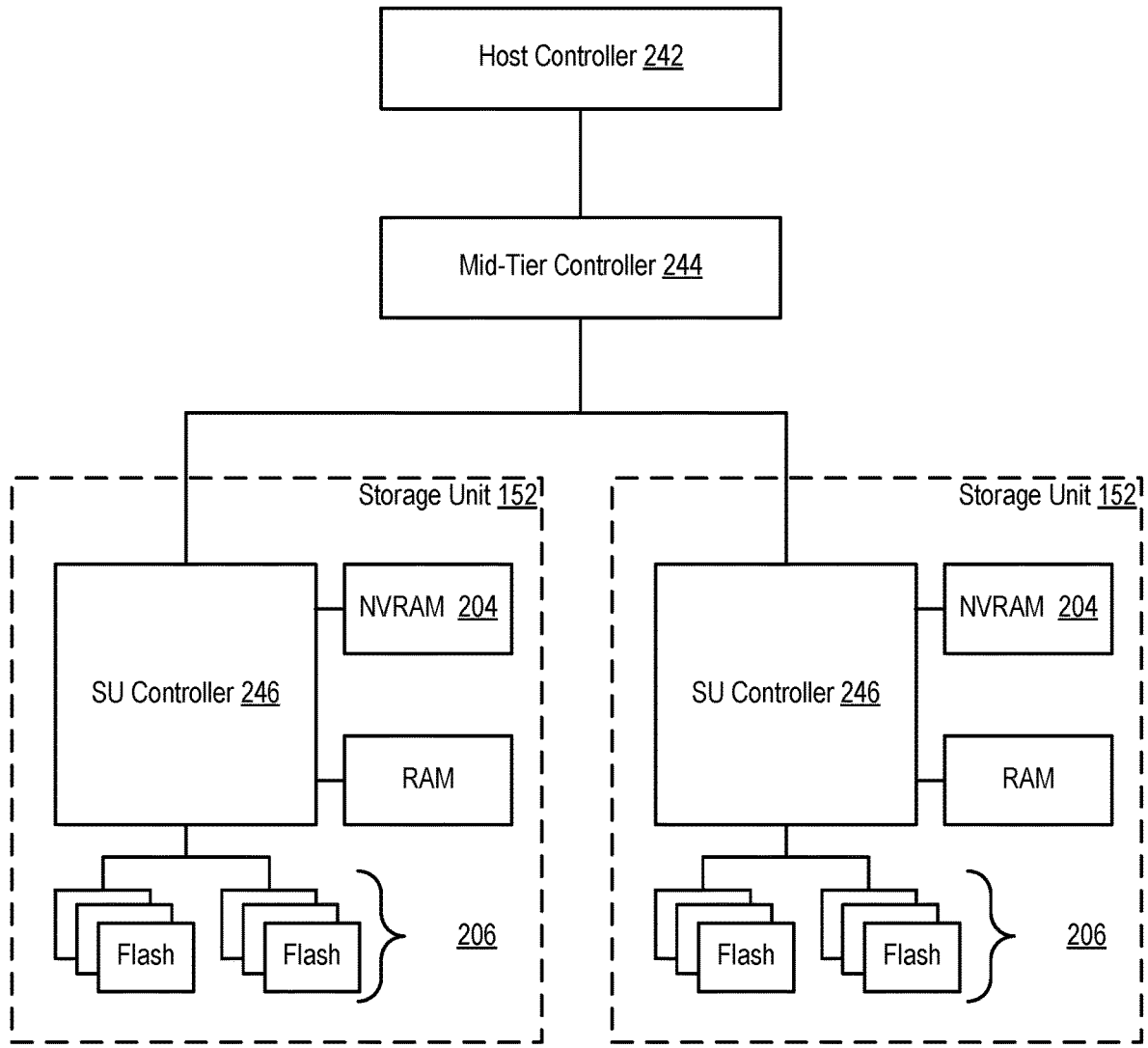
FIG. 2D shows a storage server environment, which uses embodiments of the storage nodes and storage units of some previous figures in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA, flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
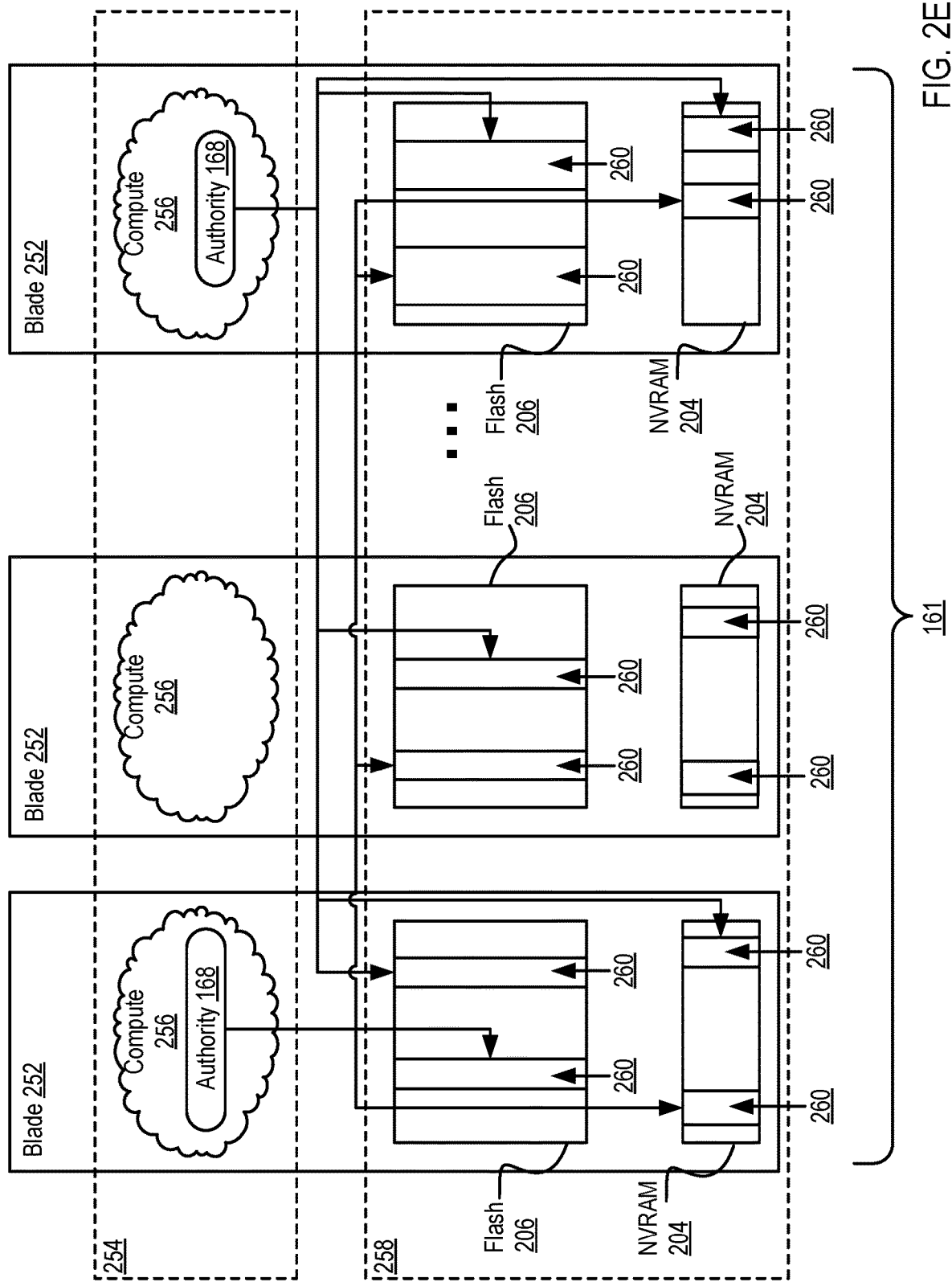
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources. In one embodiment, the compute plane 256 may perform the operations of a storage array controller, as described herein, on one or more devices of the storage plane 258 (e.g., a storage array).

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g., partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
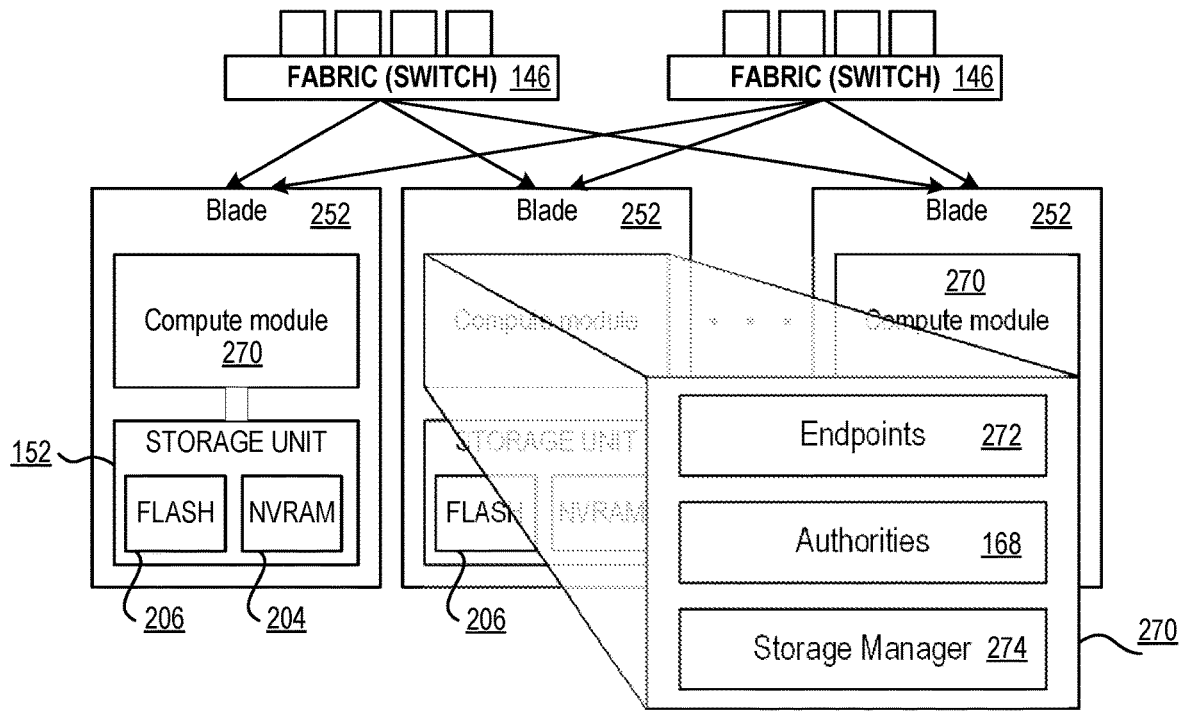
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
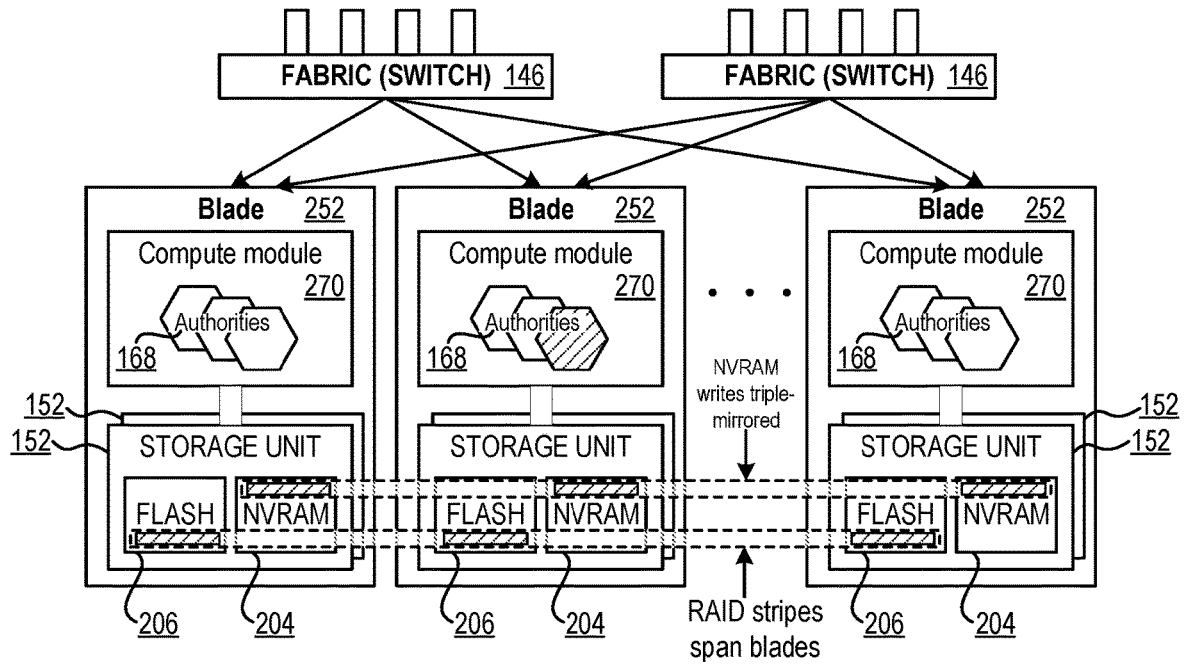
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
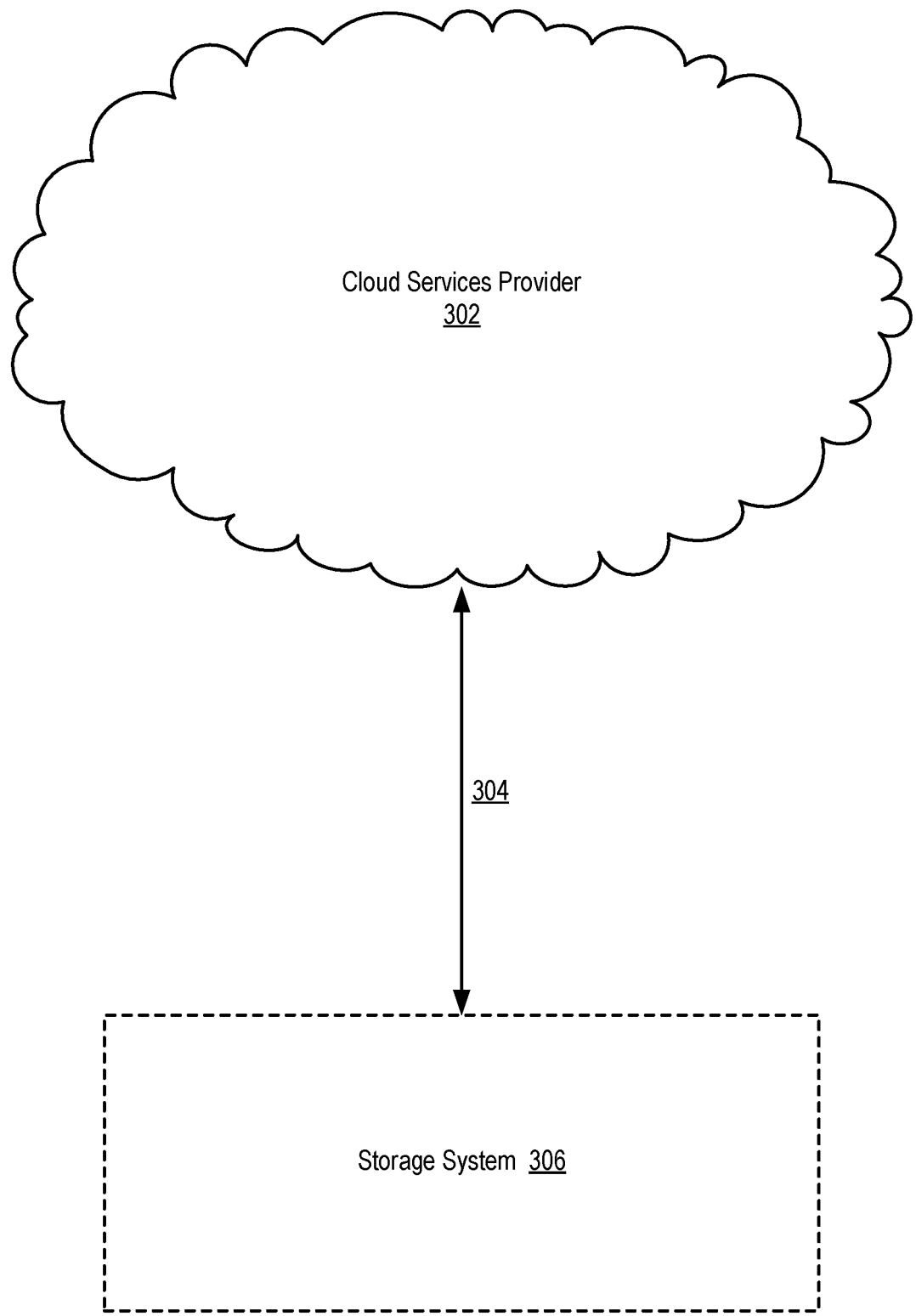
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network (WAN') or LAN, or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides a vast array of services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 302 offers access to its storage infrastructure for use by the storage system 306 and users of the storage system 306, and so on. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. In still alternative embodiments, the cloud services provider 302 may be embodied as a mix of a private and public cloud services with a hybrid cloud deployment.

Although not explicitly depicted in FIG. 3A, readers will appreciate that a vast amount of additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model, eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive vast amounts of telemetry data phoned home by the storage system 306. Such telemetry data may describe various operating characteristics of the storage system 306 and may be analyzed for a vast array of purposes including, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 3B:
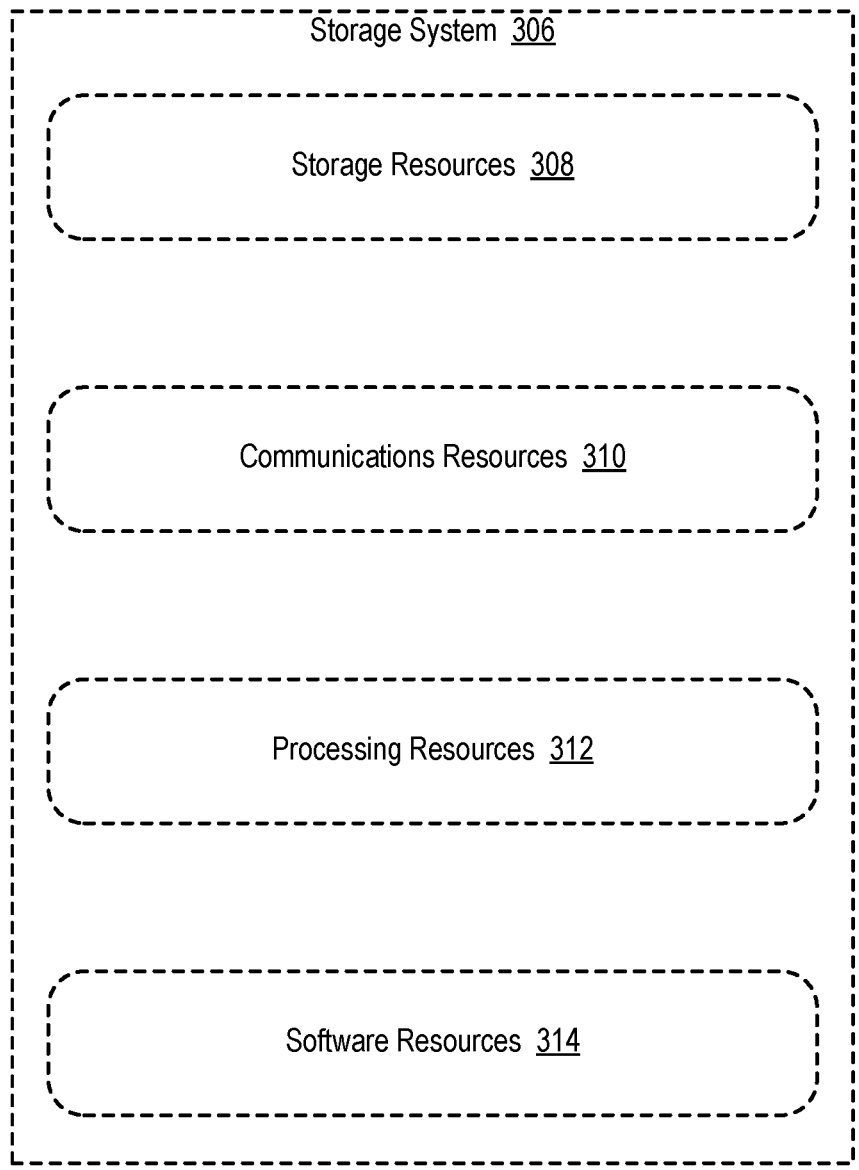
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include a vast amount of storage resources 308, which may be embodied in many forms. For example, the storage resources 308 can include nano-RAM or another form of nonvolatile random access memory that utilizes carbon nanotubes deposited on a substrate, 3D crosspoint non-volatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 308 may include non-volatile magnetoresistive random-access memory ('MRAM'), including spin transfer torque ('STT') MRAM. The example storage resources 308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('IMMs'), non-volatile dual in-line memory modules ('VDIMMs'), M.2, U.2, and others.

The storage resources 308 depicted in FIG. 3A may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306, including embodiments where those resources are separated by a relatively vast expanse. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand (113') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more ASICs that are customized for some particular purpose as well as one or more CPUs. The processing resources 312 may also include one or more DSPs, one or more FPGAs, one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform a vast array of tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Figure 3C:
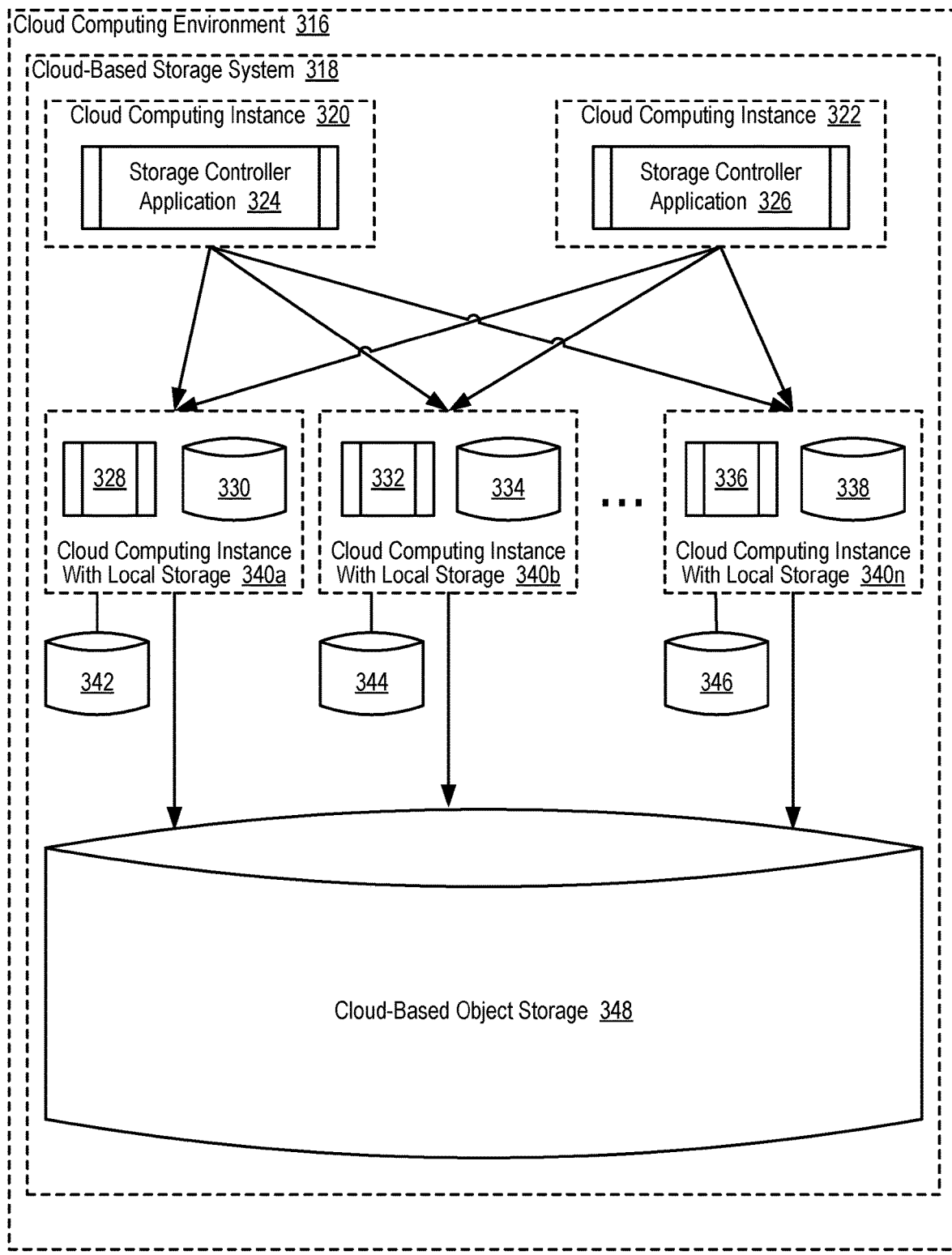
FIG. 3C sets forth an example of a cloud-based storage system in accordance with some embodiments of the present disclosure.

For further explanation, FIG. 3C sets forth an example of a cloud-based storage system 318 in accordance with some embodiments of the present disclosure. In the example depicted in FIG. 3C, the cloud-based storage system 318 is created entirely in a cloud computing environment 316 such as, for example, Amazon Web Services ('AWS'), Microsoft Azure, Google Cloud Platform, IBM Cloud, Oracle Cloud, and others. The cloud-based storage system 318 may be used to provide services similar to the services that may be provided by the storage systems described above. For example, the cloud-based storage system 318 may be used to provide block storage services to users of the cloud-based storage system 318, the cloud-based storage system 318 may be used to provide storage services to users of the cloud-based storage system 318 through the use of solid-state storage, and so on.

The cloud-based storage system 318 depicted in FIG. 3C includes two cloud computing instances 320, 322 that each are used to support the execution of a storage controller application 324, 326. The cloud computing instances 320, 322 may be embodied, for example, as instances of cloud computing resources (e.g., virtual machines) that may be provided by the cloud computing environment 316 to support the execution of software applications such as the storage controller application 324, 326. In one embodiment, the cloud computing instances 320, 322 may be embodied as Amazon Elastic Compute Cloud ('EC2') instances. In such an example, an Amazon Machine Image ('AMI') that includes the storage controller application 324, 326 may be booted to create and configure a virtual machine that may execute the storage controller application 324, 326.

In the example method depicted in FIG. 3C, the storage controller application 324, 326 may be embodied as a module of computer program instructions that, when executed, carries out various storage tasks. For example, the storage controller application 324, 326 may be embodied as a module of computer program instructions that, when executed, carries out the same tasks as the controllers 110A, 110B in FIG. 1A described above such as writing data received from the users of the cloud-based storage system 318 to the cloud-based storage system 318, erasing data from the cloud-based storage system 318, retrieving data from the cloud-based storage system 318 and providing such data to users of the cloud-based storage system 318, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 320, 322 that each include the storage controller application 324, 326, in some embodiments one cloud computing instance 320 may operate as the primary controller as described above while the other cloud computing instance 322 may operate as the secondary controller as described above. Readers will appreciate that the storage controller application 324, 326 depicted in FIG. 3C may include identical source code that is executed within different cloud computing instances 320, 322.

Consider an example in which the cloud computing environment 316 is embodied as AWS and the cloud computing instances are embodied as EC2 instances. In such an example, the cloud computing instance 320 that operates as the primary controller may be deployed on one of the instance types that has a relatively large amount of memory and processing power while the cloud computing instance 322 that operates as the secondary controller may be deployed on one of the instance types that has a relatively small amount of memory and processing power. In such an example, upon the occurrence of a failover event where the roles of primary and secondary are switched, a double failover may actually be carried out such that: 1) a first failover event where the cloud computing instance 322 that formerly operated as the secondary controller begins to operate as the primary controller, and 2) a third cloud computing instance (not shown) that is of an instance type that has a relatively large amount of memory and processing power is spun up with a copy of the storage controller application, where the third cloud computing instance begins operating as the primary controller while the cloud computing instance 322 that originally operated as the secondary controller begins operating as the secondary controller again. In such an example, the cloud computing instance 320 that formerly operated as the primary controller may be terminated. Readers will appreciate that in alternative embodiments, the cloud computing instance 320 that is operating as the secondary controller after the failover event may continue to operate as the secondary controller and the cloud computing instance 322 that operated as the primary controller after the occurrence of the failover event may be terminated once the primary role has been assumed by the third cloud computing instance (not shown).

Readers will appreciate that while the embodiments described above relate to embodiments where one cloud computing instance 320 operates as the primary controller and the second cloud computing instance 322 operates as the secondary controller, other embodiments are within the scope of the present disclosure. For example, each cloud computing instance 320, 322 may operate as a primary controller for some portion of the address space supported by the cloud-based storage system 318, each cloud computing instance 320, 322 may operate as a primary controller where the servicing of I/O operations directed to the cloud-based storage system 318 are divided in some other way, and so on. In fact, in other embodiments where costs savings may be prioritized over performance demands, only a single cloud computing instance may exist that contains the storage controller application.

The cloud-based storage system 318 depicted in FIG. 3C includes cloud computing instances 340a, 340b, 340n with local storage 330, 334, 338. The cloud computing instances 340a, 340b, 340n depicted in FIG. 3C may be embodied, for example, as instances of cloud computing resources that may be provided by the cloud computing environment 316 to support the execution of software applications. The cloud computing instances 340a, 340b, 340n of FIG. 3C may differ from the cloud computing instances 320, 322 described above as the cloud computing instances 340a, 340b, 340n of FIG. 3C have local storage 330, 334, 338 resources whereas the cloud computing instances 320, 322 that support the execution of the storage controller application 324, 326 need not have local storage resources. The cloud computing instances 340a, 340b, 340n with local storage 330, 334, 338 may be embodied, for example, as EC2 M5 instances that include one or more SSDs, as EC2 R5 instances that include one or more SSDs, as EC2 I3 instances that include one or more SSDs, and so on. In some embodiments, the local storage 330, 334, 338 must be embodied as solid-state storage (e.g., SSDs) rather than storage that makes use of hard disk drives.

In the example depicted in FIG. 3C, each of the cloud computing instances 340a, 340b, 340n with local storage 330, 334, 338 can include a software daemon 328, 332, 336 that, when executed by a cloud computing instance 340a, 340b, 340n can present itself to the storage controller applications 324, 326 as if the cloud computing instance 340a, 340b, 340n were a physical storage device (e.g., one or more SSDs). In such an example, the software daemon 328, 332, 336 may include computer program instructions similar to those that would normally be contained on a storage device such that the storage controller applications 324, 326 can send and receive the same commands that a storage controller would send to storage devices. In such a way, the storage controller applications 324, 326 may include code that is identical to (or substantially identical to) the code that would be executed by the controllers in the storage systems described above. In these and similar embodiments, communications between the storage controller applications 324, 326 and the cloud computing instances 340a, 340b, 340n with local storage 330, 334, 338 may utilize iSCSI, NVMe over TCP, messaging, a custom protocol, or in some other mechanism.

In the example depicted in FIG. 3C, each of the cloud computing instances 340a, 340b, 340n with local storage 330, 334, 338 may also be coupled to block-storage 342, 344, 346 that is offered by the cloud computing environment 316. The block-storage 342, 344, 346 that is offered by the cloud computing environment 316 may be embodied, for example, as Amazon Elastic Block Store ('EBS') volumes. For example, a first EBS volume may be coupled to a first cloud computing instance 340a, a second EBS volume may be coupled to a second cloud computing instance 340b, and a third EBS volume may be coupled to a third cloud computing instance 340n. In such an example, the block-storage 342, 344, 346 that is offered by the cloud computing environment 316 may be utilized in a manner that is similar to how the NVRAM devices described above are utilized, as the software daemon 328, 332, 336 (or some other module) that is executing within a particular cloud comping instance 340a, 340b, 340n may, upon receiving a request to write data, initiate a write of the data to its attached EBS volume as well as a write of the data to its local storage 330, 334, 338 resources. In some alternative embodiments, data may only be written to the local storage 330, 334, 338 resources within a particular cloud comping instance 340a, 340b, 340n. In an alternative embodiment, rather than using the block-storage 342, 344, 346 that is offered by the cloud computing environment 316 as NVRAM, actual RAM on each of the cloud computing instances 340a, 340b, 340n with local storage 330, 334, 338 may be used as NVRAM, thereby decreasing network utilization costs that would be associated with using an EBS volume as the NVRAM.

In the example depicted in FIG. 3C, the cloud computing instances 340a, 340b, 340n with local storage 330, 334, 338 may be utilized, by cloud computing instances 320, 322 that support the execution of the storage controller application 324, 326 to service I/O operations that are directed to the cloud-based storage system 318. Consider an example in which a first cloud computing instance 320 that is executing the storage controller application 324 is operating as the primary controller. In such an example, the first cloud computing instance 320 that is executing the storage controller application 324 may receive (directly or indirectly via the secondary controller) requests to write data to the cloud-based storage system 318 from users of the cloud-based storage system 318. In such an example, the first cloud computing instance 320 that is executing the storage controller application 324 may perform various tasks such as, for example, deduplicating the data contained in the request, compressing the data contained in the request, determining where to the write the data contained in the request, and so on, before ultimately sending a request to write a deduplicated, encrypted, or otherwise possibly updated version of the data to one or more of the cloud computing instances 340a, 340b, 340n with local storage 330, 334, 338. Either cloud computing instance 320, 322, in some embodiments, may receive a request to read data from the cloud-based storage system 318 and may ultimately send a request to read data to one or more of the cloud computing instances 340a, 340b, 340n with local storage 330, 334, 338.

Readers will appreciate that when a request to write data is received by a particular cloud computing instance 340a, 340b, 340n with local storage 330, 334, 338, the software daemon 328, 332, 336 or some other module of computer program instructions that is executing on the particular cloud computing instance 340a, 340b, 340n may be configured to not only write the data to its own local storage 330, 334, 338 resources and any appropriate block-storage 342, 344, 346 that are offered by the cloud computing environment 316, but the software daemon 328, 332, 336 or some other module of computer program instructions that is executing on the particular cloud computing instance 340a, 340b, 340n may also be configured to write the data to cloud-based object storage 348 that is attached to the particular cloud computing instance 340a, 340b, 340n. The cloud-based object storage 348 that is attached to the particular cloud computing instance 340a, 340b, 340n may be embodied, for example, as Amazon Simple Storage Service ('S3') storage that is accessible by the particular cloud computing instance 340a, 340b, 340n. In other embodiments, the cloud computing instances 320, 322 that each include the storage controller application 324, 326 may initiate the storage of the data in the local storage 330, 334, 338 of the cloud computing instances 340a, 340b, 340n and the cloud-based object storage 348.

Readers will appreciate that, as described above, the cloud-based storage system 318 may be used to provide block storage services to users of the cloud-based storage system 318. While the local storage 330, 334, 338 resources and the block-storage 342, 344, 346 resources that are utilized by the cloud computing instances 340a, 340b, 340n may support block-level access, the cloud-based object storage 348 that is attached to the particular cloud computing instance 340a, 340b, 340n supports only object-based access. In order to address this, the software daemon 328, 332, 336 or some other module of computer program instructions that is executing on the particular cloud computing instance 340a, 340b, 340n may be configured to take blocks of data, package those blocks into objects, and write the objects to the cloud-based object storage 348 that is attached to the particular cloud computing instance 340a, 340b, 340n.

Consider an example in which data is written to the local storage 330, 334, 338 resources and the block-storage 342, 344, 346 resources that are utilized by the cloud computing instances 340a, 340b, 340n in 1 MB blocks. In such an example, assume that a user of the cloud-based storage system 318 issues a request to write data that, after being compressed and deduplicated by the storage controller application 324, 326 results in the need to write 5 MB of data. In such an example, writing the data to the local storage 330, 334, 338 resources and the block-storage 342, 344, 346 resources that are utilized by the cloud computing instances 340a, 340b, 340n is relatively straightforward as 5 blocks that are 1 MB in size are written to the local storage 330, 334, 338 resources and the block-storage 342, 344, 346 resources that are utilized by the cloud computing instances 340a, 340b, 340n. In such an example, the software daemon 328, 332, 336 or some other module of computer program instructions that is executing on the particular cloud computing instance 340a, 340b, 340n may be configured to: 1) create a first object that includes the first 1 MB of data and write the first object to the cloud-based object storage 348, 2) create a second object that includes the second 1 MB of data and write the second object to the cloud-based object storage 348, 3) create a third object that includes the third 1 MB of data and write the third object to the cloud-based object storage 348, and so on. As such, in some embodiments, each object that is written to the cloud-based object storage 348 may be identical (or nearly identical) in size. Readers will appreciate that in such an example, metadata that is associated with the data itself may be included in each object (e.g., the first 1 MB of the object is data and the remaining portion is metadata associated with the data).

Readers will appreciate that the cloud-based object storage 348 may be incorporated into the cloud-based storage system 318 to increase the durability of the cloud-based storage system 318. Continuing with the example described above where the cloud computing instances 340a, 340b, 340n are EC2 instances, readers will understand that EC2 instances are only guaranteed to have a monthly uptime of 99.9% and data stored in the local instance store only persists during the lifetime of the EC2 instance. As such, relying on the cloud computing instances 340a, 340b, 340n with local storage 330, 334, 338 as the only source of persistent data storage in the cloud-based storage system 318 may result in a relatively unreliable storage system. Likewise, EBS volumes are designed for 99.999% availability. As such, even relying on EBS as the persistent data store in the cloud-based storage system 318 may result in a storage system that is not sufficiently durable. Amazon S3, however, is designed to provide 99.999999999% durability, meaning that a cloud-based storage system 318 that can incorporate S3 into its pool of storage is substantially more durable than various other options.

Readers will appreciate that while a cloud-based storage system 318 that can incorporate S3 into its pool of storage is substantially more durable than various other options, utilizing S3 as the primary pool of storage may result in storage system that has relatively slow response times and relatively long I/O latencies. As such, the cloud-based storage system 318 depicted in FIG. 3C not only stores data in S3 but the cloud-based storage system 318 also stores data in local storage 330, 334, 338 resources and block-storage 342, 344, 346 resources that are utilized by the cloud computing instances 340a, 340b, 340n, such that read operations can be serviced from local storage 330, 334, 338 resources and the block-storage 342, 344, 346 resources that are utilized by the cloud computing instances 340a, 340b,

340n, thereby reducing read latency when users of the cloud-based storage system 318 attempt to read data from the cloud-based storage system 318.

In some embodiments, all data that is stored by the cloud-based storage system 318 may be stored in both: 1) the cloud-based object storage 348, and 2) at least one of the local storage 330, 334, 338 resources or block-storage 342, 344, 346 resources that are utilized by the cloud computing instances 340a, 340b, 340n. In such embodiments, the local storage 330, 334, 338 resources and block-storage 342, 344, 346 resources that are utilized by the cloud computing instances 340a, 340b, 340n may effectively operate as cache that generally includes all data that is also stored in S3, such that all reads of data may be serviced by the cloud computing instances 340a, 340b, 340n without requiring the cloud computing instances 340a, 340b, 340n to access the cloud-based object storage 348. Readers will appreciate that in other embodiments, however, all data that is stored by the cloud-based storage system 318 may be stored in the cloud-based object storage 348, but less than all data that is stored by the cloud-based storage system 318 may be stored in at least one of the local storage 330, 334, 338 resources or block-storage 342, 344, 346 resources that are utilized by the cloud computing instances 340a, 340b, 340n. In such an example, various policies may be utilized to determine which subset of the data that is stored by the cloud-based storage system 318 should reside in both: 1) the cloud-based object storage 348, and 2) at least one of the local storage 330, 334, 338 resources or block-storage 342, 344, 346 resources that are utilized by the cloud computing instances 340a, 340b, 340n.

As described above, when the cloud computing instances 340a, 340b, 340n with local storage 330, 334, 338 are embodied as EC2 instances, the cloud computing instances 340a, 340b, 340n with local storage 330, 334, 338 are only guaranteed to have a monthly uptime of 99.9% and data stored in the local instance store only persists during the lifetime of each cloud computing instance 340a, 340b, 340n with local storage 330, 334, 338. As such, one or more modules of computer program instructions that are executing within the cloud-based storage system 318 (e.g., a monitoring module that is executing on its own EC2 instance) may be designed to handle the failure of one or more of the cloud computing instances 340a, 340b, 340n with local storage 330, 334, 338. In such an example, the monitoring module may handle the failure of one or more of the cloud computing instances 340a, 340b, 340n with local storage 330, 334, 338 by creating one or more new cloud computing instances with local storage, retrieving data that was stored on the failed cloud computing instances 340a, 340b, 340n from the cloud-based object storage 348, and storing the data retrieved from the cloud-based object storage 348 in local storage on the newly created cloud computing instances. Readers will appreciate that many variants of this process may be implemented.

Consider an example in which all cloud computing instances 340a, 340b, 340n with local storage 330, 334, 338 failed. In such an example, the monitoring module may create new cloud computing instances with local storage, where high-bandwidth instances types are selected that allow for the maximum data transfer rates between the newly created high-bandwidth cloud computing instances with local storage and the cloud-based object storage 348. Readers will appreciate that instances types are selected that allow for the maximum data transfer rates between the new cloud computing instances and the cloud-based object storage 348 such that the new high-bandwidth cloud computing instances can be rehydrated with data from the cloud-based object storage 348 as quickly as possible. Once the new high-bandwidth cloud computing instances are rehydrated with data from the cloud-based object storage 348, less expensive lower-bandwidth cloud computing instances may be created, data may be migrated to the less expensive lower-bandwidth cloud computing instances, and the high-bandwidth cloud computing instances may be terminated.

Readers will appreciate that in some embodiments, the number of new cloud computing instances that are created may substantially exceed the number of cloud computing instances that are needed to locally store all of the data stored by the cloud-based storage system 318. The number of new cloud computing instances that are created may substantially exceed the number of cloud computing instances that are needed to locally store all of the data stored by the cloud-based storage system 318 in order to more rapidly pull data from the cloud-based object storage 348 and into the new cloud computing instances, as each new cloud computing instance can (in parallel) retrieve some portion of the data stored by the cloud-based storage system 318. In such embodiments, once the data stored by the cloud-based storage system 318 has been pulled into the newly created cloud computing instances, the data may be consolidated within a subset of the newly created cloud computing instances and those newly created cloud computing instances that are excessive may be terminated.

Consider an example in which 1000 cloud computing instances are needed in order to locally store all valid data that users of the cloud-based storage system 318 have written to the cloud-based storage system 318. In such an example, assume that all 1,000 cloud computing instances fail. In such an example, the monitoring module may cause 100,000 cloud computing instances to be created, where each cloud computing instance is responsible for retrieving, from the cloud-based object storage 348, distinct $\frac{1}{100,000}$th chunks of the valid data that users of the cloud-based storage system 318 have written to the cloud-based storage system 318 and locally storing the distinct chunk of the dataset that it retrieved. In such an example, because each of the 100,000 cloud computing instances can retrieve data from the cloud-based object storage 348 in parallel, the caching layer may be restored 100 times faster as compared to an embodiment where the monitoring module only create 1000 replacement cloud computing instances. In such an example, over time the data that is stored locally in the 100,000 could be consolidated into 1,000 cloud computing instances and the remaining 99,000 cloud computing instances could be terminated.

Readers will appreciate that various performance aspects of the cloud-based storage system 318 may be monitored (e.g., by a monitoring module that is executing in an EC2 instance) such that the cloud-based storage system 318 can be scaled-up or scaled-out as needed. Consider an example in which the monitoring module monitors the performance of the could-based storage system 318 via communications with one or more of the cloud computing instances 320, 322 that each are used to support the execution of a storage controller application 324, 326, via monitoring communications between cloud computing instances 320, 322, 340a, 340b, 340n, via monitoring communications between cloud computing instances 320, 322, 340a, 340b, 340n and the cloud-based object storage 348, or in some other way. In such an example, assume that the monitoring module determines that the cloud computing instances 320, 322 that are used to support the execution of a storage controller application 324, 326 are undersized and not sufficiently servicing the I/O requests that are issued by users of the cloud-based storage system 318. In such an example, the monitoring module may create a new, more powerful cloud computing instance (e.g., a cloud computing instance of a type that includes more processing power, more memory, etc. . . . ) that includes the storage controller application such that the new, more powerful cloud computing instance can begin operating as the primary controller. Likewise, if the monitoring module determines that the cloud computing instances 320, 322 that are used to support the execution of a storage controller application 324, 326 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

Consider, as an additional example of dynamically sizing the cloud-based storage system 318, an example in which the monitoring module determines that the utilization of the local storage that is collectively provided by the cloud computing instances 340a, 340b, 340n has reached a predetermined utilization threshold (e.g., 95%). In such an example, the monitoring module may create additional cloud computing instances with local storage to expand the pool of local storage that is offered by the cloud computing instances. Alternatively, the monitoring module may create one or more new cloud computing instances that have larger amounts of local storage than the already existing cloud computing instances 340a, 340b, 340n, such that data stored in an already existing cloud computing instance 340a, 340b, 340n can be migrated to the one or more new cloud computing instances and the already existing cloud computing instance 340a, 340b, 340n can be terminated, thereby expanding the pool of local storage that is offered by the cloud computing instances. Likewise, if the pool of local storage that is offered by the cloud computing instances is unnecessarily large, data can be consolidated and some cloud computing instances can be terminated.

Readers will appreciate that the cloud-based storage system 318 may be sized up and down automatically by a monitoring module applying a predetermined set of rules that may be relatively simple of relatively complicated. In fact, the monitoring module may not only take into account the current state of the cloud-based storage system 318, but the monitoring module may also apply predictive policies that are based on, for example, observed behavior (e.g., every night from 10 PM until 6 AM usage of the storage system is relatively light), predetermined fingerprints (e.g., every time a virtual desktop infrastructure adds 100 virtual desktops, the number of IOPS directed to the storage system increase by X), and so on. In such an example, the dynamic scaling of the cloud-based storage system 318 may be based on current performance metrics, predicted workloads, and many other factors, including combinations thereof.

Readers will further appreciate that because the cloud-based storage system 318 may be dynamically scaled, the cloud-based storage system 318 may even operate in a way that is more dynamic. Consider the example of garbage collection. In a traditional storage system, the amount of storage is fixed. As such, at some point the storage system may be forced to perform garbage collection as the amount of available storage has become so constrained that the storage system is on the verge of running out of storage. In contrast, the cloud-based storage system 318 described here can always 'add' additional storage (e.g., by adding more cloud computing instances with local storage). Because the cloud-based storage system 318 described here can always 'add' additional storage, the cloud-based storage system 318 can make more intelligent decisions regarding when to perform garbage collection. For example, the cloud-based storage system 318 may implement a policy that garbage collection only be performed when the number of IOPS being serviced by the cloud-based storage system 318 falls below a certain level. In some embodiments, other system-level functions (e.g., deduplication, compression) may also be turned off and on in response to system load, given that the size of the cloud-based storage system 318 is not constrained in the same way that traditional storage systems are constrained.

Readers will appreciate that embodiments of the present disclosure resolve an issue with block-storage services offered by some cloud computing environments as some cloud computing environments only allow for one cloud computing instance to connect to a block-storage volume at a single time. For example, in Amazon AWS, only a single EC2 instance may be connected to an EBS volume. Through the use of EC2 instances with local storage, embodiments of the present disclosure can offer multi-connect capabilities where multiple EC2 instances can connect to another EC2 instance with local storage ('a drive instance'). In such embodiments, the drive instances may include software executing within the drive instance that allows the drive instance to support I/O directed to a particular volume from each connected EC2 instance. As such, some embodiments of the present disclosure may be embodied as multi-connect block storage services that may not include all of the components depicted in FIG. 3C.

In some embodiments, especially in embodiments where the cloud-based object storage 348 resources are embodied as Amazon S3, the cloud-based storage system 318 may include one or more modules (e.g., a module of computer program instructions executing on an EC2 instance) that are configured to ensure that when the local storage of a particular cloud computing instance is rehydrated with data from S3, the appropriate data is actually in S3. This issue arises largely because S3 implements an eventual consistency model where, when overwriting an existing object, reads of the object will eventually (but not necessarily immediately) become consistent and will eventually (but not necessarily immediately) return the overwritten version of the object. To address this issue, in some embodiments of the present disclosure, objects in S3 are never overwritten. Instead, a traditional 'overwrite' would result in the creation of the new object (that includes the updated version of the data) and the eventual deletion of the old object (that includes the previous version of the data).

In some embodiments of the present disclosure, as part of an attempt to never (or almost never) overwrite an object, when data is written to S3 the resultant object may be tagged with a sequence number. In some embodiments, these sequence numbers may be persisted elsewhere (e.g., in a database) such that at any point in time, the sequence number associated with the most up-to-date version of some piece of data can be known. In such a way, a determination can be made as to whether S3 has the most recent version of some piece of data by merely reading the sequence number associated with an object—and without actually reading the data from S3. The ability to make this determination may be particularly important when a cloud computing instance with local storage crashes, as it would be undesirable to rehydrate the local storage of a replacement cloud computing instance with out-of-date data. In fact, because the cloud-based storage system 318 does not need to access the data to verify its validity, the data can stay encrypted and access charges can be avoided.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 314 that can scan each backup to identify backups that were captured before the malware infected the storage system and those backups that were captured after the malware infected the storage system. In such an example, the storage system may restore itself from a backup that does not include the malware—or at least not restore the portions of a backup that contained the malware. In such an example, the storage system may include software resources 314 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described above may be useful for supporting various types of software applications. For example, the storage system 306 may be useful in supporting artificial intelligence ('AI') applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

Such AI applications may enable devices to perceive their environment and take actions that maximize their chance of success at some goal. Examples of such AI applications can include IBM Watson, Microsoft Oxford, Google DeepMind, Baidu Minwa, and others. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation. Reinforcement learning may be employed to find the best possible behavior or path that a particular software application or machine should take in a specific situation. Reinforcement learning differs from other areas of machine learning (e.g., supervised learning, unsupervised learning) in that correct input/output pairs need not be presented for reinforcement learning and sub-optimal actions need not be explicitly corrected.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains. In addition to supporting the storage and use of blockchain technologies, the storage systems described above may also support the storage and use of derivative items such as, for example, open source blockchains and related tools that are part of the IBM™ Hyperledger project, permissioned blockchains in which a certain number of trusted parties are allowed to access the block chain, blockchain products that enable developers to build their own distributed ledger projects, and others. Blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW).

The storage systems described above may, either alone or in combination with other computing devices, be used to support in-memory computing applications. In-memory computing involves the storage of information in RAM that is distributed across a cluster of computers. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available—including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution intelligent personal assistant applications such as, for example, Amazon's Alexa, Apple Siri, Google Voice, Samsung Bixby, Microsoft Cortana, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain-computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to $2^n$ different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming though the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

Figure 3D:
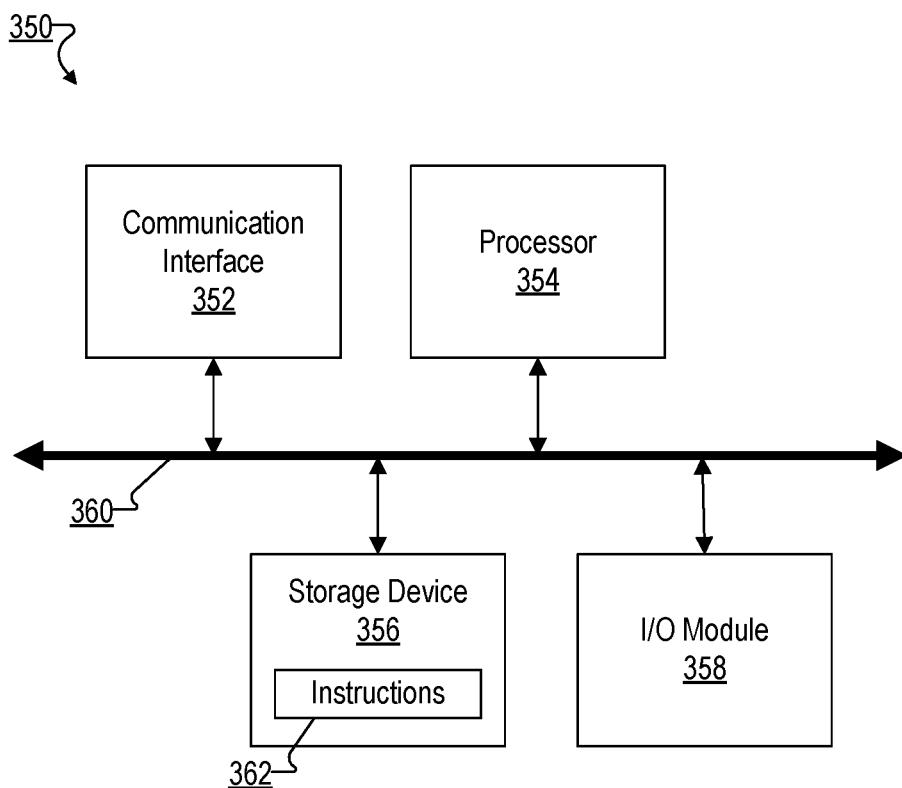
FIG. 3D illustrates an exemplary computing device that may be specifically configured to perform one or more of the processes described herein.

For further explanation, FIG. 3D illustrates an exemplary computing device 350 that may be specifically configured to perform one or more of the processes described herein. As shown in FIG. 3D, computing device 350 may include a communication interface 352, a processor 354, a storage device 356, and an input/output ("I/O") module 358 communicatively connected one to another via a communication infrastructure 360. While an exemplary computing device 350 is shown in FIG. 3D, the components illustrated in FIG. 3D are not intended to be limiting. Additional or alternative components may be used in other embodiments. Components of computing device 350 shown in FIG. 3D will now be described in additional detail.

Communication interface 352 may be configured to communicate with one or more computing devices. Examples of communication interface 352 include, without limitation, a wired network interface (such as a network interface card), a wireless network interface (such as a wireless network interface card), a modem, an audio/video connection, and any other suitable interface.

Processor 354 generally represents any type or form of processing unit capable of processing data and/or interpreting, executing, and/or directing execution of one or more of the instructions, processes, and/or operations described herein. Processor 354 may perform operations by executing computer-executable instructions 362 (e.g., an application, software, code, and/or other executable data instance) stored in storage device 356.

Storage device 356 may include one or more data storage media, devices, or configurations and may employ any type, form, and combination of data storage media and/or device. For example, storage device 356 may include, but is not limited to, any combination of the non-volatile media and/or volatile media described herein. Electronic data, including data described herein, may be temporarily and/or permanently stored in storage device 356. For example, data representative of computer-executable instructions 362 configured to direct processor 354 to perform any of the operations described herein may be stored within storage device 356. In some examples, data may be arranged in one or more databases residing within storage device 356.

I/O module 358 may include one or more I/O modules configured to receive user input and provide user output. I/O module 358 may include any hardware, firmware, software, or combination thereof supportive of input and output capabilities. For example, I/O module 358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 350.

Figure 4:
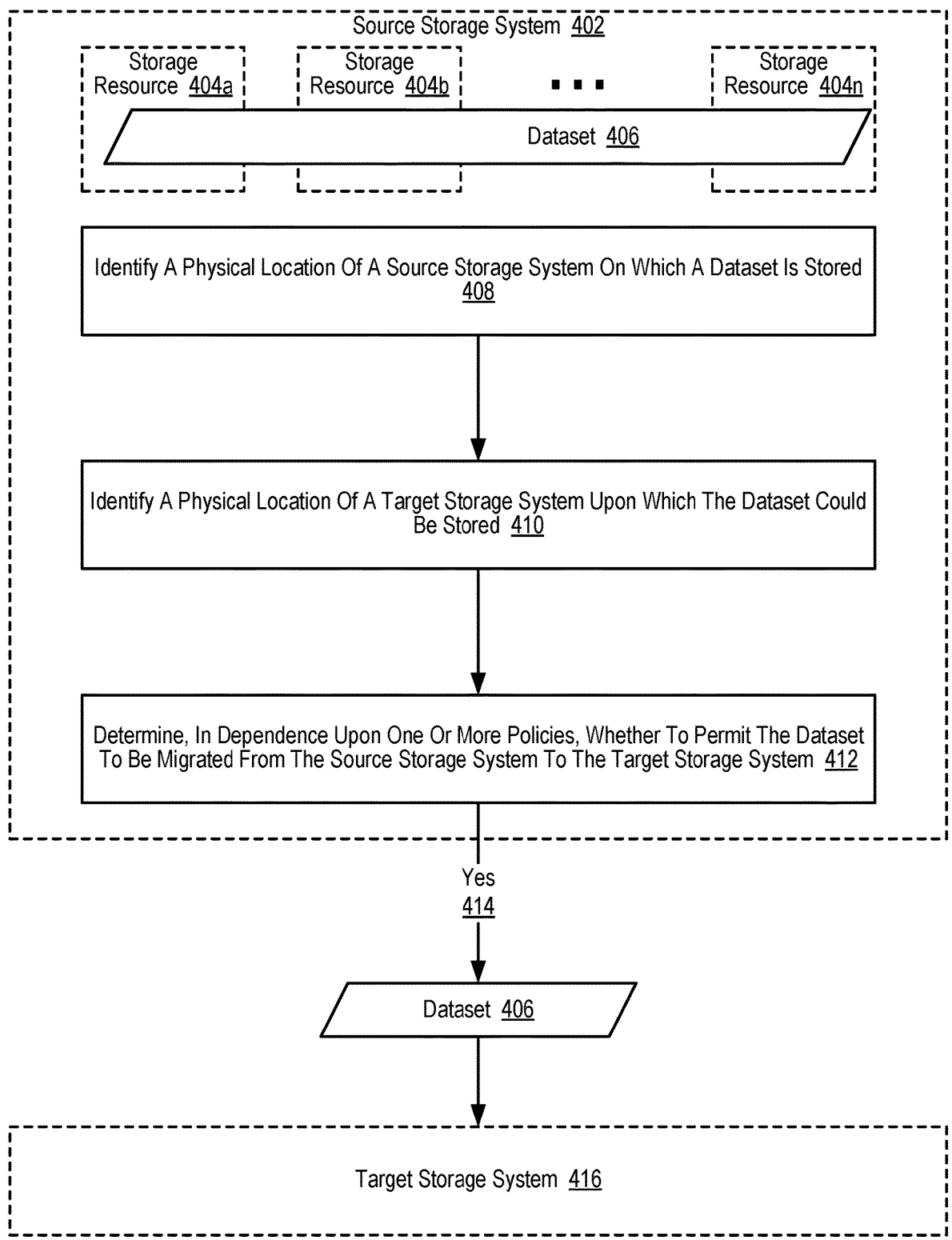
FIG. 4 sets forth a flow chart illustrating an example method of ensuring compliance with geography-based data movement restrictions in accordance with some embodiments of the present disclosure.

For further explanation, FIG. 4 sets forth a flow chart illustrating an example method of ensuring compliance with geography-based data movement restrictions in accordance with some embodiments of the present disclosure. A geography-based data movement restriction may be embodied, for example, as a regulation such as the General Data Protection Regulation ('GDPR') that includes data sovereignty restrictions that effectively create restrictions on the ability to transfer personal data outside the European Union ('EU') and European Economic Area ('EEA'). Readers will appreciate that other forms of geography-based data movement restrictions may exist, for example, because moving data outside of a particular geographic area may be prohibited by law, because moving data outside of a particular geographic area may cause the party that stores the data to be subjected to a different set of regulations or requirements, or for many other reasons.

The example method depicted in FIG. 4 includes a source storage system (402) and a target storage system (416), each of which may be embodied as any of the storage systems described above, including variations of such storage systems that include fewer or additional components. The source storage system (402) is depicted as including a plurality of storage devices (404a, 404b, 404n) that are used to store a dataset (406). In the example depicted in FIG. 4, the dataset (406) is illustrated as being stored across a multiple storage devices (404a, 404b, 404n) (e.g., as a RAID stripe), although storing the dataset (406) across multiple storage devices (404a, 404b, 404n) is not required.

The example method depicted in FIG. 4 includes identifying (408) a physical location of a source storage system (402) on which a dataset (406) is stored. Identifying (408) a physical location of a source storage system (402) on which a dataset (406) is stored may be carried out, for example, through the use of one or more physical devices such as a global positioning system ('GPS') transmitter that is affixed to the source storage system (402). In such an example, the GPS coordinates of the source storage system (402) could be identified via data communications with the GPS transmitter. Readers will appreciate that in other embodiments, other devices may be utilized to infer the physical location. For example, a Bluetooth transmitter may be utilized such that, so long as the Bluetooth transmitter is reachable from a known physical location, the source storage system (402) may be inferred to be within a predetermined radius of the known physical location. In other embodiments, other mechanisms may be used such as, for example, encoding the location of the source storage system (402) into read-only memory that is included within the source storage system (402).

The example method depicted in FIG. 4 also includes identifying (410) a physical location of a target storage system (416) upon which the dataset (406) could be stored. Identifying (410) a physical location of a target storage system (416) upon which the dataset (406) could be stored may be carried out in similar ways as described above, including through the use of hardware devices such a GPS transmitter that are affixed to the target storage system (416), through the use of other devices to infer the physical location, or in other ways. In the example depicted in FIG. 4, the target storage system (416) is a storage system upon which the dataset (406) 'could' be stored in the sense that the dataset (406) is not stored on the target storage system (416) when the physical location of the target storage system (416) is identified (410).

The example method depicted in FIG. 4 also includes determining (412), in dependence upon one or more policies, whether to permit the dataset (406) to be migrated from the source storage system (402) to the target storage system (416). The one or more policies may be embodied, for example, as rules that govern locations within which a dataset can be migrated, rules that govern locations within which a dataset cannot be migrated, or some combination thereof.

Consider the example described above where the geography-based data movement restriction is embodied as the GDPR, which that includes restrictions on the ability to transfer personal data outside the EU and EEA. In such an example, the one or more policies may include a geographical boundary that bounds the EU and EEA, such that data is not allowed to be moved across such a geographical boundary without violating the one or more policies. The one or more policies may take the form, for example, of a table or other data structure that associates source locations with permissible target locations, of a table or other data structure that associates source locations with impermissible target locations, or in some other way. In such an example, the source locations and target locations may be specified as particular geographical coordinates, as a range of geographical coordinates (e.g., source location includes latitudinal values between $X_0$ and $X_1$, as well as longitudinal values between $Y_0$ and $Y_1$), or in some other way.

Readers will further appreciate that different types of data may be subject to different policies. For example, data that includes personal information may be subject to one set of policies while data that does not include personal information may be subject to a different set of policies. Likewise, data that includes confidential information may be subject to one set of policies while data that does not include confidential information may be subject to a different set of policies. In such an example, the source storage systems and the target storage systems may store the different types of data in distinct logical or physical constructs. For example, data that includes personal information may be stored in a first volume whereas data that does not include personal information may be stored in a second volume, such that policies could be implemented on a per-volume basis.

In the example method depicted in FIG. 4, if it is affirmatively (414) determined (412) to permit the dataset (406) to be migrated from the source storage system (402) to the target storage system (416), a transfer of the dataset (406) from the source storage system (402) to the target storage system (416) may be performed. If it is determined, however, that the dataset (406) cannot be migrated from the source storage system (402) to the target storage system (416), a transfer of the dataset (406) from the source storage system (402) to the target storage system (416) should be prohibited.

Figure 5:
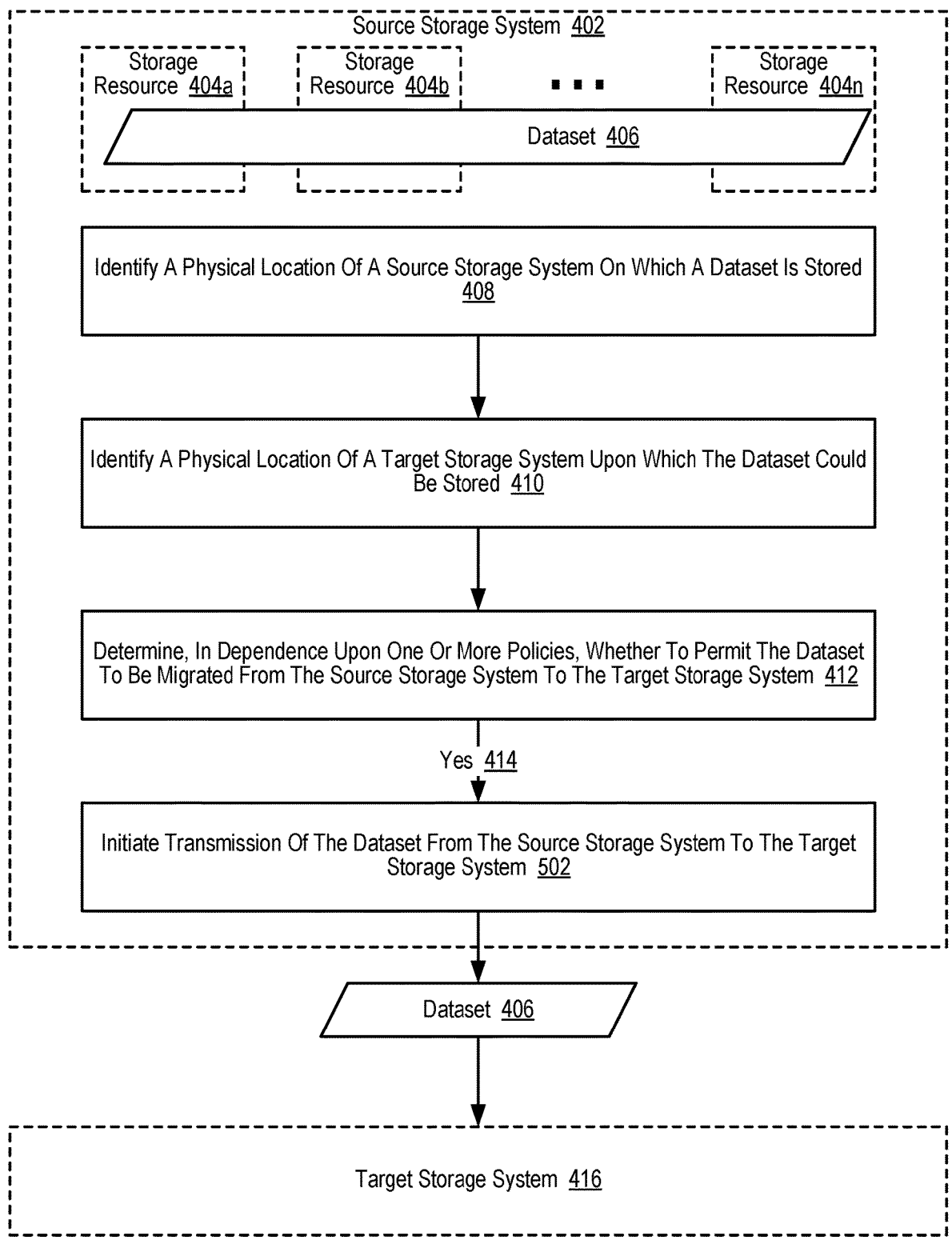
FIG. 5 sets forth a flow chart illustrating an additional example method of ensuring compliance with geography-based data movement restrictions in accordance with some embodiments of the present disclosure.

For further explanation, FIG. 5 sets forth a flow chart illustrating an additional example method of ensuring compliance with geography-based data movement restrictions in accordance with some embodiments of the present disclosure. The example method depicted in FIG. 5 is similar to the example method depicted in FIG. 4, as the example method depicted in FIG. 5 also includes identifying (408) a physical location of a source storage system (402) on which a dataset (406) is stored, identifying (410) a physical location of a target storage system (416) upon which the dataset (406) could be stored, and determining (412), in dependence upon one or more policies, whether to permit the dataset (406) to be migrated from the source storage system (402) to the target storage system (416).

The example method depicted in FIG. 5 also includes, responsive to affirmatively (414) determining to permit the dataset (406) to be migrated from the source storage system (402) to the target storage system (416), initiating (502) transmission of the dataset (406) from the source storage system (402) to the target storage system (416). Initiating (502) transmission of the dataset (406) from the source storage system (402) to the target storage system (416) may be carried out, for example, by alerting (e.g., via one or more messages or in some other way) the source storage system (402) that it is free to transmit the dataset (406) to the target storage system (416). In such an example, the source storage system (402) may transmit the dataset (406) to the target storage system (416) via one or more messages, or in some other way, at which point the target storage system (416) can receive the dataset (406) and store the dataset (406) within its own storage resources.

Figure 6:
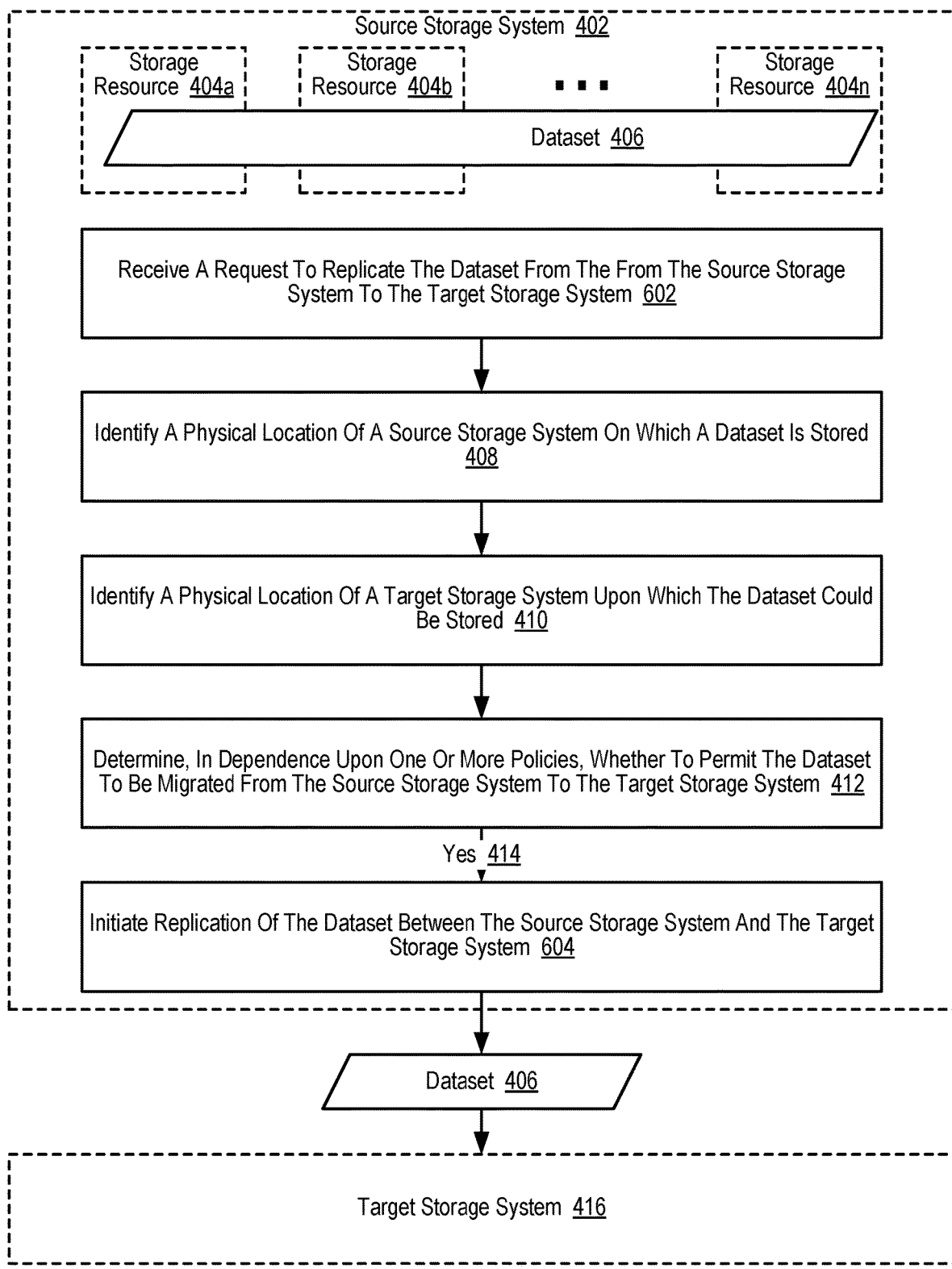
FIG. 6 sets forth a flow chart illustrating an additional example method of ensuring compliance with geography-based data movement restrictions in accordance with some embodiments of the present disclosure.

For further explanation, FIG. 6 sets forth a flow chart illustrating an additional example method of ensuring compliance with geography-based data movement restrictions in accordance with some embodiments of the present disclosure. The example method depicted in FIG. 6 is similar to the example method depicted in FIG. 4, as the example method depicted in FIG. 6 also includes identifying (408) a physical location of a source storage system (402) on which a dataset (406) is stored, identifying (410) a physical location of a target storage system (416) upon which the dataset (406) could be stored, and determining (412), in dependence upon one or more policies, whether to permit the dataset (406) to be migrated from the source storage system (402) to the target storage system (416).

The example method depicted in FIG. 6 also includes receiving (602) a request to replicate the dataset (406) from the from the source storage system (402) to the target storage system (416). The request to replicate the dataset (406) from the from the source storage system (402) to the target storage system (416) may be received (602), for example, via one or more messages received from the target storage system (416), from a replication service, from a system administrator via a CLI or other interface, or from some other entity. In other embodiments, the request to replicate the dataset (406) from the source storage system (402) to the target storage system (416) may take the form of an exploratory inquiry to determine whether replication between the source storage system (402) to the target storage system (416). For example, the source storage system (402) or some other entity may begin a process whereby possible replication targets are identified for the dataset (406). As part of that process, an evaluation may be made as to whether replication between the source storage system (402) and the target storage system (416) can occur without violating the one or more policies. As such, initiating such a process may represent a request to replicate the dataset (406) from the from the source storage system (402) to the target storage system (416).

The example method depicted in FIG. 6 also includes, responsive to affirmatively (414) determining to permit the dataset (406) to be migrated from the source storage system (402) to the target storage system (416), initiating (604) replication of the dataset (406) between the source storage system (402) and the target storage system (416). Initiating (604) replication of the dataset (406) between the source storage system (402) and the target storage system (416) may be carried out, for example, by creating a replication schedule (e.g., the source storage system (402) is to replicate the dataset (406) to the target storage system (416) every 12 hours), by initiating the transmission of the dataset (406) from the source storage system (402) to the target storage system (416) and also setting a replication schedule, or in many other ways. In fact, in situations where replication is to be synchronous (e.g., modifications to the dataset are not acknowledged until copies of the dataset (406) on the source storage system (402) and the target storage system (416) have been separately modified), initiating (604) replication of the dataset (406) between the source storage system (402) and the target storage system (416) may be carried out by creating and enforcing a synchronous replication relationship between the two storage systems (402, 416). Readers will appreciate that replication may be carried out, for example, through by transferring snapshots of the dataset (406), by transferring only the portions of the dataset (406) that have been modified since a particular point in time (including the last time that a replication operation was performed), or in many other ways.

Figure 7:
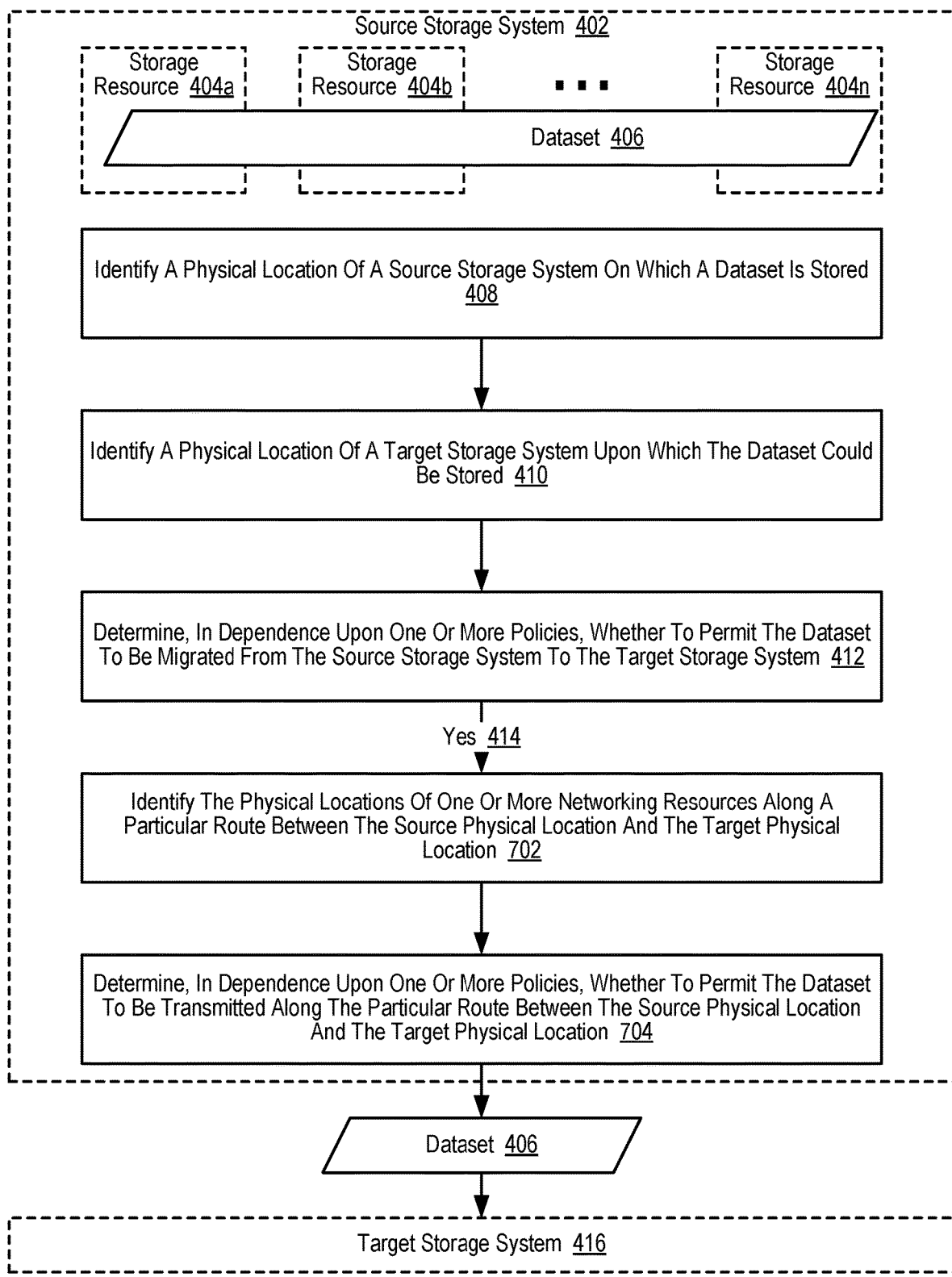
FIG. 7 sets forth a flow chart illustrating an additional example method of ensuring compliance with geography-based data movement restrictions in accordance with some embodiments of the present disclosure.

For further explanation, FIG. 7 sets forth a flow chart illustrating an additional example method of ensuring compliance with geography-based data movement restrictions in accordance with some embodiments of the present disclosure. The example method depicted in FIG. 7 is similar to the example method depicted in FIG. 4, as the example method depicted in FIG. 7 also includes identifying (408) a physical location of a source storage system (402) on which a dataset (406) is stored, identifying (410) a physical location of a target storage system (416) upon which the dataset (406) could be stored, and determining (412), in dependence upon one or more policies, whether to permit the dataset (406) to be migrated from the source storage system (402) to the target storage system (416).

The example method depicted in FIG. 7 also includes identifying (702) the physical locations of one or more networking resources along a particular route between the source physical location (i.e., the physical location of the source storage system) and the target physical location (i.e., the physical location of the target storage system). Readers will appreciate that multiple data communications routes may exist between the source storage system (402) and the target storage system (416), including routes that include a subset of the same networking resources (e.g., routers, switches) and routes that include completely independent networking resources. As such, in some embodiments, the physical locations of the networking resources that collectively form a particular route may be identified (702) in similar ways as described above.

The example method depicted in FIG. 7 also includes determining (704), in dependence upon one or more policies, whether to permit the dataset (406) to be transmitted along the particular route between the source physical location and the target physical location. Determining (704) whether to permit the dataset (406) to be transmitted along the particular route between the source physical location and the target physical location may be carried out, for example, by determining whether transmitting the dataset (406) to or from any of the networking resources the particular route would violate the one or more policies. If transmitting the dataset (406) to or from any of the networking resources the particular route would not violate the one or more policies, the particular route may be used for data communications between the source storage system (402) and the target storage system (416). If transmitting the dataset (406) to or from any of the networking resources the particular route would violate the one or more policies, however, the particular route may be excluded from use for data communications between the source storage system (402) and the target storage system (416).

Figure 8:
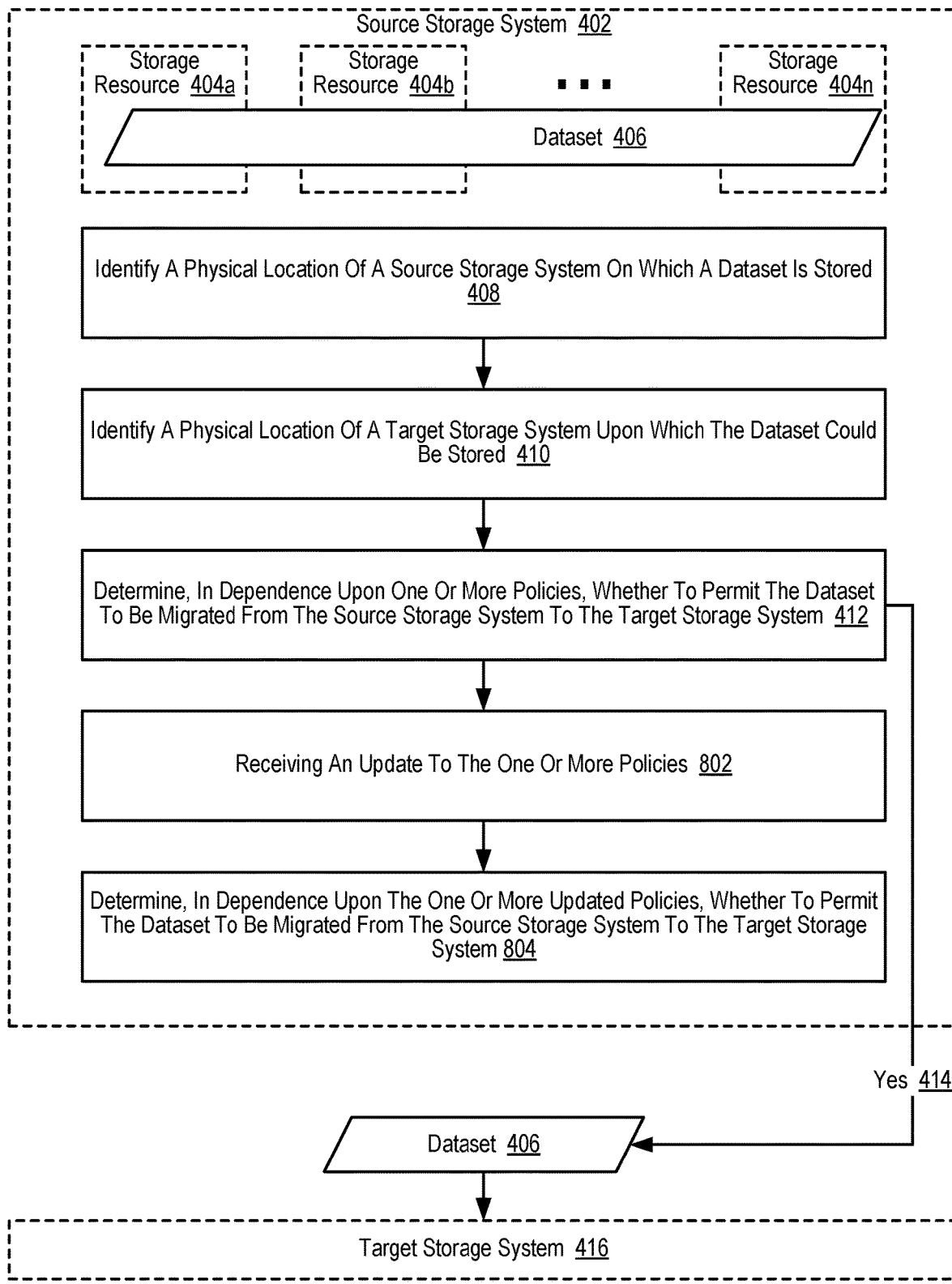
FIG. 8 sets forth a flow chart illustrating an additional example method of ensuring compliance with geography-based data movement restrictions in accordance with some embodiments of the present disclosure.

For further explanation, FIG. 8 sets forth a flow chart illustrating an additional example method of ensuring compliance with geography-based data movement restrictions in accordance with some embodiments of the present disclosure. The example method depicted in FIG. 8 is similar to the example method depicted in FIG. 4, as the example method depicted in FIG. 8 also includes identifying (408) a physical location of a source storage system (402) on which a dataset (406) is stored, identifying (410) a physical location of a target storage system (416) upon which the dataset (406) could be stored, and determining (412), in dependence upon one or more policies, whether to permit the dataset (406) to be migrated from the source storage system (402) to the target storage system (416).

The example method depicted in FIG. 8 also includes receiving (802) an update to the one or more policies. Receiving (802) an update to the one or more policies may be carried out, for example, in response to a change in one or more geography-based data movement restrictions, in response to receiving more accurate or more refined boundary information that should be enforced by the one or more policies, or for a variety of other reasons.

The example method depicted in FIG. 8 also includes determining (804), in dependence upon the one or more updated policies, whether to permit the dataset (406) to be migrated from the source storage system (402) to the target storage system (416). Determining (804), in dependence upon the one or more updated policies, whether to permit the dataset (406) to be migrated from the source storage system (402) to the target storage system (416) may be carried out as described above, using the updated one or more policies instead of the previous version of the one or more policies. In such an example, if migrating the dataset (406) from the source storage system (402) to the target storage system (416) did not violate the previous policies, but now violates the one or more updated policies, remedial actions may be taken to remove the dataset (406) from the target storage system (416) (e.g., deleting the dataset (406) from the target storage system (416)).

Although the steps depicted in FIGS. 4-8 are performed by the source storage system (402), in some embodiments, some or all of the steps depicted in FIGS. 4-8 may be performed elsewhere. For example, some or all of the steps described in FIGS. 4-8 may be performed by a cloud-based service. The cloud-based service may be embodied as one or more modules of computer program instructions that are executing on computer hardware, executing on virtualized computer hardware (e.g., one or more virtual machines), executing in a container, or executing in some other way. In such an example, the cloud-based service may be executing in a public cloud environment such as Amazon AWS or Microsoft Azure, executing on a private cloud, executing on a hybrid cloud, or any combination thereof.

The cloud-based service may include computer program instructions that, when executed, carry out the steps of:
  Identifying a physical location of a source storage system on which a dataset is stored and identifying a physical location of a target storage system upon which the dataset could be stored. The cloud-based service may identify the physical locations of the source storage system or the target storage system, for example, through an API or other interface to a GPS receiver that receives location information from GPS transmitters that are affixed to the source storage system and the target storage systems respectively. The cloud-based service may alternatively the physical locations of the source storage system or the target storage system in other ways as described above.
  Determining, in dependence upon one or more policies, whether to permit the dataset to be migrated from the source storage system to the target storage system. The cloud-based service may determine whether to permit the dataset to be migrated from the source storage system to the target storage system, for example, by comparing location information for each of the storage systems to a table or other data structure that includes geographical information as described above, or in some other way as described above.
  Initiating transmission of the dataset from the source storage system to the target storage system in response to determining to permit the dataset to be migrated from the source storage system to the target storage system. Initiating transmission of the dataset from the source storage system to the target storage system may be carried out, for example, by sending an instruction to the source storage system to begin transmitting the dataset or as otherwise described above.
  Receiving a request to replicate the dataset from the from the source storage system to the target storage system and initiating replication of the dataset between the source storage system and the target storage system in response to determining to permit the dataset to be migrated from the source storage system to the target storage system as described in greater detail above, including as part of an exploratory process to identify potential replication targets.

Identifying the physical locations of one or more networking resources along a particular route between the source physical location and the target physical location and determining, in dependence upon one or more policies, whether to permit the dataset to be transmitted along the particular route between the source physical location and the target physical location, as described in greater detail above.

Receiving an update to the one or more policies and determining, in dependence upon the one or more updated policies, whether to permit the dataset to be migrated from the source storage system to the target storage system, as described in greater detail above.

In some of the embodiments described above, the one or more policies have been certified for compliance with the geography-based data movement restrictions. Certifying the one or more policies for compliance with the geography-based data movement restrictions may be carried out in a variety of ways. Continuing with the example where the geography-based data movement restriction is embodied as the GDPR, which that includes restrictions on the ability to transfer personal data outside the EU and EEA, certifying the one or more policies may be carried out by a $3^{rd}$ party auditor, government entity, or other appropriate entity certifying that the policies adhere to the GDPR. In such an example, by having the one or more policies certified, the policies may be made available as-a-service or in some other way such that entities that desire to adhere to the GDPR can achieve such adherence by merely subscribing to a service and limiting data transfers to those that are authorized by the service.

In some of the embodiments described above, at least one of the storage systems (402, 416) is a cloud-based storage system as described above with reference to FIG. 3C. In such an example, the underlying resources that are used to form a cloud-based storage system may have physical location information that can be extracted. For example, object storage such as S3 is in a region that has certain geographical boundaries that can be identified from the Amazon maps. Likewise, the ECS instances that are used to form virtual drives and to form virtual controllers may exist in a single availability zone whose physical boundaries can be identified. As such, the cloud-based storage system may be treated as any other source storage system or treated as any other target storage system for the purpose of ensuring compliance with geography-based data movement restrictions.

Readers will appreciate that although the examples described above relate to embodiments where a dataset (406) is moved between a source storage system (402) and a target storage system (416), in other embodiments variations of the same steps may be used when the target endpoint is not a storage system. For example, a user may issue a request for the dataset via a mobile device, personal computer, or other form of a user device. In such an example, the steps described above may be modified to identifying (408) a physical location of the source storage system (402), identifying a physical location of the user device, and determining, in dependence upon one or more policies, whether to permit the dataset (406) to be sent from the source storage system (402) to the user device. Likewise, a server or other form of computing device may serve as a possible endpoint, such that the steps described above may be modified to identifying (408) a physical location of the source storage system (402), identifying a physical location of the computing device, and determining, in dependence upon one or more policies, whether to permit the dataset (406) to be sent from the source storage system (402) to the computing device. Readers will appreciate that the other steps described above may be modified in similar ways in dependence upon the nature of the target endpoint.

Readers will appreciate that embodiments described herein may include additional components that can be used to ensure compliance with other forms of restrictions. For example, the GDPR includes, in addition to data sovereignty regulations, data privacy regulations. Other regulations such as, for example, the Sarbanes-Oxley ('SOX') can create a situation in which the holder of data (e.g., a storage system) needs to essentially avoid deleting anything but also provide users with a right to have their data forgotten. In such an example, when storing data, the storage system may encrypt data with an encryption key, store the data, and provide the owner of the data with the encryption keys. In such an example, however, the storage system or storage service may no longer have access to the data because they have surrendered the encryption keys to the owner of the data. As such, the storage system or storage service can no longer ensure compliance with the relevant regulations because the storage system or storage service cannot ensure that the data's owner has retained the encryption keys.

In order to address the situation described in the preceding paragraph, embodiments of the present disclosure can include a cloud-based, encryption key storage service or similar mechanism. In such an example, the storage system or storage service may surrender encryption keys to both: 1) the owner of the data that is encrypted using the encryption key, and 2) the cloud-based, encryption key storage service or similar mechanism. Because the storage system or storage service has surrendered the keys, the storage system or storage service may not decrypt the data—thereby adhering to data privacy regulations. Because the storage system or storage service may request the encryption key from the cloud-based, encryption key storage service or similar mechanism, however, the storage system or storage service may ultimately be able to provide access to the data—thereby adhering to data retention regulations. Readers will appreciate that, in order to adhere to other forms of restrictions, other tools or mechanisms may be incorporated into embodiments described herein.

Figure 9:
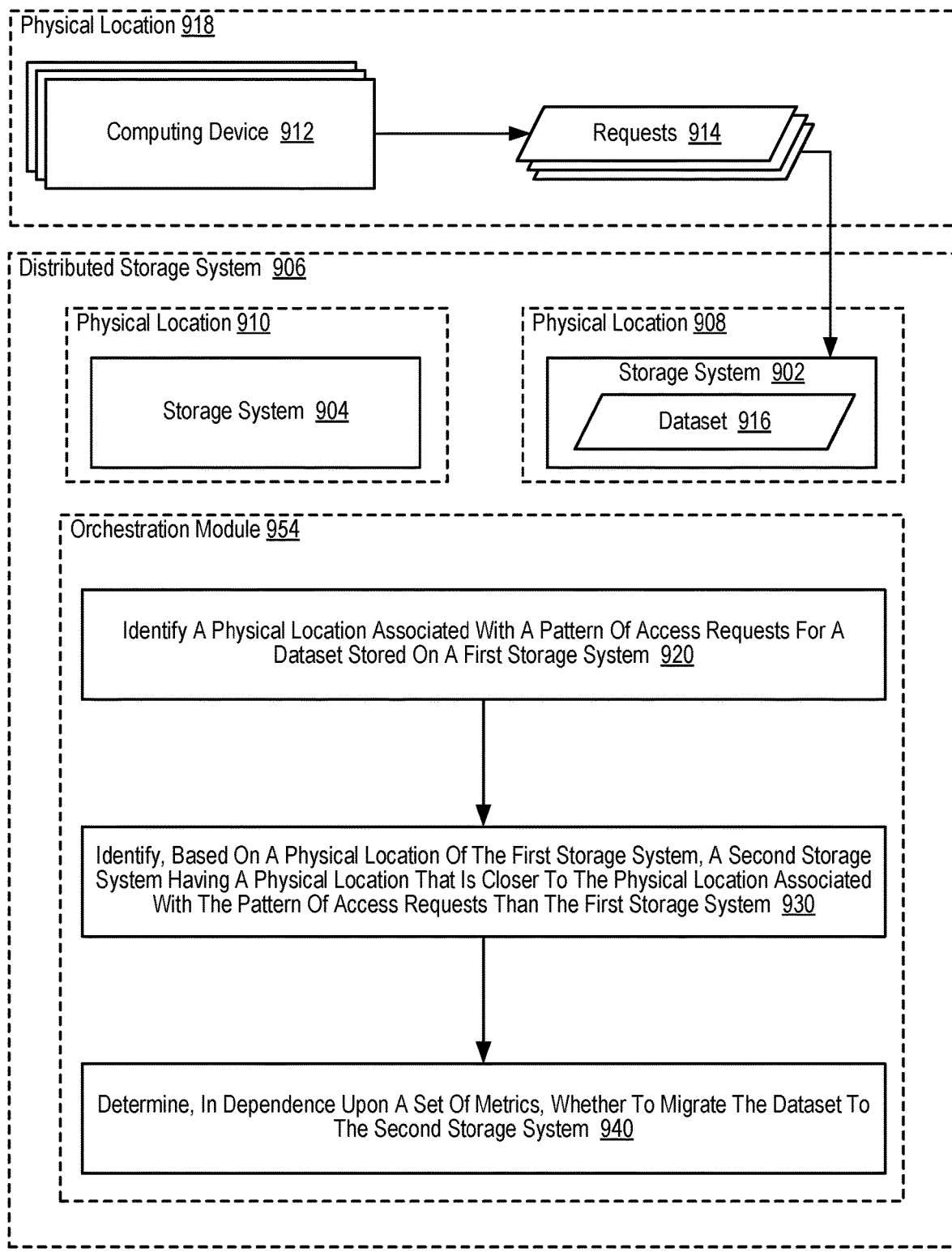
FIG. 9 sets forth a flow chart illustrating an example method of intelligently placing data in a distributed storage system in accordance with some embodiments of the present disclosure.

For further explanation, FIG. 9 sets forth a flow chart illustrating an example method of intelligently placing data in a distributed storage system in accordance with some embodiments of the present disclosure. The intelligent placement of data in a distributed storage system may be utilized, for example, by an organization such as a data services provider that seeks to place data in a distributed storage system such that the physical location of a storage device that stores the data is close in physical proximity to the device, such as the provider's edge server or a customer's local machine, that will execute the workload using the data, thereby reducing latency in data transfer and increasing the performance of the distributed storage system.

The example method depicted in FIG. 9 includes a source storage system (902) (hereafter the "first storage system") and a migration candidate storage system (904) (hereafter the "second storage system"), each of which may be embodied as any of the storage systems described above, including variations of such storage systems that include fewer or additional components. The first storage system (902) and the second storage system (904) are included in a distributed storage system (906), which be implemented as a distributed fleet of storage systems, a private cloud storage system, a public cloud storage system, a hybrid cloud storage system, and other configurations of storage systems in which at least some of the storage systems are not collocated. In one example, the first storage system (902) and the second storage system (904) are located on-premises but in different data centers of a storage network or private cloud belonging to an organization. In some examples, either or both the first storage system (902) and the second storage system (904) are embodied as cloud-based storage systems such as those described above with respect to FIG. 3C. In one example, the first storage system (902) is an on-premises storage system of a private cloud environment and the second storage system (904) is a cloud-based storage system of a public cloud environment (e.g., Amazon AWS or Microsoft Azure).

The first storage system (902) and the second storage system (904) may each be physically located in a respective location (908, 910). In some embodiments, the respective location (908, 910) of one or more of the storage systems (902, 904) may be determined as described above. In some embodiments, the locations (908, 910) may be represented by map-based geographic coordinate system (e.g., a point described by longitude and latitude coordinates), by a place name (city, state/province, country), or by a particular geographic boundary (e.g., time zone, area code, organizational region). In some examples, the locations (908, 910) of the respective storage systems (902, 904) may be determined from network topology information mapping the storage system identifiers to a respective location, location information stored within the storage system, a GPS transmitter attached to the storage system. In some examples, the locations (908, 910) of the respective storage systems (902, 904) may be inferred from their connectivity to other components in data center, such a network switches, routers, and other equipment of which the location is known. In some examples, the locations (908, 910) of the respective storage systems (902, 904) may be identified by their physical location in a cloud-based storage environment. For example, a geographic location of an S3 bucket or EBS volume may be determined based on the Amazon region or availability zone of the S3 bucket or EBS volume, as discussed above.

The example method depicted in FIG. 9 also includes one or more computing devices (912) that issue access requests (914) to a dataset (916) stored on the first storage system (902). The access requests (914) include read and write operations directed to the dataset (916), for example, as part of a workload executing on the computing device (912). For example, a computing device (912) may be a user's local machine that executes the workload, a computing device (912) may be a server hosting a virtual machine that executes the workload, or some other endpoint. In one example, a computing device (912) is an edge server in a public, private, or hybrid cloud environment that includes at least one of the storage systems (902, 904). In some examples, multiple computing devices (912) may issue access requests to the dataset (916) as part of a distributed computing workload. As discussed above, an AI platform may be used, based on telemetry data received from the first storage system (902), access patterns in the requests (914) directed to the dataset (916). For example, an access pattern may be represented in successive requests directed to the dataset (916) on the first storage system (902) over a particular period of time.

Each point or presence or endpoint (e.g., a computing device (912)) from which a request (914) is transmitted also has an associated physical location (918). For example, the physical location (918) that may be represented by map-based geographic coordinate system (e.g., a point described by longitude and latitude coordinates), by a place name (city, state/province, country), or by a particular geographic boundary (e.g., time zone, area code, organizational region), or the like. In some examples, the physical location is indicated by a geotag in the request. In the example of FIG. 9, the physical location is the physical location of the computing device (912) that transmitted the request(s). While, in the example of FIG. 9, the computing devices (912) are shown as sharing the same physical location (918), readers will appreciate that other computing devices that issue access requests directed to the dataset (916) may be located elsewhere. A pattern of requests (914) may be associated with a physical location based on a physical location associated with a point of presence from which the requests (914) constituting the pattern originate, or a physical location associated with an endpoint to which responses to the access requests (914) are sent. A series of success access requests (914) directed to the dataset (916) that originate from the source or group of sources may be recognized as an access pattern that is associated with a physical location of the source (e.g., the location (918) associated with one or more computing devices (912) transmitting the requests (914)).

In the example of FIG. 9, the physical location (918) of the computing device (912), and thus the physical location associated with the access pattern, may be determined in a variety of ways based on where the workload is executed. In one example, a computing device (912) may be a user's local machine that directly executes a workload from which the access requests (914) originate. In this example, the physical location (918) may be inferred from an IP address or other network identification associated with the computing device (912). In another example, the computing device (912) may be a server (e.g., an edge server) in an organization's private cloud environment that executes the workload from which the access requests (914) originate. In this example, the physical location (918) may be determined, for example, from network topology information mapping a server identifier to a physical location, from location information stored within the storage system, from a GPS transmitter attached to the storage system. In yet another example, the computing device (912) may be a server (e.g., an edge server) in a public cloud environment that executes the workload from which the access requests (914) originate. In this example, the physical location (918) may be determined, for example, from location information associated with the server obtained from the public cloud storage provider. For example, with respect to an Amazon EC2 instance, the physical location of the computing device (912) may be inferred from the Amazon region or availability zone to which the EC2 instance belongs. In some examples, the access requests (914) may include a geotag indicating a physical location. For example, a geotag may be included in metadata or a header of the request.

As data is transferred between the first storage system (902) and the workload utilizing the data, the data path between the first system and the computing device (912) hosting the workload may be examined to identify network performance metrics such as latency, bandwidth utilization, or workload completion time. For example, it may be ascertained that the data path between the first storage system (902) and the workload execution environment of the computing device (912) exhibits latencies in data transfer due to the distance between the first storage system (902) and the computing device (912). Further, it may be determined that the pattern of access requests (914) from the computing device (912) indicates that the latencies could degrade the performance of the distributed storage system and/or a cause a failure to meet metrics provided in a service level agreement (SLA). In such an example, another storage system (e.g., the second storage system (904)) may be identified as a candidate for migration of the dataset (916) such that the physical distance between the storage system storing the dataset (916) and the computing device (912) hosting the workload is reduced. In some examples, migration of the dataset (916) may involve migrating the dataset (916) from a storage system in a private cloud to a storage system in a public cloud or from a storage system in one cloud or cloud partition to a storage system in another cloud or cloud partition. In these examples, a cloud orchestrator as described above may be utilized for facilitate the migration of the dataset (916).

The example method depicted in FIG. 9 includes identifying (920) a physical location (918) associated with a pattern of access requests (914) for a dataset (916) stored on a first storage system (902). Identifying (920) a physical location (918) associated with a pattern of access requests (914) for a dataset (916) stored on a first storage system (902) may be carried out by identifying a pattern of access requests (914) directed to the dataset (916) and determining that the pattern of access requests (914) share common locality characteristics. In one example, the pattern of access requests (914) is determined from telemetry information reported by storage devices in a distributed storage system. In this example, the telemetry information may indicate an access request received for a particular dataset and identifying information of the application or workload that initiated the request and/or identifying information of the computing device that dispatched the request. As discussed above, an AI platform may be used to analyze the telemetry data to identify an access pattern. Locality characteristics of an access request may include a physical location of a computing device that executes the workload initiating the request or a physical location of computing device that serves as a point of presence (e.g., an edge server) in the organization's network. The physical location of a computing device associated with the request may be determined or inferred using methods discussed above. Locality characteristics of an access request may also include a geotag indicated in the request. For example, along with other information, metadata in the request may include a geotag indicating a geographical location associated with the request.

Consider an example where one or more computing devices (912) (e.g., a customer's local machine(s) or a server-hosted virtual machine(s)) issues a total 10,000 access requests (914) (e.g., read/write requests) to the dataset (916) every week. In this example, the one or more computing devices are all located in the same physical location (918) (e.g., Columbus, Ohio), which may be determined or inferred based on the IP addresses associated with the requests (914), based on a determination that the requests (914) are all received at the same point of presence (e.g., an edge server in the organization's cloud), based on a geotag in the requests (914), or through other mechanisms discussed above. In this example, also consider that there are few or no access requests directed the dataset (916) from other computing devices. Based on the identified pattern of access requests (914) to the dataset (916) and the identified physical location from which the access requests (914) originate, the physical location (918) (e.g., Columbus, OH) is associated with the pattern of access requests.

The example method depicted in FIG. 9 also includes identifying (930), based on a physical location (908) of the first storage system (902), a second storage system (904) having a physical location (910) that is closer to the physical location (918) associated with the pattern of access requests (914) than the first storage system (902). In one example, identifying (930), based on a physical location (908) of the first storage system (902), a second storage system (904) having a physical location (910) that is closer to the physical location (918) associated with the pattern of access requests (914) than the first storage system (902) is carried out identifying the physical location of the storage device that stores the dataset (916) and identifying another storage device in the distributed storage system (906) that is a candidate target for migration of the dataset (916). A storage device may be a candidate target for migration based on whether the storage device is closer in physical proximity to the physical location associated with the pattern of access requests (914), whether the storage device has sufficient storage resources to receive the dataset (916), whether migration of the dataset (916) to the storage system would be permitted in accordance with security or regulatory policies, and other factors that will be appreciated by those of skill in the art. Identifying the location of the first storage system (902) and the second storage system (904) may be carried out as discussed above, for example, from location information stored on the storage system, from network topology information indicating the physical location of the storage system or the physical location of the datacenter that contains the storage system, from a GPS transmitter affixed to the storage system, from a table that maps a storage system identifier to physical location information, from connectivity information, and through other mechanisms that will be appreciated by those of skill in the art. In some embodiments, physical location information for the dataset (916) may be stored in the dataset itself. For example, metadata in the dataset (916) may include a geotag.

Continuing the above example, it may be identified that the dataset is stored on a storage system in a core datacenter of an organization's private cloud and that the core datacenter is located in Seattle, Washington. Having identified that a pattern of access requests is associated with Columbus, Ohio, a storage system in the private cloud having a physical location in a datacenter in Pittsburgh, Pennsylvania may be identified as a candidate target for migration of the dataset, such that the dataset could be migrated to another storage system in the private cloud that is closer to the physical location associated with the dataset to reduce latency in servicing access requests. In another example, having identified that a pattern of access requests is associated with Columbus, Ohio, a cloud-based storage system in a public cloud having a physical location in a datacenter in Columbus, Ohio may be identified as a candidate target for migration of the dataset, such that the dataset could be migrated from the private cloud to the cloud-based storage system in the public cloud that is closer to the physical location associated with the dataset to reduce latency in servicing access requests.

The example method depicted in FIG. 9 also includes determining (940), in dependence upon a set of metrics, whether to migrate the dataset (916) to the second storage system (904). In some examples, determining (940), in dependence upon a set of metrics, whether to migrate the dataset (916) to the second storage system (904) is carried out by analyzing cost metrics and performance metrics associated with the migration. In these examples, performance metrics may include a latency metric in the data path between the computing device executing the workload and the source storage system storing the dataset and/or a bandwidth utilization metric in the data path between the computing device executing the workload and the source storage system storing the dataset. In these examples, performance metrics may include predicted performance metrics, such as an expected reduction in latency if the dataset is migrated to the second storage system, an expected reduction in bandwidth utilization if the dataset is migrated to the second storage system. In these examples, a cost metric may include an amount of time required to migrate the dataset to the second storage system based on the size of the dataset and the link between the first storage system and the second storage system, bandwidth utilization in the distributed storage system required to perform the migration, and/or processing resources utilized to perform the migration, as well as other network efficiency costs associated with migrating a dataset that will be appreciated by readers of skill in the art in view of the present disclosure. In some examples, where the second storage system is a cloud-based storage system in a public cloud, a cost metric may include a monetary cost associated with utilizing the public cloud services. In some examples, observed performance metrics in servicing the requests to the dataset may be compared to performance metrics established by an SLA, such that migration of the dataset to a second storage system advantageous to meet the performance metrics established in the SLA.

Readers of skill in the art in view of the present disclosure will appreciate that metrics other than the above-described may be relied upon in determining (940) whether to migrate the dataset (916) form the first storage system (902) to the second storage system (904). Readers of skill in the art in view of the present disclosure will also appreciate that other factors other than the above-described may be relied upon in determining (940) whether to migrate the dataset (916) form the first storage system (902) to the second storage system (904). For example, additional complexities may be introduced when orchestrating the migration of a dataset from one cloud to another cloud. In such examples, determining whether to migrate the dataset (916) form the first storage system (902) to the second storage system (904) may include determining, in dependence upon characteristics of a first cloud hosting the first storage system and characteristics of a second cloud hosting the second storage system, whether to migrate the dataset to the second storage system. Characteristics of the first cloud and the second cloud may include, for example, reliability characteristics, availability characteristics, and performance characteristics of the respective clouds and the cloud-based storage systems they include. In one example, determining (940) whether to migrate the dataset (916) form the first storage system (902) to the second storage system (904) may further include determining whether migration of the dataset is permitted in dependence upon security policies, as discussed above.

In the example method of FIG. 9, determining (940), in dependence upon a set of metrics, whether to migrate the dataset (916) to the second storage system (904) may include affirmatively determining that is advantageous (e.g., the performance increase outweighs the migration cost) to migrate the dataset (916) from the first storage system (902) to the second storage system (904), or determining that it is not advantageous (e.g., the migration cost outweighs the performance increase) to migrate the dataset (916) from the first storage system (902) to the second storage system (904).

Continuing the above example, it may be ascertained or predicted, based on telemetry data in the distributed storage system, that migrating the dataset from the first storage system in Seattle, Washington to the second storage system in Pittsburgh, Pennsylvania will reduce the latency in servicing access requests by an average of 2 seconds, as well as enhancing other performance metrics, resulting in a savings of 20,000 seconds per week based on the example access pattern described above. It may be further ascertained that, based on the size of the dataset and link bandwidth between the two storage systems, that the cost in terms of the amount of time required to perform the migration is 30 minutes. It such an example, based on these factors alone, migration of the dataset from the first storage system to the second storage system would be advantageous because the performance increase (~5.5 hours reduction in completion time) outweighs the migration cost (30 minutes).

In some embodiments, determining (940), in dependence upon a set of metrics, whether to migrate the dataset (916) to the second storage system (904) may include determining a data inventory for the second storage system (904). In some examples, determining a data inventory for the second storage system (904) may include identifying a snapshot differential between the first storage system and the second storage system to determine whether any portion of the dataset (916) is already present on the second storage system (904). For example, where the second storage system already stores a block of data that is also present in the dataset (916), the first storage system may provide a metadata update in lieu of copying that block of data to the second storage system such that the metadata update incorporates the already present block of data into the dataset (916) that is reconstituted on the second storage system (904). In this way, the amount of data that needs to be transferred between the first storage system and the second storage system is reduced, thus lowering the cost of the copy operation.

In some embodiments, the first storage system (902) and the second storage system (904) may be part of a fleet of storage systems including, for example, a third storage system. In such an example, it may be determined that a point of presence or workload presents a pattern of access requests to an dataset stored on the third storage system in addition to the dataset (916) stored on the first storage system. In this example, the additional dataset stored on the third storage system may be migrated to the second storage system (904), such that the second storage system (904) includes a larger dataset including the dataset (916) obtained from the first storage system (902) and the additional dataset obtained from the third storage system. In this way, datasets present on various storage systems in the fleet of storage systems that are the target of a workload executing on a particular computing device may be aggregated in particular storage system that is geographically closer to that computing device or point or presence.

In some examples, each storage system in the fleet of storage systems may present a data inventory. In these examples, each stored dataset or block of data may include a geotag that is indicated in metadata. For example, determining (940), in dependence upon a set of metrics, whether to migrate the dataset (916) to the second storage system (904), may include identifying whether the dataset (916) or portions thereof are located on other storage systems in the fleet of storage systems, and determining whether the dataset (916) may be reconstituted by copying respective portions of the dataset (916) from respective storage systems in the fleet of storage systems, thus reducing the burden on the first storage system (902) to copy all the data to the second storage system (904). For example, a third storage system may store a portion of the dataset (916), and a geotag for that data may indicate that the third storage system is geographically closer to the second storage system (904). In such an example, copying the portion of the dataset (916) from the third storage system may be more efficient due to the proximity to the second storage system and due to sharing the burden of the copying process.

Consider an example where a workload on a computing device presents an access pattern to data stored on a plurality of storage systems in the fleet of storage systems. In this example, each of the plurality of storage systems includes a data inventory and geotags for data. To reconstitute the data utilized by the workload on the second storage system (904) that is geographically closer to the computing device, copying operations from the plurality of storage systems to the second storage system (904) may be weighted, based on geotags and other metrics, to determine which storage systems of the plurality of storage systems that includes the data should act as the source for copying data utilized by the workload to the second storage system (904).

As a simplified example, consider a workload utilizes data blocks A, B, and C, and the data inventory for each of a plurality of storage systems indicates that the first storage system (902) stores data block A and data block B in the dataset (916), and that the third storage system stores data block B and data block C in an additional dataset. To reconstitute data blocks A, B, and C on the second storage system (904), data block A is copied to the second storage system (904) from the first storage system (902) and data block C is copied to the second storage system (904) from the third storage system. To determined which storage system should act as the source for data block B, the geotag for data block B in the first storage system (902) and the geotag for data block B in the third storage system may be used to weight the cost of copying data block B from each of those storage systems. The geotag for each block of data may be included in a data inventory identified for and shared among each storage system in the fleet of storage systems.

In some examples, data inventory for each storage system in the fleet of storage systems may be determined from snapshot differentials. In these examples, copying a dataset or a portion of a dataset from a source storage system to a target storage system in a fleet of storage systems may be accomplished by providing metadata updates. For example, if a particular block of data is already present on the target storage system, a metadata update may be used to incorporate that block of data into the dataset.

Figure 10:
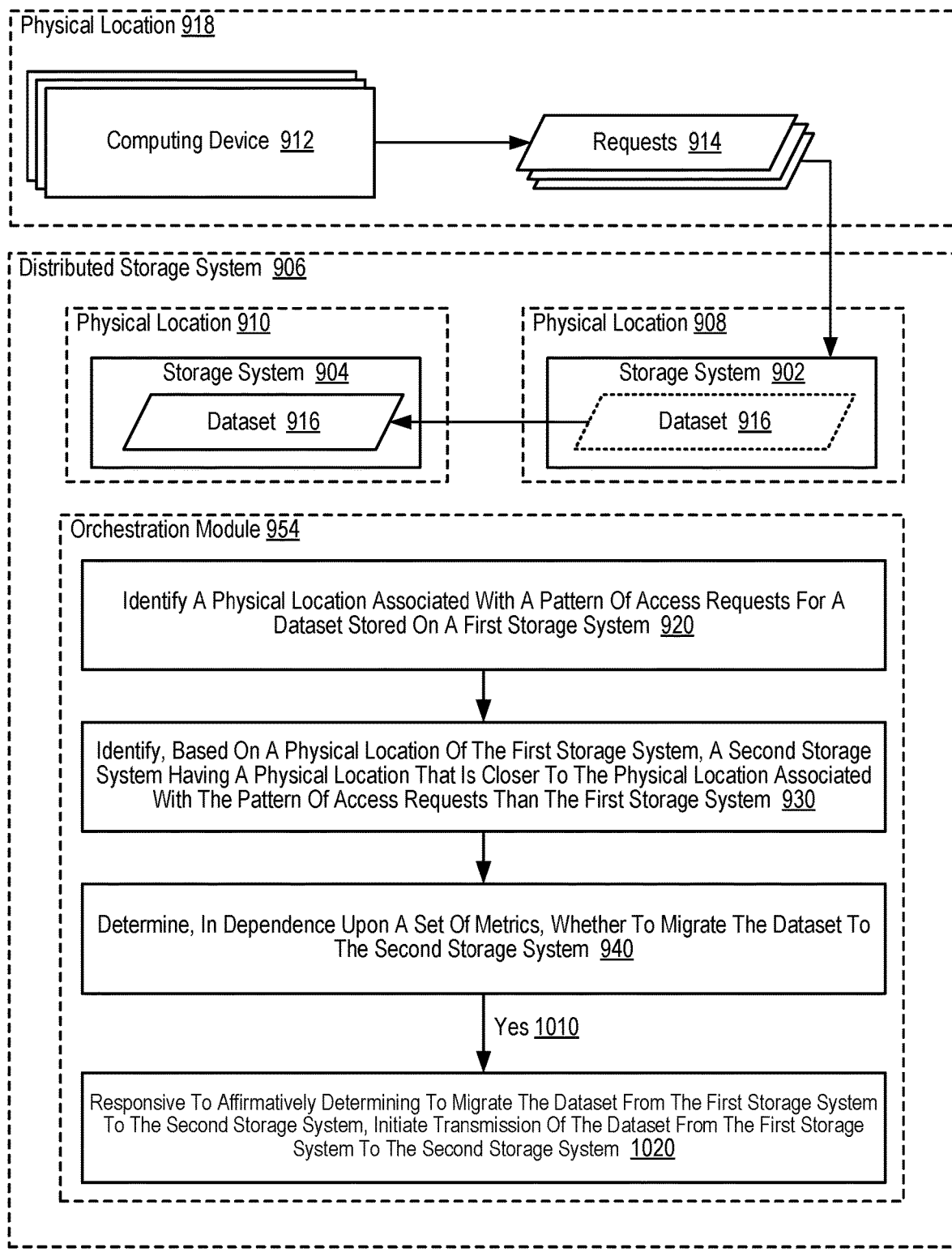
FIG. 10 sets forth a flow chart illustrating an additional example method of intelligently placing data in a distributed storage system in accordance with some embodiments of the present disclosure.

For further explanation, FIG. 10 sets forth a flow chart illustrating an additional example method of intelligently placing data in a distributed storage system in accordance with some embodiments of the present disclosure. The example method depicted in FIG. 10 is similar to the example method depicted in FIG. 9, as the example method depicted in FIG. 9 also includes identifying (920) a physical location (918) associated with a pattern of access requests (914) for a dataset (916) stored on a first storage system (902); identifying (930), based on a physical location (908) of the first storage system (902), a second storage system (904) having a physical location (910) that is closer to the physical location (918) associated with the pattern of access requests (914) than the first storage system (902); and determining (940), in dependence upon a set of metrics, whether to migrate the dataset (916) to the second storage system (904).

The example method depicted in FIG. 10 also includes, responsive to affirmatively (1010) determining to migrate the dataset (916) from the first storage system (902) to the second storage system (904), initiating (1020) transmission of the dataset (916) from the first storage system (902) to the second storage system (904). Initiating (1002) transmission of the dataset (916) from the first storage system (902) to the second storage system (904) may be carried out, for example, by directing (e.g., via one or more messages or in some other way) the first storage system (902) to transmit the dataset (916) to the second storage system (904). In such an example, the first storage system (902) may transmit the dataset (916) to the second storage system (904) via one or more messages, or in some other way, at which point the second storage system (904) can receive the dataset (916) and store the dataset (916) within its own storage resources.

Consider an example where a dataset is stored on an on-premises storage system in an organization's datacenter, and where the organization maintains a cloud computing instance on multiple edge servers of a public cloud so that a point of presence is maintained in different geographic regions. Using Amazon AWS for this example, the cloud computing instance may be an EC2 instance, such that a customer request to utilize data services provided by the organization will be handled by AWS to route the request to an edge server maintaining the EC2 instance nearest to the customer. In processing the workload, the EC2 instance sends access requests to the on-premises storage system in the organization's datacenter. In accordance with embodiments of the present disclosure, it may be ascertained that workload performance and network performance could improve if the dataset were migrated to an S3 bucket or EBS volume in the region or availability zone that includes the EC2 instance handling the workload (i.e., migrating a dataset closer to the physical location of the workload). Upon determining that the performance benefits of migrating the dataset from the on-premises storage system to the cloud-based storage system, migration of the dataset from the on-premises storage system to the cloud-based storage system may be initiated.

Figure 11:
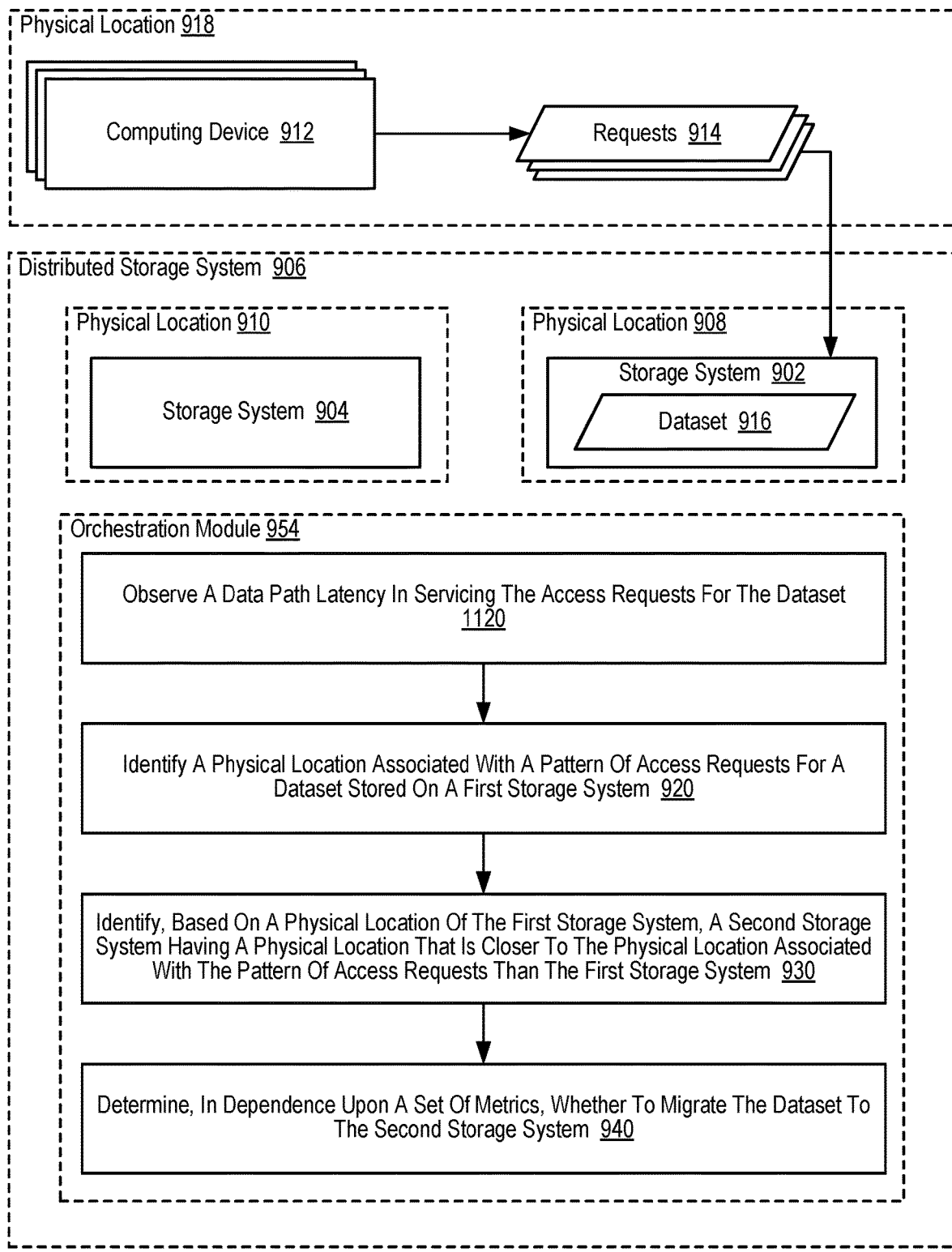
FIG. 11 sets forth a flow chart illustrating an additional example method of intelligently placing data in a distributed storage system in accordance with some embodiments of the present disclosure.

For further explanation, FIG. 11 sets forth a flow chart illustrating an additional example method of intelligently placing data in a distributed storage system in accordance with some embodiments of the present disclosure. The example method depicted in FIG. 11 is similar to the example method depicted in FIG. 9, as the example method depicted in FIG. 11 also includes identifying (920) a physical location (918) associated with a pattern of access requests (914) for a dataset (916) stored on a first storage system (902); identifying (930), based on a physical location (908) of the first storage system (902), a second storage system (904) having a physical location (910) that is closer to the physical location (918) associated with the pattern of access requests (914) than the first storage system (902); and determining (940), in dependence upon a set of metrics, whether to migrate the dataset (916) to the second storage system (904).

The example method depicted in FIG. 11 also includes observing (1120) a data path latency in servicing the access requests (914) for the dataset (916). Observing (1120) a data path latency in servicing the access requests (914) for the dataset (916) may be carried out by monitoring a data path between storage devices and points of presence of a cloud that includes the distributed storage system (906). In one example, monitoring a data path between storage devices and points of presence of the cloud that includes the distributed storage system (906) is carried out by analyzing telemetry data received from storage devices in the distributed storage system (906). In some examples, monitoring a data path between storage devices and points of presence of the cloud that includes the distributed storage system (906) is further carried out by analyzing telemetry data received from servers and other computing devices that act as the point of presence for a cloud. Upon identifying (920) the physical location (918) associated with the pattern of access requests (914) for the dataset (916) stored on the first storage system (902) and identifying the physical location (908) of the first storage system (902), the physical distance between the physical location (918) associated with the pattern of access requests (918) and the physical location (908) of the first storage system (902) can be identified as a factor contributing to the observed latency.

Figure 12:
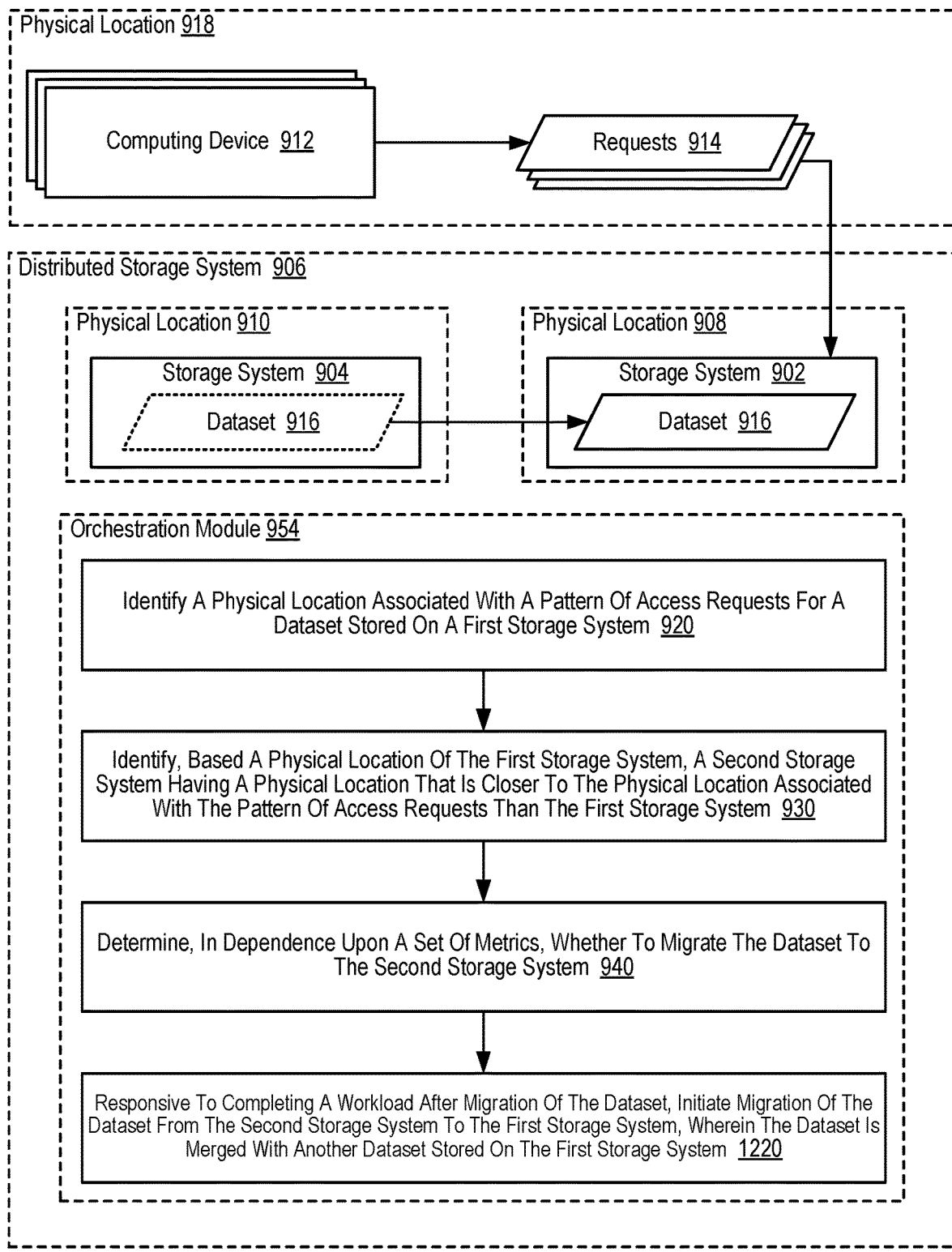
FIG. 12 sets forth a flow chart illustrating an additional example method of intelligently placing data in a distributed storage system in accordance with some embodiments of the present disclosure.

For further explanation, FIG. 12 sets forth a flow chart illustrating an additional example method of intelligently placing data in a distributed storage system in accordance with some embodiments of the present disclosure. The example method depicted in FIG. 12 is similar to the example method depicted in FIG. 9, as the example method depicted in FIG. 12 also includes identifying (920) a physical location (918) associated with a pattern of access requests (914) for a dataset (916) stored on a first storage system (902); identifying (930), based on a physical location (908) of the first storage system (902), a second storage system (904) having a physical location (910) that is closer to the physical location (918) associated with the pattern of access requests (914) than the first storage system (902); and determining (940), in dependence upon a set of metrics, whether to migrate the dataset (916) to the second storage system (904).

The example method depicted in FIG. 12 also includes, responsive to completing a workload after migration of the dataset, initiating (1220) migration of the dataset (916) from the second storage system to the first storage system, wherein the dataset (916) is merged with another dataset stored on the first storage system (902). In some examples, the dataset (916) stored on the first storage system (902) may be a subset of a larger dataset, such that an identified pattern of access requests that are directed to the dataset (916) that is a subset of a larger dataset, only the dataset (916) is migrated without migration of the entirety of the larger dataset. Upon identifying that a workload has completed, for example, by receiving a message indicating the workload has completed or identifying that the pattern of access requests (914) has changed, the dataset (916) may be migrated back to the first storage system. At the first storage system (902), the received dataset (916) may be incorporated into the original larger dataset from which the dataset (916) was extracted. In this way, the advantages of placing the dataset (916) closer to the point of presence may be realized without consuming the time and bandwidth needed to migrate the entirety of the larger dataset. In some examples, initiating (1220) migration of the dataset (916) from the second storage system to the first storage system is carried out by a method similar to that described above with respect to initiating (1020) transmission of the dataset (916) from the first storage system (902) to the second storage system (904).

In another embodiment in accordance with the present disclosure, at least two of the computing devices (912) may be quantum computing nodes. In one example, two quantum computing nodes (912) may utilize the dataset (916) stored on the first storage system (902). However, to realize the benefits of quantum computing, it is desirable to place data utilized by the quantum computing nodes in physical proximity to those nodes. In this example, identifying (920) a physical location (918) associated with a pattern of access requests (914) for a dataset (916) stored on a first storage system (902) may include identifying a correlation between access requests issued by two or more computing devices and identifying one or more physical locations associated with the correlation of access requests, and may also include identifying a transport path between the quantum computing nodes. In this example, identifying (930), based on a physical location (908) of the first storage system (902), a second storage system (904) having a physical location (910) that is closer to the physical location (918) associated with the pattern of access requests (914) than the first storage system (902) may include identifying at least one other storage system in the distribute storage system (906) that is closer in physical proximity to the two quantum computing nodes (912). In this example, determining (940), in dependence upon a set of metrics, whether to migrate the dataset (916) to the second storage system (904) may include determining that the performance of the quantum computing nodes could be improved if the dataset (916) were migrated from the first storage system (902) to the second storage system (904).

In the examples depicted in FIGS. 9-12, an orchestration module (954) is responsible for performing many of the steps described above. Such an orchestration module (954) may be embodied, for example, as one or more modules of computer program instructions that are executing on computer hardware such as a computer processor, as one or more modules of computer program instructions that are executing on virtualized computer hardware such as a virtual machine, as one or more modules of computer program instructions that are included in a container, or in some other way. Such an orchestration module (954) may be embodied, for example, as one or more modules of computer program instructions that are executing on computer hardware that is part of the storage systems (902, 904) themselves, as a centralized orchestration module (954) that executes in a cloud, as an orchestration module (954) that executes on dedicated hardware such as a management server, or in some other way. In an embodiment where the orchestration module (954) is not attached to a particular storage system (e.g., the orchestration module (954) is part of a cloud-based service), data communications between a particular storage system (902, 904) and the orchestration module (954) may be used to exchange information about data access patterns and telemetry data, and facilitate the performance of the steps described above.

Readers will appreciate that intelligently placing data in a distributed storage system in accordance with embodiments of the present disclosure facilitates the automatic determination of efficient data placement not just among a particular cluster of storage systems, but across multiple cloud environments without intervention by a network administrator. For example, the orchestration module may be embodied in an orchestrated stack of automated intelligence with interfaces to and awareness of applications and workload, data transport and workflow, storage controllers, data inventory, network topology, and other facets of the distributed storage system that inform the decision to place data in a particular geographic location within the enterprise to improve the expediency and efficiency of data processing and storage services provided to customers. In various examples, the orchestration module may be embodied in software that is deployed in a core datacenter, in storage systems around the enterprise, or within a cloud management plane. In some examples, the orchestration module may be implemented in a SaaS or PaaS provided to an enterprise by a cloud services provider. The described embodiments alleviate the burden on network administers in determining where data in a distributed storage system should be placed to minimize inefficiencies in the network.

Figure 13:
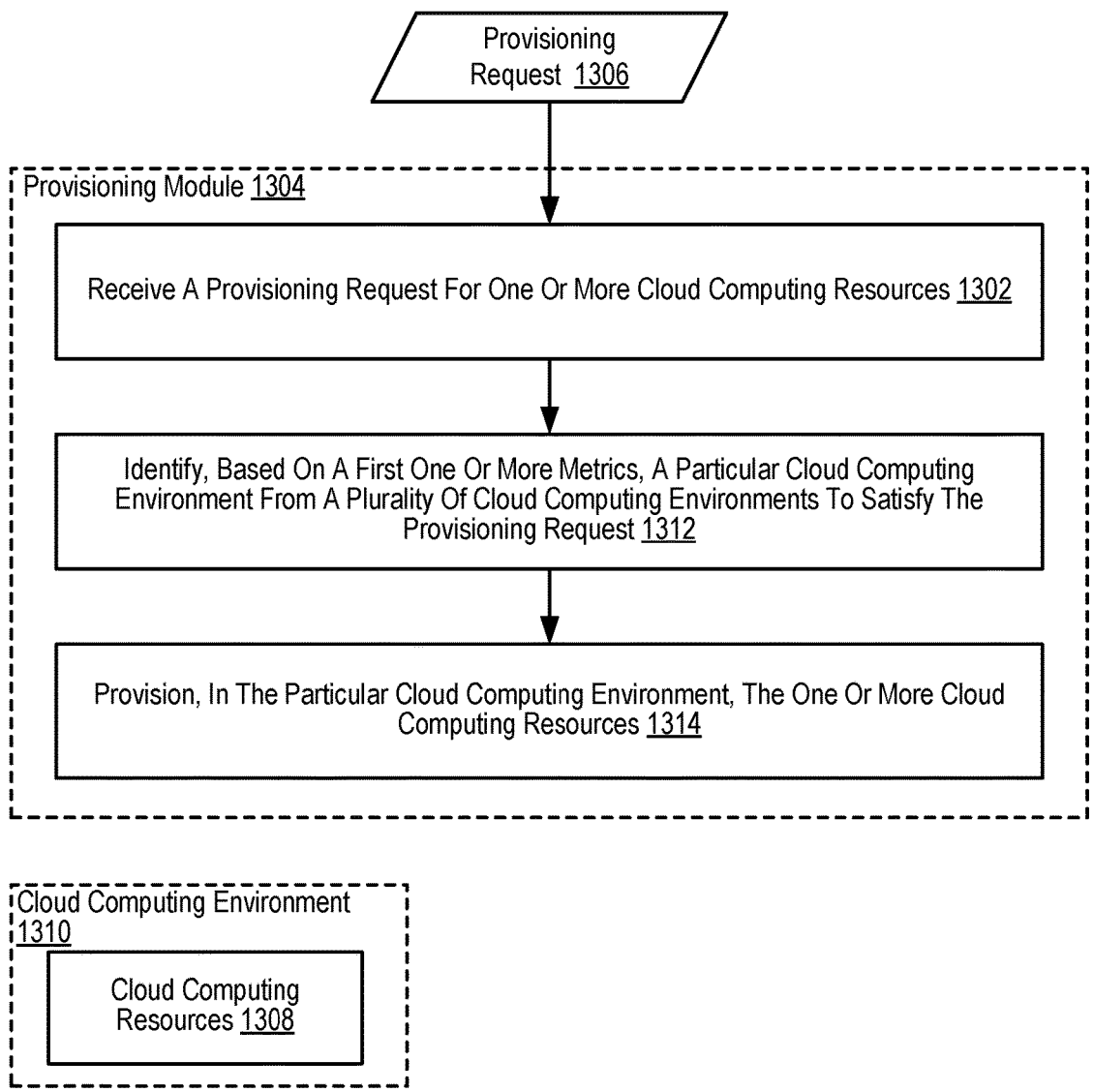
FIG. 13 sets forth a flow chart illustrating an example method for multi-cloud orchestration as a service in accordance with some embodiments of the present disclosure.

For further explanation, FIG. 13 sets forth a flow chart illustrating an example method of multi-cloud orchestration-as-a-service in accordance with some embodiments of the present disclosure. The method of FIG. 13 includes receiving (1302) (e.g., by a provisioning module (1304)) a provisioning request (1306) for one or more cloud computing resources (1308). The provisioning request (1306) may be received (1302), for example, from an endpoint computing device such as a user's local machine, a server in a remote data center, or other endpoint computing device as can be appreciated.

The provisioning request (1306) describes one or more cloud computing resources (1308) to be provisioned in a cloud computing environment (1310) to be identified, as will be described in further detail below. Such cloud computing resources (1308) may include, for example, one or more virtual machines, one or more applications (e.g., containerized applications), a cloud-based storage system, or other resources that can be provisioned and/or executed in a cloud computing environment (1310). Accordingly, in some embodiments, the provisioning request (1306) may include identifiers of particular virtual machines, containerized, applications, and the like to be instantiated in the cloud computing environment (1310). In some embodiments, the provisioning request (1306) may include configuration parameters or other descriptors for generating or instantiating the cloud computing resources (1308) in the cloud computing environment (1310). For example, the provisioning request (1306) may further describe particular amounts of storage resources, computing resources, and the like required to execute particular cloud computing resources (1308), such as an amount of storage space to be allocated for a particular virtual machine or containerized application. The provisioning request (1306) may also identify other parameters, such as particular operating systems to be used in a virtual machine, user accounts, access permissions, and the like.

In some embodiments, the provisioning request (1306) is encoded in a format independent of any cloud computing environment (1310) that may provision the cloud computing resources (1308). For example, if the cloud computing environment (1310) is to be selected from various cloud computing environments such as Microsoft Azure, Amazon AWS, and Google Platform, each of which may have particular formats for provisioning requests, the received provisioning request (1306) may be encoded independent of these particular formats. In other words, the provisioning request (1306) is encoded in a platform-independent format. In other embodiments, the provisioning request (1306) may be encoded in a particular format for a cloud computing environment that may or may not be the particular cloud computing environment (1310) identified for provisioning as described below. In some embodiments, the provisioning request (1306) identifies a preferred cloud computing environment for provisioning the cloud computing resources (1308). In other embodiments, the provisioning request (1306) does not identify a preferred cloud computing environment.

In some embodiments, the provisioning request (1306) may be embodied as a script (e.g., an executable script) for provisioning the cloud computing resources (1308). In other embodiments, the provisioning request (1306) may be embodied as one or more Application Program Interface (API) calls provided to the provisioning module (1304).

The method of FIG. 13 also includes identifying (1312) (e.g., by the provisioning module (1304)), based on a first one or more metrics, a particular cloud computing environment (1310) from a plurality of cloud computing environments to satisfy the provisioning request (1306). In other words, a particular cloud computing environment (1310) is selected from the plurality of cloud computing environments for provisioning the one or more cloud computing resources (1308) described in the provisioning request (1306). The plurality of cloud computing environments may each correspond to a particular service provider and/or particular services or environments offered by a given service provider. The plurality of cloud computing environments may include public cloud computing environments (e.g., Microsoft Azure, Amazon AWS), private cloud environments, hybrid cloud environments, or combinations thereof as can be appreciated.

The first one or more metrics are various quantifiable metrics used to evaluate the fitness and/or predicted performance of the one or more cloud computing resources (1308) in each of the plurality of cloud computing environments. Accordingly, the first one or more metrics are calculated for each of the plurality of cloud computing environments and used to identify the particular cloud computing environment (1310) from the plurality of cloud computing environments.

In some embodiments, the first one or more metrics includes a cost (e.g., a financial cost) associated with each of the cloud computing environments. A cost for a given cloud computing environment may include a cost to provision the one or more cloud computing resources (1308). For example, the cost to provision the one or more cloud computing resources (1308) in a given cloud computing environment may include financial costs for processing resources used to provision the one or more cloud computing resources (1308), storage resources allocated in provisioning the one or more cloud computing resources (1308), costs bandwidth or input/output operations used in provisioning the one or more cloud computing resources (1308) (e.g., to transfer data to the given cloud computing resource), and the like.

The cost for a given cloud computing environment may also include a cost to maintain and/or execute the one or more cloud computing resources (1308). For example, the cost may include an estimated cost for data stored in the given cloud computing environment over time, an estimated cost for performing an estimated number of transactions or an estimated amount of data transferred in association with the one or more cloud computing resources (1308), and other financial costs as can be appreciated. Such estimated costs may be based on historical performance data associated with the one or more cloud computing resources (1308) (e.g., historical performance data associated with previous executions of a given application, cloud-based storage system, virtual machine, and the like). Such costs may be calculated using known service agreements and the like that define particular financial costs for particular resource utilizations.

In some embodiment, the first one or more metrics include one or more performance metrics associated with each of the cloud computing environments. Performance metrics for a given cloud computing environment may include latency metrics, bandwidth metrics, transaction processing time metrics, processing power metrics, and the like. Such performance metrics may be based on the one or more cloud computing resources (1308) (e.g., based on past executions or instantiations of the one or more cloud computing resources (1308) in the given cloud computing environment). Such performance metrics may also be independent of the one or more cloud computing resources (1308). Such performance metrics may be measured by the provisioning module (1304) or another service, or provided by each cloud computing environment.

In some embodiments, the first one or more metrics include reliability metrics associated with each of the cloud computing environments. The reliability metric for a given cloud computing environment may indicate a ratio, percentage, or other evaluation of a degree to which requests or processes performed by the given cloud computing environment are performed successfully (e.g., without error). In some embodiments, the first one or more metrics include availability metrics associated with each of the cloud computing environments. The availability metric for a given cloud computing environment may indicate a ratio, percentage, or other evaluation of a degree to which the given cloud computing environment is operational (e.g., uptime) and able to service requests or processes.

In some embodiments, identifying (1312) a particular cloud computing environment (1310) from the plurality of cloud computing environment may include calculating a fitness score for each of the plurality of cloud computing environments based on the first one or more metrics. For example, a fitness score for a given cloud computing environment may be calculated as a function of the first one or more metrics. In some embodiments, the fitness score is calculated as a weighted function of the first one or more metrics. In some embodiments, the weights applied to a given metric are a default value. In other embodiments, a user may customize particular weights such that certain metrics are given more weight in calculating a fitness score. For example, a user who values cost more than performance or reliability may configure a higher weight for cost and lower weights for performance or reliability.

In some embodiments, identifying (1312) a particular cloud computing environment (1310) from the plurality of cloud computing environment may be based on one or more rules or thresholds. For example, the particular cloud computing environment (1310) may be identified (1312) as having a highest fitness score and having a particular reliability metric above a threshold. Thus, a cloud computing environment having a total highest fitness score but a reliability metric falling below a threshold will not be selected, ensuring that the selected particular cloud computing environment (1310) satisfies a minimum threshold reliability. Such thresholds may include default thresholds or user defined threshold.

In some embodiments, identifying (1312) a particular cloud computing environment (1310) from the plurality of cloud computing environment may be based on a user preference associated with one or more of the cloud computing environments. For example, the user preference may select a preferred cloud computing environment or a preferred ranking of the cloud computing environments. In some embodiments, the user preference may cause a fitness score to be weighted according to the user preference. For example, a preferred cloud computing environment may have its fitness score weighted higher than other cloud computing environments. Where the user preference includes a preferred ranking of the cloud computing environments, the fitness scores of each cloud computing environment may be weighted according to their position in the preferred ranking. In some embodiments, the user preference may be used as a tie breaker where two or more cloud computing environments have a same fitness score or are otherwise equal candidates for selection (e.g., according to one or more rules or other approaches). In some embodiments, the user preference may indicate a default cloud computing environment that overrides other evaluation criteria (e.g., fitness scores, rules, and the like).

The method of FIG. 13 also includes provisioning (1314) (e.g., by the provisioning module (1304)), in the particular cloud computing environment (1310), the one or more cloud computing resources (1308). The provisioning module (1304) communicates with the particular cloud computing environment (1310) to cause the one or more cloud computing resources (1308) to be provisioned in the particular cloud computing environment (1310). For example, the provisioning module (1304) may access an API of the particular cloud computing environment (1310), provide a script to the particular cloud computing environment (1310), or otherwise request provisioning of the one or more cloud computing resources (1308) in the particular cloud computing environment (1310). The provisioning module (1304) may provide data to the particular cloud computing environment (1310) associated with the one or more cloud computing resources (1308). The provisioning module (1304) may provide identifiers for data associated with the one or more cloud computing resources (1308) to facilitate access to the data by the particular cloud computing environment (1310).

According to the approaches described above, the provisioning module (1304) provides an abstraction layer between a client and multiple cloud computing environments. The client provides the provisioning request (1306) to the provisioning module (1304), and the provisioning module (1304) selects the particular cloud computing environment (1310) on behalf of the client. The provisioning module (1304) then manages the provisioning of the cloud computing resources (1308) in the particular cloud computing environment (1310) without the need for further client intervention. Thus, the client does not need to tailor their provisioning requests (1306) to any specific cloud computing environment. Moreover, the particular cloud computing environment (1310) used for provisioning will be selected as a best fit according to various metrics, providing cost and/or performance benefits for the client that may otherwise go unavailable if selection of a cloud computing environment is left to the client.

Figure 14:
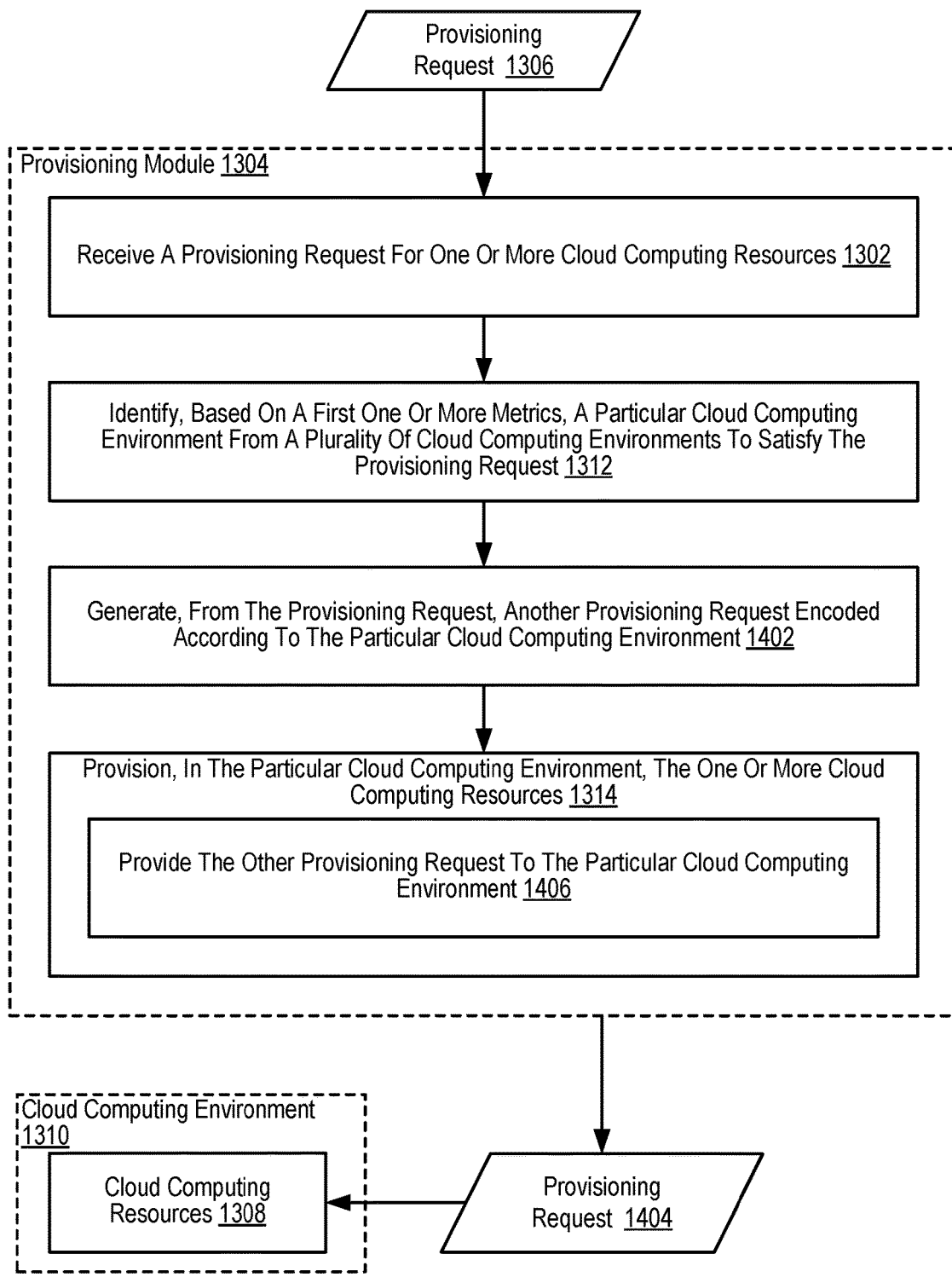
FIG. 14 sets forth a flow chart illustrating another example method for multi-cloud orchestration as a service in accordance with some embodiments of the present disclosure.

For further explanation, FIG. 14 sets forth a flow chart illustrating an example method of multi-cloud orchestration-as-a-service in accordance with some embodiments of the present disclosure. The method of FIG. 14 is similar to FIG. 13 in that the method of FIG. 14 includes receiving (1302) a provisioning request (1306) for one or more cloud computing resources (1308); identifying (1312), based on a first one or more metrics, a particular cloud computing environment (1310) from a plurality of cloud computing environments to satisfy the provisioning request (1306); and provisioning (1314), in the particular cloud computing environment (1310), the one or more cloud computing resources (1308).

The method of FIG. 14 differs from FIG. 13 in that the method of FIG. 14 also includes generating (1402) (e.g., by the provisioning module (1304)), from the provisioning request (1306), another provisioning request (1404) encoded according to the particular cloud computing environment (1310). As was described above, the received provisioning request (1306) may be encoded in a platform-independent format (e.g., not encoded for any given cloud computing environment), or in a format for a given cloud computing environment that differs from the identified particular cloud computing environment (1310). For example, the provisioning request (1306) may be encoded for Microsoft Azure, while Amazon AWS was identified as the particular cloud computing environment (1310). In such embodiments, another provisioning request (1404) may be generated based on the received provisioning request (1306). For example, a provisioning request (1404) for Amazon AWS is generated form a Microsoft Azure or platform-independent provisioning request (1306).

For example, in some embodiments, where the received provisioning request (1306) is embodied as a script, the script may be parsed and a new script may be generated as the other provisioning request (1404). In other embodiments, where the received provisioning request (1306) is embodied as one or more API calls, one or more corresponding API calls for the particular cloud computing environment (1310) may be generated. One skilled in the art will appreciate that the other provisioning request (1404) may be embodied different from the received provisioning request (1306). For example, the received provisioning request (1306) may be embodied as a script and the other provisioning request (1404) may be embodied as one or more API calls. Accordingly, the provisioning module (1304) may be configured to translate API calls into portions of a script, translate portions of scripts into corresponding API calls, and perform similar translation or conversion operations.

The method of FIG. 14 further differs from FIG. 13 in that provisioning (1314), in the particular cloud computing environment (1310), the one or more cloud computing resources (1308) includes providing (1406) (e.g., by the provisioning module (1304)) the other provisioning request (1404) to the particular cloud computing environment (1406). For example, a script may be provided to the particular cloud computing environment (1406) or one or more API calls may be submitted to the particular cloud computing environment (1406). Thus, provisioning requests (1306) encoded in formats not compatible with the particular cloud computing environment (1310) (e.g., encoded for another cloud computing environment or in a platform-independent format) may be converted in order to provision the cloud computing resources (1308) in the particular cloud computing environment (1310).

Figure 15:
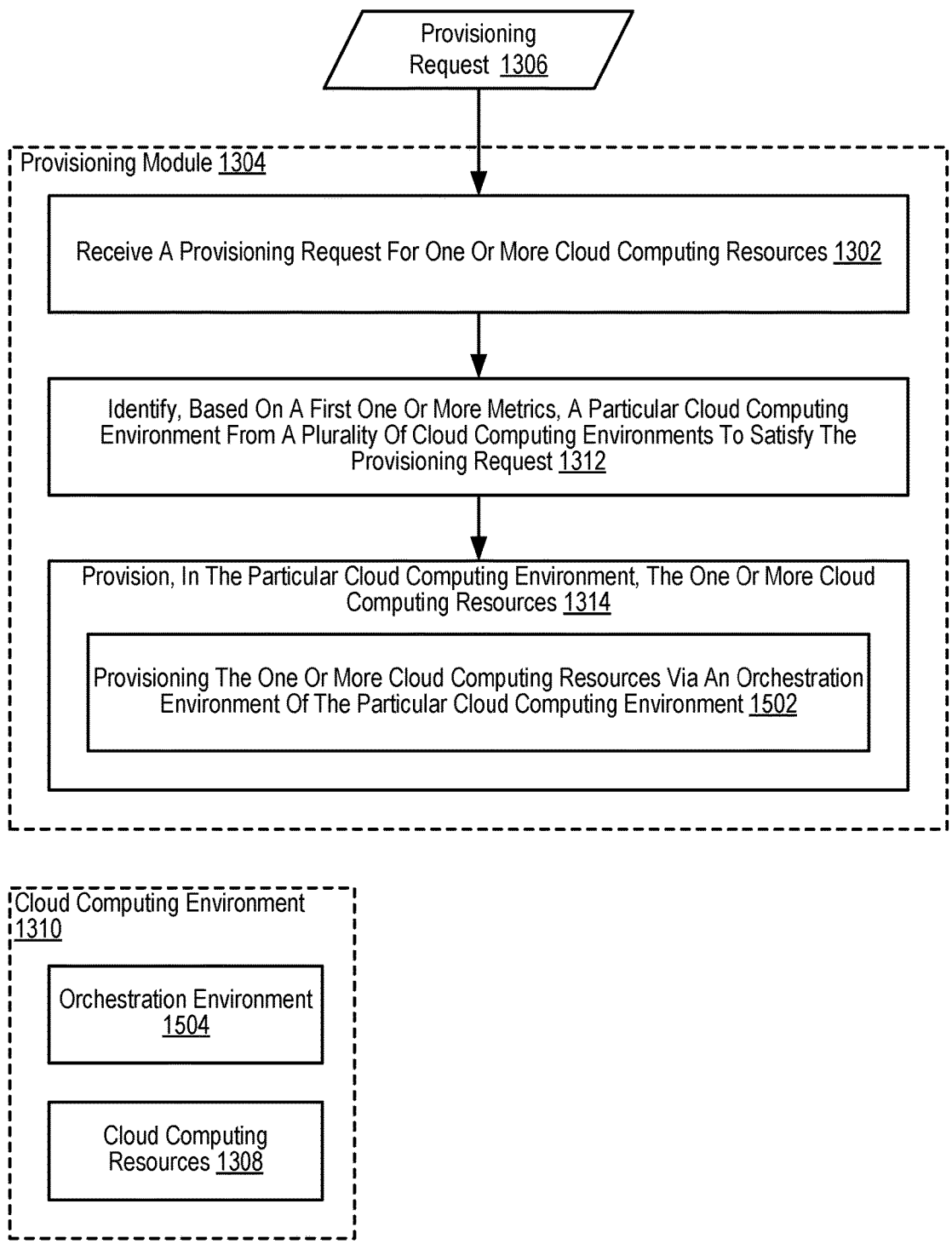
FIG. 15 sets forth a flow chart illustrating another example method for multi-cloud orchestration as a service in accordance with some embodiments of the present disclosure.

For further explanation, FIG. 15 sets forth a flow chart illustrating an example method of multi-cloud orchestration-as-a-service in accordance with some embodiments of the present disclosure. The method of FIG. 15 is similar to FIG. 13 in that the method of FIG. 15 includes receiving (1302) a provisioning request (1306) for one or more cloud computing resources (1308); identifying (1312), based on a first one or more metrics, a particular cloud computing environment (1310) from a plurality of cloud computing environments to satisfy the provisioning request (1306); and provisioning (1314), in the particular cloud computing environment (1310), the one or more cloud computing resources (1308).

The method of FIG. 15 differs from FIG. 13 in that provisioning (1314), in the particular cloud computing environment (1310), the one or more cloud computing resources (1308) includes provisioning (1502) the one or more cloud computing resources (1308) via an orchestration environment (1504) of the particular cloud computing environment (1310). The orchestration environment (1504) is a service or process executed in the particular cloud computing environment (1310) for deploying, scaling, or managing particular cloud computing resources (1308). For example, the orchestration environment (1504) may include a container orchestration system such as Kubernetes for managing containerized application cloud computing resources (1308). As another example, the orchestration environment (1504) may include a virtual machine orchestration system such as VMWare for managing virtual machine cloud computing resources (1308). Thus, the provisioning module (1304) accesses or interacts with the orchestration environment (1504) in order to provision the particular cloud computing resources (1308) managed by the orchestration environment (1504).

Figure 16:
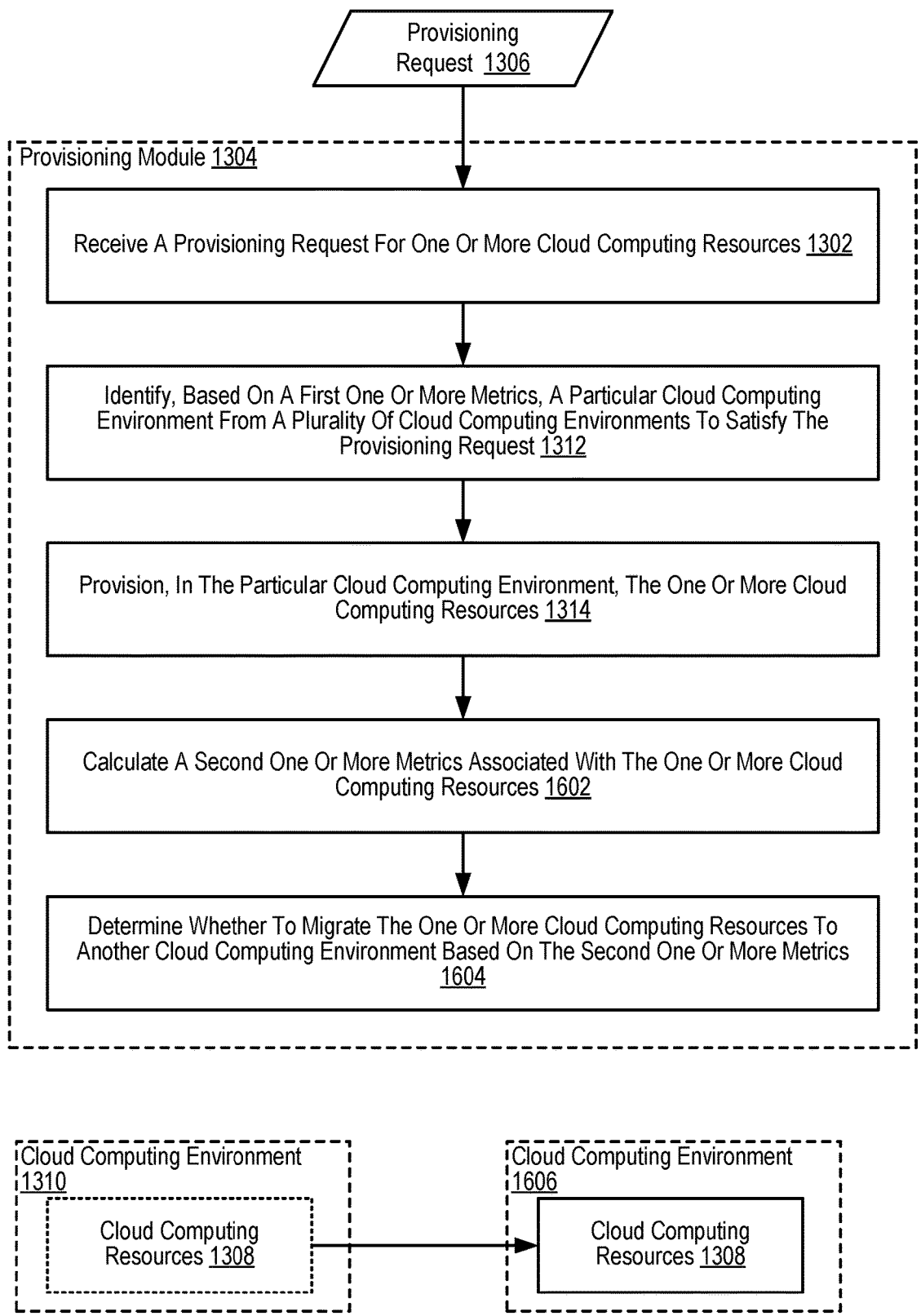
FIG. 16 sets forth a flow chart illustrating another example method for multi-cloud orchestration as a service in accordance with some embodiments of the present disclosure.

For further explanation, FIG. 16 sets forth a flow chart illustrating an example method of multi-cloud orchestration-as-a-service in accordance with some embodiments of the present disclosure. The method of FIG. 16 is similar to FIG. 13 in that the method of FIG. 16 includes receiving (1302) a provisioning request (1306) for one or more cloud computing resources (1308); identifying (1312), based on a first one or more metrics, a particular cloud computing environment (1310) from a plurality of cloud computing environments to satisfy the provisioning request (1306); and provisioning (1314), in the particular cloud computing environment (1310), the one or more cloud computing resources (1308).

The method of FIG. 16 differs from FIG. 13 in that the method of FIG. 16 also includes calculating (1602) (e.g., by the provisioning module (1304)) a second one or more metrics associated with the one or more cloud computing resources (1308). The second one or more metrics may include metrics associated with the one or more cloud computing resources (1308) as provisioned in the particular cloud computing environment (1310). For example, the second one or more metrics may include measured financial costs incurred with the one or more cloud computing resources (1308) in the particular cloud computing environment (1310), measured performance or reliability metrics, and the like.

The second one or more metrics may include metrics associated with the one or more cloud computing resources (1308) and other cloud computing environments. For example, the second one or more metrics may include estimated costs for executing or implementing the one or more cloud computing resources (1308) in other cloud computing environments. Such estimated costs may be based on observed performance behaviors in the particular cloud computing environment (1310) (e.g., observed transactions, data throughput, and the like). The second one or more metrics may also include performance or reliability ratings for the other computing environments as described above with respect to the first one or more metrics.

The second one or more metrics may include migration costs associated with migrating the one or more cloud computing resources (1308) to other cloud computing environments. The migration cost for migrating the one or more cloud computing resources (1308) to a given cloud computing environment may include a cost to transfer data to the given cloud computing environment (e.g., from the particular cloud computing environment (1310) to the given cloud computing environment, including associated data ingress or egress costs). The migration cost may also include a data deletion cost (e.g., a cost to delete data from the particular cloud computing environment (1310). The migration cost may also include a provisioning cost associated with the given cloud computing environment (e.g., a cost to provision the one or more cloud computing resources (1308) in the given cloud computing environment).

The method of FIG. 16 also includes determining (1604) (e.g., by the provisioning module (1304) whether to migrate the one or more cloud computing resources (1308) to another cloud computing environment (1606) based on the second one or more metrics. For example, the provisioning module (1304) may determine whether to migrate the one or more cloud computing resources (1308) to any or each of the other cloud computing environments other than the particular cloud computing environment (1310) in which the one or more cloud computing resources (1308) are provisioned.

Determining (1604) whether to migrate the one or more cloud computing resources (1308) may include comparing a projected cost of maintaining the one or more cloud computing resources (1308) in the particular cloud computing environment (1310) to a projected cost of maintaining the one or more cloud computing resources (1308) in the other cloud computing environment (1606). For example, it may be determined to migrate the one or more cloud computing resources (1308) where the projected cost for maintaining the one or more cloud computing resources (1308) in the other cloud computing environment (1606) is less than the projected cost for the particular cloud computing environment (1310).

Determining (1604) whether to migrate the one or more cloud computing resources (1308) may be further based on the migration cost. A projected cost of maintaining the one or more cloud computing resources (1308) in the particular cloud computing environment (1310) may be compared to a projected cost of maintaining the one or more cloud computing resources (1308) in the other cloud computing environment (1606) offset by the migration cost. Such a determination may also be based on a projected time at which the projected cost to maintain the one or more cloud computing resources (1308) in the particular cloud computing environment (1310) exceeds the migration cost plus the projected time to maintain the one or more cloud computing resources (1308) in the other cloud computing environment (1606). Where the projected time falls below a threshold (e.g., three months, six months, and the like), it may then be determined to migrate the one or more cloud computing resources (1308) to the other cloud computing environment (1606).

For example, assuming a six month threshold, further assume that after four months it will be more expensive to maintain the one or more cloud computing resources (1308) in the cloud computing environment (1310) than in the other cloud computing environment (1606). In other words, the cost savings associated with using the other cloud computing environment (1606) offsets the migration cost after four months. As this projected time is less than the six month threshold, it may be determined to migrate the one or more cloud computing resources (1308) to the other cloud computing environment (1606). Conversely, were the projected time to be two years, it may be determined to not migrate the one or more cloud computing resources (1308).

The second one or more metrics may include other metrics, including performance metrics, reliability metrics, availability metrics, and the like, compared between the particular cloud computing environment (1310) and the other cloud computing environment (1606). Such other metrics may be used instead of or in conjunction with projected costs and migration costs in fitness score functions, rule based approaches, or other approaches as can be appreciated.

In some embodiments, if it is determined to migrate the one or more cloud computing resources (1308), the provisioning module (1304) may provide a notification to a client or administrator indicating that the one or more cloud computing resources (1308) should be migrated. Migration may then proceed in response to a request or confirmation from the client or administrator. In other embodiments, migration may be automatically initiated in response to determining to migrate the one or more cloud computing resources (1308).

Migration of the one or more cloud computing resources (1308) to the other cloud computing environment (1606) may include transferring data between the particular cloud computing environment (1310) and the other cloud computing environment (1606) (e.g., datasets acted upon by containerized applications, virtual machines, cloud-based storage systems, and the like). Migration of the one or more cloud computing resources (1308) to the other cloud computing environment (1606) may also include provisioning the one or more cloud computing resources (1308) in the other cloud computing environment (1606). Migration of the one or more cloud computing resources (1308) to the other cloud computing environment (1606) may also include deleting data or freeing other resources in the particular cloud computing environment (1606).

In some embodiments, the provisioning module (1304) may be configured to calculate (1602) the one or more second metrics and determine (1604) whether to migrate the one or more cloud computing resources (1308) at a predefined interval, in response to a user input or request, or according to other criteria. Thus, the provisioning module (1304) continually determines if a more suitable (based on defined criteria) cloud computing environment is available for the one or more cloud computing resources (1308) and migrating accordingly.

In the examples depicted in FIGS. 13-16, a provisioning module (1304) is responsible for performing many of the steps described above. Such a provisioning module (1304) may be embodied, for example, as one or more modules of computer program instructions that are executing on computer hardware such as a computer processor, as one or more modules of computer program instructions that are executing on virtualized computer hardware such as a virtual machine, as one or more modules of computer program instructions that are included in a container, or in some other way. Such a provisioning module (1304) may be embodied, for example, as a centralized provisioning module (1304) that executes in a cloud, as a provisioning module (1304) that executes on dedicated hardware such as a management server, or in some other way.

Figure 17:
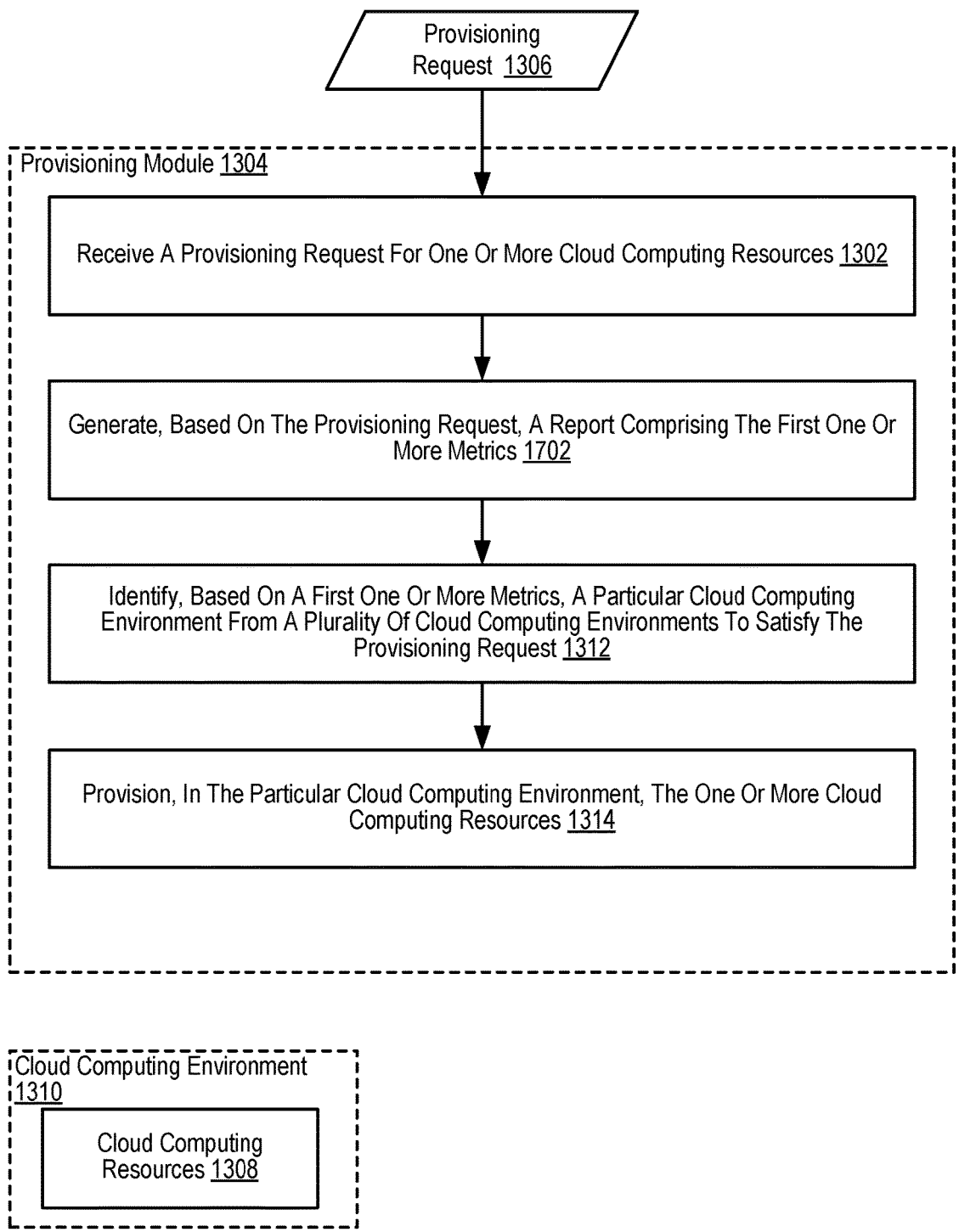
FIG. 17 sets forth a flow chart illustrating another example method for multi-cloud orchestration as a service in accordance with some embodiments of the present disclosure.

For further explanation, FIG. 17 sets forth a flow chart illustrating an example method of multi-cloud orchestration-as-a-service in accordance with some embodiments of the present disclosure. The method of FIG. 17 is similar to FIG. 13 in that the method of FIG. 17 includes receiving (1302) a provisioning request (1306) for one or more cloud computing resources (1308); identifying (1312), based on a first one or more metrics, a particular cloud computing environment (1310) from a plurality of cloud computing environments to satisfy the provisioning request (1306); and provisioning (1314), in the particular cloud computing environment (1310), the one or more cloud computing resources (1308).

The method of FIG. 17 differs from FIG. 13 in that the method of FIG. 17 also includes generating (1702), based on the provisioning request, a report comprising the first one or more metrics. In some embodiments, the report is embodied as a user interface. In other embodiments, the report is encoded as a document. The report may include various metrics, projections, and forecasts for the system described in the provisioning request (1306) with respect to each of the cloud computing environments to which the one or more cloud computing resources (1308) may be provisioned. The report may indicate, for each of the cloud computing environments, the calculated or projected first one or more metrics (e.g., provisioning costs, projected costs over time, calculated or projected reliability metrics, calculated or projected performance metrics, and the like).

In some embodiments, a cloud computing environment can be selected from the report (e.g., from the user interface) for provisioning the one or more cloud computing resources (1308). In some embodiments, the selection of a cloud computing environment may override the identification (1312) of the particular cloud computing environment (1310). In some embodiments, the selection of a cloud computing environment may be a factor in the identification (1312) of the particular cloud computing environment (1310). For example, a selected cloud computing resource may receive a constant added to a score used in identifying (1312) the particular cloud computing environment (1310), or have a weight applied to one or more of the factors used in calculating a score used in identifying (1312) the particular cloud computing environment (1310).

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method comprising: receiving a provisioning request for one or more cloud computing resources, wherein the provisioning request indicates a preferred cloud computing environment from which to provision resources; determining, based on a first one or more metrics, that the preferred cloud computing environment is not an optimal cloud computing environment to satisfy the provisioning request; in response to the determination, generating, from the provisioning request, another provisioning request encoded according to a particular cloud computing environment to fulfill the provisioning request, wherein the particular cloud computing environment is different from the preferred cloud computing environment; and provisioning, in the particular cloud computing environment that is different from the preferred cloud computing environment, the one or more cloud computing resources using the another provisioning request encoded according to the particular cloud computing environment by providing the another provisioning request to the particular cloud computing environment.

2. The method of claim 1, wherein the first one or more metrics comprise one of a cost associated with each of the cloud computing environments, and one or more performance metrics associated with each of the cloud computing environments, and a reliability metric associated with each of the cloud computing environments, and an availability metric associated with each of the cloud computing environments.

3. The method of claim 1, wherein the one or more cloud computing resources comprise one of an application, a virtual machine, and a cloud-based storage system.

4. The method of claim 1, wherein provisioning, in the particular cloud computing environment, the one or more cloud computing resources comprises provisioning the one or more cloud computing resources via an orchestration environment of the particular cloud computing environment.

5. The method of claim 1, further comprising:
calculating a second one or more metrics associated with the one or more cloud computing resources; and
determining whether to migrate the one or more cloud computing resources to another cloud computing environment based on the second one or more metrics.

6. The method of claim 5, wherein the second one or more metrics comprise a migration cost for migrating the one or more cloud computing resources.

7. The method of claim 6, wherein the migration cost is based on at least one of: a data transfer cost, a data deletion cost associated with the particular cloud computing environment, or a provisioning cost associated with the other cloud computing environment.

8. The method of claim 1, wherein identifying the particular cloud computing environment is further based on a user preference.

9. The method of claim 1, further comprising generating, based on the provisioning request, a report comprising the first one or more metrics.

10. An apparatus comprising a computer processor, a computer memory operatively coupled to the computer processor, the computer memory having disposed within it computer program instructions that, when executed by the computer processor, cause the apparatus to carry out steps comprising: receiving a provisioning request for one or more cloud computing resources, wherein the provisioning request indicates a preferred cloud computing environment from which to provision resources; determining, based on a first one or more metrics, that the preferred cloud computing environment is not an optimal cloud computing environment to satisfy the provisioning request; in response to the determination, generating, from the provisioning request, another provisioning request encoded according to a particular cloud computing environment to fulfill the provisioning request, wherein the particular cloud computing environment is different from the preferred cloud computing environment; and provisioning, in the particular cloud computing environment that is different from the preferred cloud computing environment, the one or more cloud computing resources using the another provisioning request encoded according to the particular cloud computing environment by providing the another provisioning request to the particular cloud computing environment.

11. The apparatus of claim 10, wherein the first one or more metrics comprise one of an cost associated with each of the cloud computing environments, one or more performance metrics associated with each of the cloud computing environments, a reliability metric associated with each of the cloud computing environments, and an availability metric associated with each of the cloud computing environments.

12. The apparatus of claim 10, wherein the one or more cloud computing resources comprise one of an application, a virtual machine, and a cloud-based storage system.

13. The apparatus of claim 10, wherein provisioning, in the particular cloud computing environment, the one or more cloud computing resources comprises provisioning the one or more cloud computing resources via an orchestration environment of the particular cloud computing environment.

14. The apparatus of claim 10, wherein the steps further comprise:
calculating a second one or more metrics associated with the one or more cloud computing resources; and
determining whether to migrate the one or more cloud computing resources to another cloud computing environment based on the second one or more metrics.

15. The apparatus of claim 14, wherein the second one or more metrics comprise a migration cost for migrating the one or more cloud computing resources.

16. The apparatus of claim 15, wherein the migration cost is based on at least one of: a data transfer cost, a data deletion cost associated with the particular cloud computing environment, or a provisioning cost associated with the other cloud computing environment.

17. The apparatus of claim 10, wherein identifying the particular cloud computing environment is further based on a user preference.

18. The apparatus of claim 10, wherein the steps further comprise generating, based on the provisioning request, a report comprising the one or more metrics.

* * * * *